US006604168B2

(12) United States Patent
Ogawa

(10) Patent No.: US 6,604,168 B2
(45) Date of Patent: Aug. 5, 2003

(54) FLASH EEPROM MANAGEMENT USING RATIO OF USED TO UNUSED SECTORS

(75) Inventor: Takeshi Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/350,188

(22) Filed: Jul. 9, 1999

(65) Prior Publication Data
US 2001/0034809 A1 Oct. 25, 2001

Related U.S. Application Data

(62) Division of application No. 08/710,946, filed on Sep. 24, 1996, now Pat. No. 5,933,847.

(30) Foreign Application Priority Data

Sep. 28, 1995 (JP) ............................................. 7-251234
Sep. 28, 1995 (JP) ............................................. 7-251236
Sep. 28, 1995 (JP) ............................................. 7-251237
Sep. 28, 1995 (JP) ............................................. 7-251238
Sep. 28, 1995 (JP) ............................................. 7-251239
Sep. 28, 1995 (JP) ............................................. 7-251240
Sep. 28, 1995 (JP) ............................................. 7-251241
Sep. 28, 1995 (JP) ............................................. 7-251242
Sep. 28, 1995 (JP) ............................................. 7-251243

(51) Int. Cl.$^7$ ................................................. G06F 12/00
(52) U.S. Cl. ........................................................ 711/103
(58) Field of Search ........................................... 711/103

(56) References Cited

U.S. PATENT DOCUMENTS 4,837,628 A    6/1989   Sasaki ............................ 358/209
5,404,485 A    4/1995   Ban ................................ 711/202
5,485,595 A    1/1996   Assar et al. .................... 711/103
5,524,230 A  * 6/1996   Sakaue et al. .................. 711/103
5,544,356 A    8/1996   Robinson et al. ............... 711/103
5,553,261 A  * 9/1996   Hasbun et al. .................. 711/103
5,581,723 A  * 12/1996  Hasbun et al. .................. 711/103
5,611,067 A  * 3/1997   Okamoto et al. ................ 711/103
5,966,720 A  * 10/1999  Itoh et al. ........................ 711/1

OTHER PUBLICATIONS

Dipert, Brian and Markus Levy, "Designing with Flash Memory", Annabooks, Apr. 1994; pp. 65–67, 187–188, 201, and 227–228.*

* cited by examiner

Primary Examiner—Reginald G. Bragdon
(74) Attorney, Agent, or Firm—Fitzpatrick, Cella, Harper & Scinto

(57) ABSTRACT

A plurality of data areas and management areas corresponding to the data areas are formed in a flash ROM. The management area consists of a sector number, a busy state flag, and a used state flag. To write data, a write instruction having a logical sector number indicating a data write destination is received, the data is written in one of writable data areas, and the logical sector number is written in the corresponding management area. To read out data, a read instruction having a logical sector number indicating a data read source is received, a management area storing the logical sector number is retrieval-accessed, and data stored in a data area corresponding to the retrieval-accessed management area is read out. In this manner, a data read•write unit (storage unit) smaller than an erase unit can be managed in a flash ROM. This makes a flash ROM with a large erase unit compatible with a file system.

16 Claims, 52 Drawing Sheets

FIG.3

```
1 : typedef struct DeviceTag {
2 :    struct DeviceTag * Next;
3 :    char    DevName [32];
4 :    int     (* InitDev) (void);
5 :    int     (* ShutDown) (void);
6 :    int     (* ReadSector) (long lsect, long nsect,char * buffer);
7 :    int     (* WriteSector) (long lsect, long nsect,char * buffer);
8 :    int     (* ReleaseSector) (long lsect, long nsect);
9 : } Device;
```

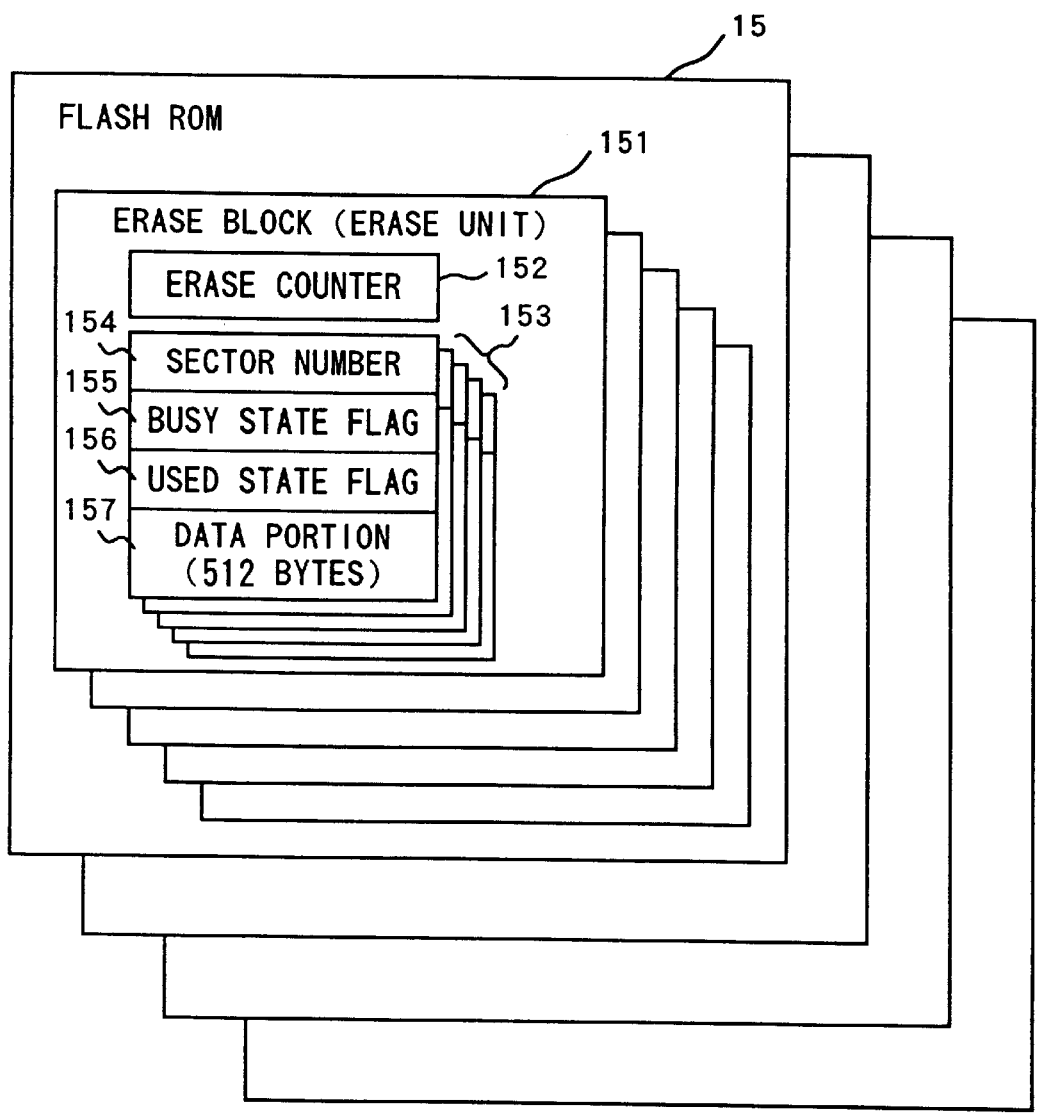

FIG. 5A

SECTOR NUMBER TABLE

| SECTOR NUMBER | SECTOR NUMBER | SECTOR NUMBER | SECTOR NUMBER | SECTOR NUMBER |

FIG. 5B

FLAG TABLE

| FLAG | FLAG | FLAG | FLAG | FLAG |

FIG. 5C

DATA TABLE

| DATA 512 | DATA 512 | DATA 512 | DATA 512 | DATA 512 |

FIG.6

| BUSY STATE FLAG | USED STATE FLAG | MEANING |
|---|---|---|
| FALSE | FALSE | "UNUSED SECTOR"...STATE AFTER ERASURE |
| TRUE | FALSE | "BUSY SECTOR"...SECTOR INDICATED BY SECTOR NUMBER IS STORED IN DATA PORTION |
| TRUE | FALSE | "USED SECTOR"...DATA STORED IN DATA PORTION IS INVALID AND THIS SECTOR IS UNUSABLE UNTIL DATA IS ERASED |

FALSE: STATE AFTER ERASURE    TRUE: BIT INVERTED VALUE OF FALSE

FIG.15

```
 1 : void WriteByteEEP (struct DEV * Dev,char * Address,char Data)
 2 : {
 3 :     while (*Dev->Address != Dev->Data) ;
 4 :     *Address = Data ;
 5 :     Dev->Address = Address ;
 6 :     Dev->Data    = Data ;
 7 :     RotateRdyQueue0 ;
 8 : }
 9 : char ReadByteEEP (struct DEV * Dev,char * Address)
10 : {
11 :     if (Dev->Address == Address) return Dev->Data ;
12 :     while (*Dev->Address != Dev->Data) ;
13 :     return *Address ;
14 : }
```

FIG.16

```
 1 : void ZoomUp (void)
 2 : {
 3 :    WaitSemapho (SemDCDC);
 4 :    Motor1StepUp (void);
 5 :    SignalSemapho (SemDCDC);
 6 : }
 7 : char XWriteSectorEEP (struct * Dev,int Sector ,char * Buffer)
 8 : {
 9 :    WaitSemapho (SemDCDC);
10 :    WriteSectorEEP (Dev, Sector, Buffer)
11 :    While (* Dev -> Address ! = Dev -> Data) ;
12 :    SignalSemapho (SemDCDC);
13 : }
```

NO DATA SAVED IN MAIN MEMORY

DATA OF THREE SECTORS SAVED IN MAIN MEMORY

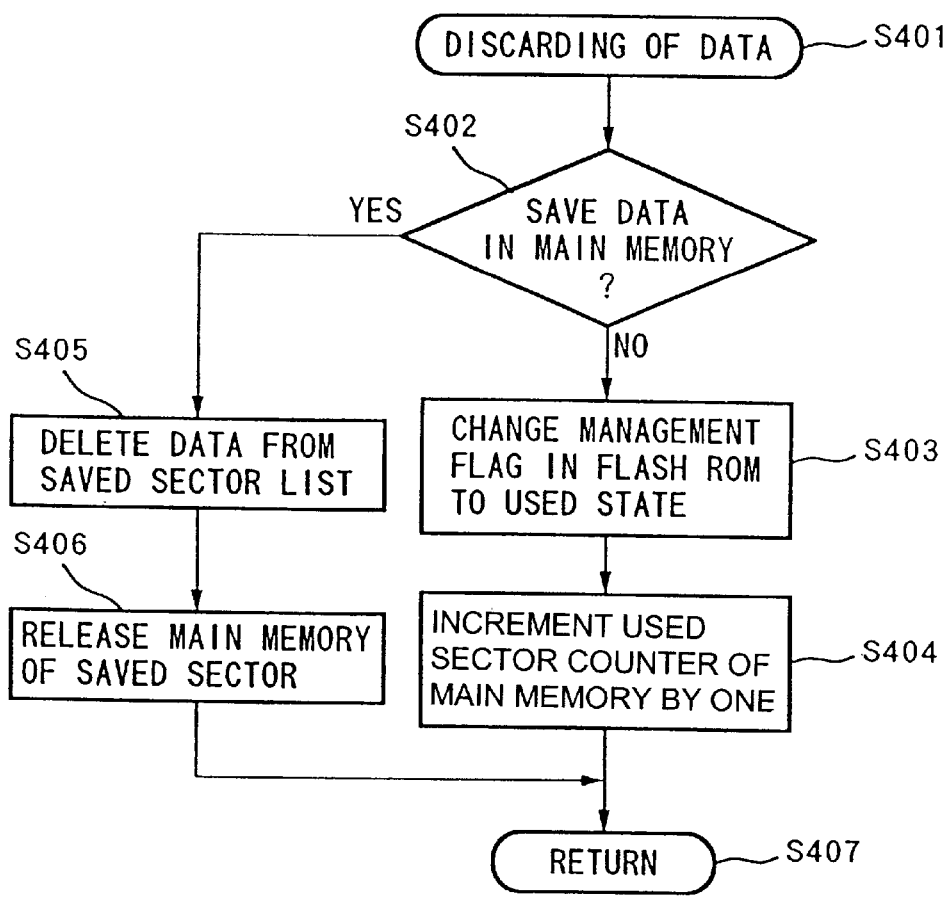

FIG.35A

COMMAND

| READ (IN) | WRITE (OUT) |
|---|---|
| ERROR | FEATURES |
| SECTOR COUNT | SECTOR COUNT |
| SECTOR NUMBER | SECTOR NUMBER |
| CYLINDER LOW | CYLINDER LOW |
| CYLINDER HIGH | CYLINDER HIGH |
| DRIVE/HEAD | DRIVE/HEAD |
| STATUS | COMMAND |

← INTERRUPT OCCURS

FIG.35B

CONTROL

| READ (IN) | WRITE (OUT) |
|---|---|
| ALT. STATUS | DEVICE CTL |
| DRIVE ADDR | |

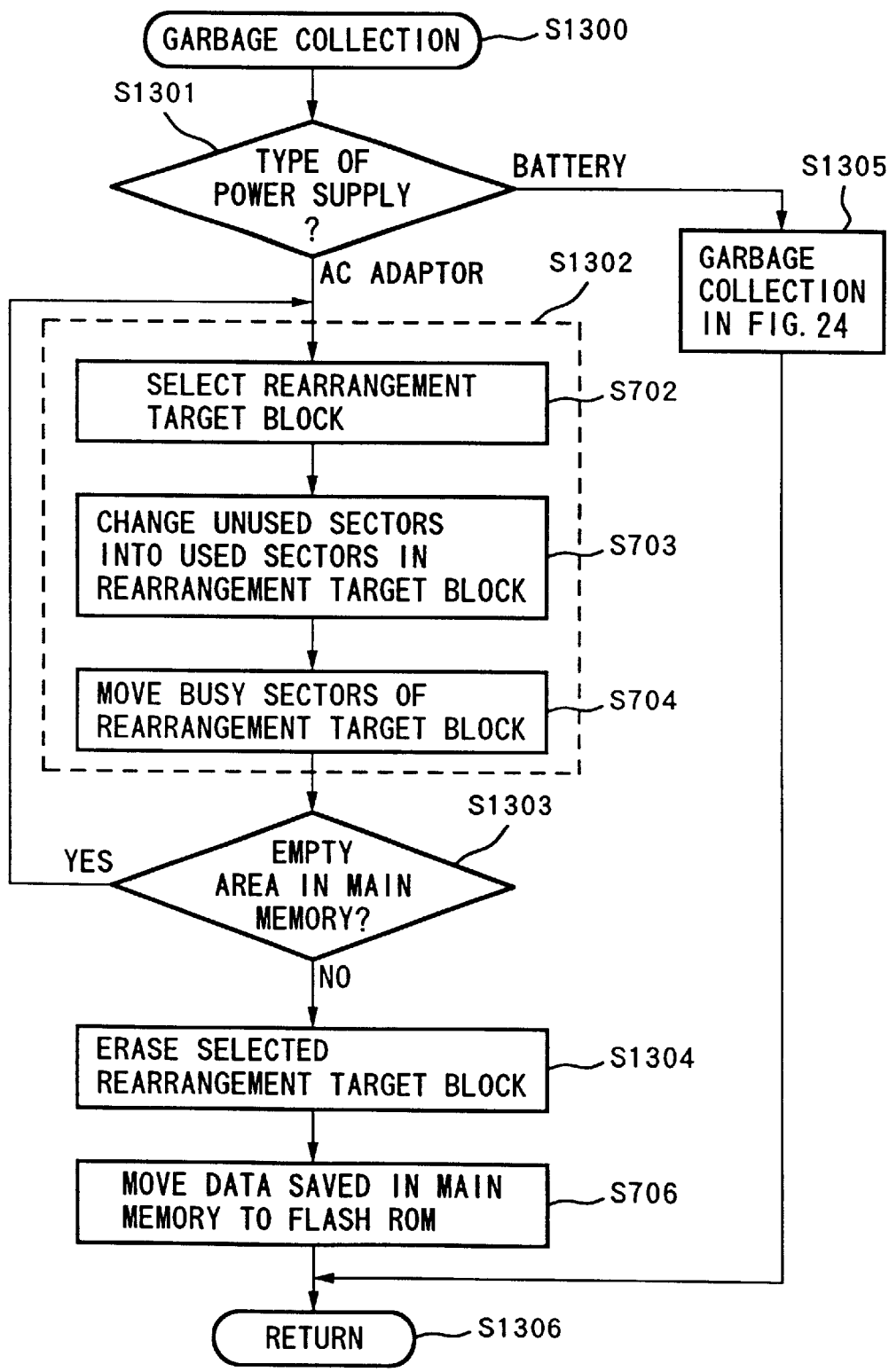

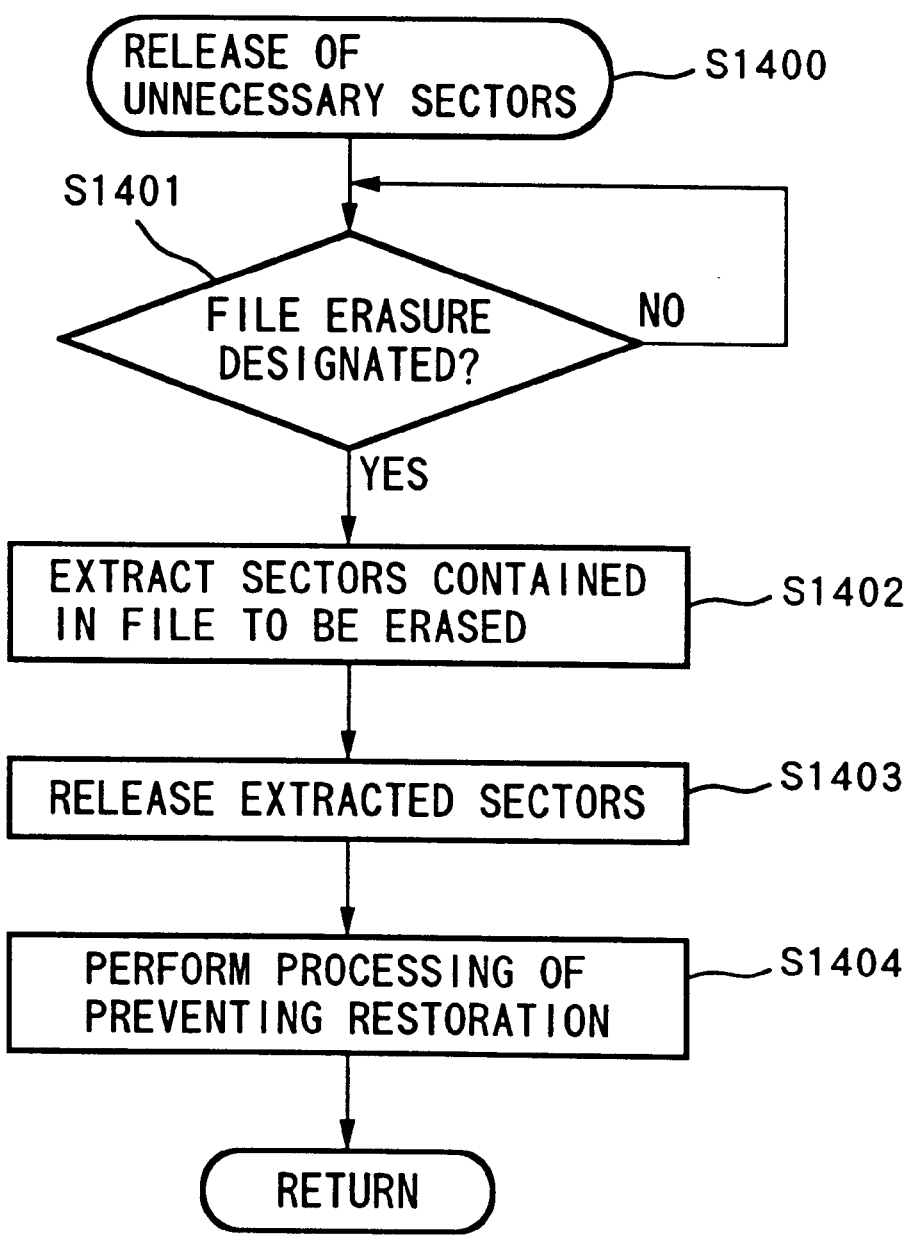

PROGRAM CODE EXPRESSED BY RELATIVE ADDRESSES

| ADDRESS | DATA | MNEMONIC |
|---|---|---|
| 0040 | 1234 | DB 1234 |
| 0050 | 85,0010 | JMP 0010 |
| ⋮ | | |
| 0060 | 86,-20 | MOV A,@(-20) |
| ⋮ | | |

TABLE OF ADDRESSES TO BE CONVERTED INTO ABSOLUTE ADDRESSES IN PROGRAM 0052
0062
⋮

PROGRAM CODE MAPPED TO ADDRESS 8710 IN MAIN MEMORY

| ADDRESS | DATA | MNEMONIC |
|---------|--------|----------------|
| 8750 | 1234 | DB  1234 |
| 8760 | 85,8770 | JMP 8770 |
| ⋮ | | |
| 8770 | 86,8750 | MOV A.@(8750) |
| ⋮ | | |

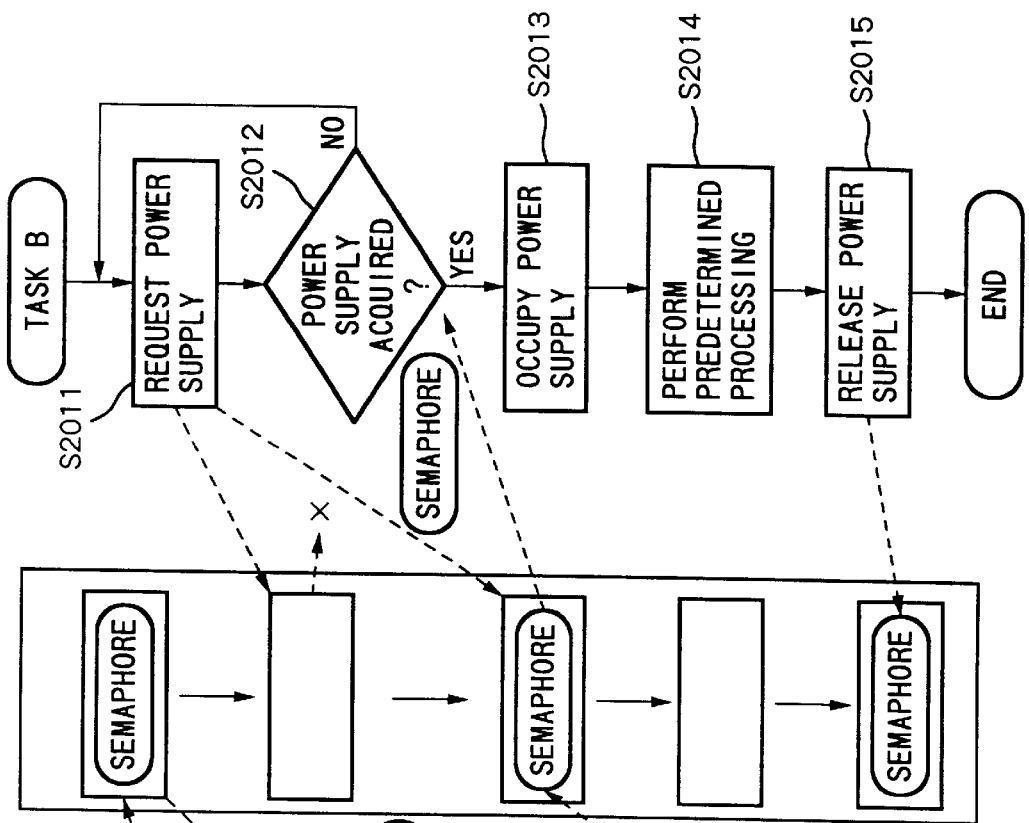
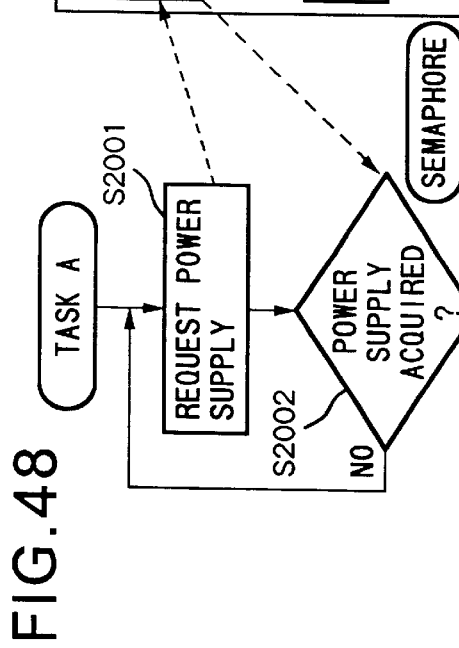
FIG.48

FLASH EEPROM MANAGEMENT USING RATIO OF USED TO UNUSED SECTORS

This application is a division of application Ser. No. 08/710,946, filed Sep. 24, 1996, now U.S. Pat. No. 5,933,847.

BACKGROUND OF THE INVENTION

The present invention relates to a flash ROM management method and apparatus in, e.g., a computer. The present invention also relates to an IC card and an electronic camera using a flash ROM.

Various types of flash ROMs are currently available and roughly classified into those developed for flash disks and those developed for BIOSs of personal computers.

The erase unit of the former flash ROM is 512 bytes which is a general erase unit of hard disks. Therefore, this flash ROM is highly compatible with file systems. The erase unit of the latter flash ROM is a large block unit, e.g., 64 KB. Also, some of flash ROMs of this type require a voltage of 12 V or higher as a write voltage as in the case of PROMS. Although flash ROMs of the latter type are readily obtainable because they are inexpensive, they are not highly compatible with file systems and hence cannot be used as particularly small-capacity recording media.

As described above, flash ROMs designed for BIOSs are inexpensive and therefore readily available although they have a large erase unit and are not highly compatible with file systems. Accordingly, if this type of flash ROMs can be applied to file systems, inexpensive small-capacity recording media can be provided.

IC cards inserted into host apparatuses are widely used as auxiliary storages for storing various data. For example, an IC card which only reads out data, such as an IC card storing font data, incorporates a ROM storing necessary data. An IC card in which data is rewritable generally incorporates a RAM, and a data read/write operation is executed by using the RAM. Since, however, a RAM cannot hold data without being backed up by a power supply, a power supply is incorporated in an IC card if it is necessary to hold data.

A flash ROM is an example of the data rewritable ROM. Various types of flash ROMs are presently available and roughly divided into a category developed for flash disks and a category developed for BIOSs of personal computers.

Generally, IC cards require a dedicated interface, and so it is not possible to use interfaces for common file systems (e.g., hard disks and floppy disks) which host apparatuses have.

In electronic cameras, image data obtained by photography is stored in a storage medium such as an internal DRAM or an external memory card. These storage media need to be constantly backed up by, e.g., batteries since the stored contents disappear if the supply of power is cut off. A magnetic disk is an example of a storage medium which does not require electrical backup to hold the stored contents. However, magnetic disk devices are relatively large and therefore impair the portability of electronic cameras. Another example of a storage medium which need not be electrically backed up to hold the stored contents is a rewritable ROM, i.e., a flash ROM.

As described above, flash ROMs designed for BIOS have a large erase unit and a low compatibility with file systems but are readily obtainable because they are inexpensive. Therefore, if this type of flash ROMs can be applied to system files, it is possible to provide inexpensive, small-capacity, and small-sized recording media which do not require a power supply to hold the stored contents. This is convenient as a storage medium of an electronic camera.

SUMMARY OF THE INVENTION

It is an object of the present invention to provide a flash ROM management method and apparatus capable of making a flash ROM with a large erase unit compatible with a file system.

The present invention has been made in consideration of the above situation, and has as its object to provide a flash ROM management method and apparatus which can manage a data read•write unit (storage unit) smaller than an erase unit in a flash ROM and can therefore make a flash ROM with a large erase unit compatible with a file system.

When the above object is achieved, even a flash ROM designed for BIOS and having an erase unit of 64 KB can provide a file system with services similar to those provided by a hard disk.

To achieve the above object, a flash ROM management apparatus according to the present invention comprises access means for accessing a plurality of data areas and management areas corresponding to the data areas formed in a flash ROM, writing means for receiving a write instruction containing specification information which specifies a data write destination, writing data in one of the data areas, and writing the specification information in a management area corresponding to the data area, and reading means for receiving a read instruction containing specification information which specifies a data read source, retrieval-accessing a management area in which the specification information is stored, and reading out data stored in a data region corresponding to the retrieval-accessed management area.

Preferably, the management area stores state information indicating whether a corresponding data area is writable, and the writing means retrieval-accesses a management area whose state information indicates a writable state, writes the specification information in the retrieval-accessed management area, and writes data in a data area corresponding to the retrieval-accessed management area. When data in the flash ROM is updated, for example, the updated data can be written in an appropriate data area by checking the state information.

Preferably, the management area stores state information indicating one of at least three states, i.e., an unused state indicating that a corresponding data area is writable, a busy state indicating that data written in the data area is valid, and a used state indicating that the data written in the data area is invalid, and the writing means retrieval-accesses a management area whose state information indicates the unused state, writes the specification information and data in the retrieval-accessed management area and a corresponding data area, respectively, and changes the state information of the management area to the busy state. Since one of the three states, the busy, used, and unused states, is indicated for each data area, an area in which data can be written and an area in which valid data exists can be known by checking the state information. Consequently, the stored data in the flash ROM can be more appropriately managed.

Preferably, the writing means retrieval-accesses a management area having specification information contained in the write instruction and changes state information of the retrieval-accessed management area to the used state. When the contents of a data area specified by certain specification information are updated, it is possible to clearly show that the data is the one before the updating (i.e., unnecessary data). Consequently, appropriate storage management can be performed.

Preferably, the apparatus further comprises moving means for retrieval-accessing all management areas whose state information indicates the busy state in an erase block as an erase unit of the flash ROM and moving contents of the retrieval-accessed management areas and corresponding data areas to the outside of the erase block, and erasing means for erasing the erase block after the execution of the moving means. Consequently, a data area in the used state in which data is made invalid by, e.g., updating of the data, can be changed into a writable unused data area. This improves the utilization of the flash ROM.

Preferably, a moving destination of the contents of the management area and the data area which are to be moved by the moving means is another erase block in the flash ROM. Since data is moved inside the flash ROM, the data is safely held even if the power supply is turned off.

Preferably, the moving means determines the moving destination as a random access memory when no writable data area exists in other erase blocks of the flash ROM. Even when all data areas in the flash ROM are busy or already used, an unused data area can be formed in the flash ROM. As a consequence, the flash ROM can be efficiently used.

Preferably, a moving destination of the contents of the management area and the data area which are to be moved by the moving means is a random access memory. This is so because data can be moved rapidly.

Preferably, the management area and the corresponding data area exist in the same erase block of the flash ROM. This is because a management area and a corresponding data area can be simultaneously erased.

Preferably, the apparatus further comprises control means for evaluating a storage efficiency of the flash ROM and controlling the execution of the moving means and the erasing means on the basis of the evaluation result. As a consequence, the erase processing for forming an unused area can be executed at a proper timing.

Preferably, the control means evaluates the storage efficiency by comparing a size of management areas whose state information indicates the used state with a size of management areas whose state information indicates the unused state. This allows very easy and appropriate evaluation of the storage efficiency.

Preferably, the writing means starts writing data in the flash ROM and at the same time transfers the control of a CPU to another processing. This is because a data write operation to the flash ROM requires a predetermined time, and this write time can be allocated to another processing.

Preferably, prior to writing data in the flash ROM, the writing means checks whether the previous data write operation to the flash ROM is completed.

As described above, to update data stored in a flash ROM, the data is written in another data area because data cannot be overwritten in a flash ROM. As a result, the data before the updating becomes invalid, and the utilization of a flash ROM decreases due to accumulation of these invalid data. Therefore, to manage access to a flash ROM adapted to a file system, it is essential to erase invalid data in the flash ROM.

As described above, to manage and apply a flash ROM having a large erase unit to a file system, it is essential to execute an erase operation in the erase unit. To perform this erase operation, valid data in the erase unit must be retained. As a method of retaining data, it is possible to move the data to the outside of the erase unit. The method is required to have a high processing speed as well as the safety of the retained data.

It is, therefore, another object of the present invention to provide a flash ROM management method and apparatus capable of highly safely and rapidly retaining valid data existing in an erase unit to be erased.

To achieve the above object, a flash ROM management apparatus comprises managing means for forming a plurality of storage blocks each consisting of a data area and a management area corresponding to the data area in a flash ROM, storing state information indicating a storage state of the data area of each storage block in the management area of the storage block, and managing access to the flash ROM on the basis of the state information, first erasing means for extracting, from one erase block of the flash ROM, on the basis of the state information, a storage block in which valid data exists in the data area, moving contents of the extracted storage block to a random access memory, and erasing the erase block, second erasing means for extracting, from a plurality of erase blocks, on the basis of the state information, storage blocks in which valid data exists in the data area, moving contents of the extracted storage blocks to the random access memory, and erasing the erase blocks, and executing means for selecting one of the first erasing means and the second erasing means and executing the erase operation on the basis of the type of power supply of an apparatus into which the flash ROM is incorporated.

Preferably, the first erasing means has another erase block of the flash ROM and a random access memory as a moving destination to which the contents of the storage block containing valid data in one erase block are moved, and preferentially selects another erase block of the flash ROM. This is because the safety is further increased by moving the contents of a storage block to the flash ROM.

Preferably, the executing means uses the first erasing means when the power supply is a battery and uses the second erasing means when the power supply is an AC adaptor. When the power supply is a battery, there is the possibility that the supply of power is cut off due to, e.g., removal of the battery. Accordingly, the safety is assigned priority by saving data to a random access memory as seldom as possible. When the power is supplied by an AC adaptor, data in a plurality of erase units is saved to a random access memory, and these erase units are erased. This gives priority to the rapidness and the efficiency of the erase processing.

If an erase unit to be erased is chosen on the basis of only the amount of invalid data in the erase unit, erase units are not evenly erased. This unevenness varies the service lives of the erase units.

It is, therefore, still another object of the present invention to provide a flash ROM management method and apparatus and a computer control apparatus capable of reducing variations in the erase counts in erase units in a management system by which a flash ROM can be adapted to a file system.

To achieve the above object of the present invention, a flash ROM management apparatus comprises managing means for forming a plurality of storage blocks each consisting of a data area and a management area corresponding to the data area in a flash ROM, storing state information indicating a storage state of the data area of each storage block in the management area of the storage block, and managing access to the flash ROM on the basis of the state information, erasing means for extracting, from an erase block of the flash ROM, on the basis of the state information, a storage block in which valid data exists in the data area, moving contents of the extracted storage block, and erasing the erase block, count means for counting the number of erase operations performed by the erasing means as an erase count and storing the erase count in a storage area of an erase block, and determining means for determining an erase block to be erased by the erasing means on the basis of the erase count.

Preferably, the determining means determines, as an object to be erased, an erase block having a small erase count of erase blocks containing invalid data. When an erase block containing invalid data and having a small erase count is preferentially erased, the erase counts of erase blocks can be dispersed. As a consequence, the rewrite durability can be dispersed.

As described above, in storage management by which a flash ROM is adapted to a file system, invalid data stored in the flash ROM must be erased. Accordingly, it is important to check whether data stored in a flash ROM is invalid data.

In general file systems, however, no processing is performed to actively release sectors in which data is made invalid by, e.g., erasure of files. In management of a flash ROM, the storage efficiency is maintained by erasing invalid data. Therefore, leaving invalid data unerased in a file system is unpreferable.

It is, therefore, still another object of the present invention to provide a flash ROM management method and apparatus and a computer control apparatus capable of releasing storage blocks equivalent to sectors and thereby efficiently erasing invalid data in a management system by which a flash ROM can be adapted to a file system.

It is still another object of the present invention to make it possible to detect a storage block in which data is to be invalidated on the basis of the contents of access from a file system to a flash ROM and discard (invalidate) the data in the storage block.

To achieve the above objects, a flash ROM management apparatus according to the present invention comprises managing means for forming a plurality of storage blocks each consisting of a data area and a management area corresponding to the data area in a flash ROM, storing state information indicating a storage state of the data area of each storage block in the management area of the storage block, and managing access to the flash ROM on the basis of the state information, and discarding means for discarding data stored in a designated storage block by updating the state information stored in the management area of the storage block to information indicating that the data in the storage block is invalid.

Preferably, the apparatus further comprises detecting means for detecting a storage block made unnecessary by access to the flash ROM, and the discarding means updates the state information of a storage block detected by the detecting means to information indicating that data in the storage block is invalid. Consequently, a storage block to be discarded can be automatically detected and discarded.

A data write or erase operation to a flash ROM is very-time-consuming processing with respect to the operating speed of a CPU. Accordingly, some countermeasure is necessary when access to a flash ROM is managed in multitask processing in which a plurality of tasks are executed in parallel.

It is, therefore, still another object of the present invention to provide a flash ROM management method and apparatus and a computer control apparatus capable of suitably applying a management system by which a flash ROM can be adapted to a file system to a multitask system.

It is still another object of the present invention to provide a flash ROM management method and apparatus which allow a plurality of tasks to efficiently perform write operations to a plurality of flash ROMs.

It is still another object of the present invention to make it possible to perform preprocessing of improving the processing speed of erase processing by using a task with a low priority.

To achieve the above objects, a flash ROM management apparatus according to the present invention is a flash ROM management apparatus in a system in which a plurality of tasks are executed in parallel, comprising managing means for forming a plurality of storage blocks each consisting of a data area and a management area corresponding to the data area in a flash ROM, storing state information indicating a storage state of the data area of each storage block in the management area of the storage block, and managing access to the flash ROM on the basis of the state information, and excluding means for inhibiting, when one of the storage blocks is accessed by one of the tasks, access from other tasks to the accessed storage block.

Preferably, the managing means retrieval-accesses an unused storage block and writes data in the retrieval-accessed storage block when access to the flash ROM is a data write operation, and the excluding means inhibits other tasks from retrieval-accessing unused storage blocks while the managing means is retrieval-accessing the unused storage block. This can prevent the same storage block from being retrieval-accessed by a plurality of tasks.

To achieve the above objects, a flash ROM management apparatus according to the present invention is a flash ROM management apparatus in a system capable of executing a plurality of tasks in parallel in accordance with priorities of the tasks, comprising managing means for forming a plurality of storage blocks each consisting of a data area and a management area corresponding to the data area in a flash ROM, storing state information indicating a storage state of the data area of each storage block in the management area of the storage block, and managing access to the flash ROM on the basis of the state information, preprocessing means for performing preprocessing of improving an erase speed for a storage block whose state information indicates invalid data, and executing means for executing the preprocessing means by assigning the execution to a task having a low priority of the plurality of tasks.

A data write or erase operation to a flash ROM is very-time-consuming processing with respect to the operating speed of a CPU. In addition, as described above, updating of data in a flash ROM accumulates unnecessary (invalid) data in the flash ROM. This decreases the utilization of the flash ROM.

It is, therefore, still another object of the present invention to provide a flash ROM management method and apparatus and a computer control apparatus in which information whose contents are frequently rewritten is stored in a cache memory to decrease the number of write operations to a flash ROM and reduce the increase in invalid data in the flash ROM.

To achieve the above object, a flash ROM management apparatus according to the present invention comprises managing means for forming a plurality of storage blocks each consisting of a data area and a management area corresponding to the data area in a flash ROM, storing state information indicating a storage state of the data area of each storage block in the management area of the storage block, and managing access to the flash ROM on the basis of the state information, first determining means for determining whether the storage block contains predetermined information to be buffered by using a cache, and buffer means for performing buffering for caching in units of storage blocks for the storage blocks determined by the first determining means to require buffering.

Preferably, the predetermined information is information which a file system uses to access the flash ROM. For example, information such as FAT data which a file system uses to access the flash ROM is frequently rewritten. Accordingly, when this information is cached it is possible to provide a cache having a high hit rate with a limited cache capacity.

Preferably, the buffer means manages the storage of the storage blocks by managing storage positions in units of storage blocks by using a one-way linear list structure. This is so because the internal data structure of the cache is simplified.

Preferably, the apparatus further comprises second determining means for determining, when the flash ROM is accessed, whether an accessed storage block contains the predetermined information. In this apparatus, when the second determining means determines that a storage block containing the predetermined information is accessed, the buffered contents of the buffer means are accessed. Since a storage block containing predetermined information is cached, the buffered contents (cached contents) are accessed when the storage block having the predetermined information is accessed.

As described above, the contents of a flash ROM can be erased only in an erase unit. Accordingly, to update data in a storage block in a flash ROM, the data in the storage block before the updating is invalidated, and the updated data is written in another block. As a consequence, invalid data accumulates in the flash ROM to decrease the utilization of the flash ROM. To prevent an event like this from occurring, it is necessary to save valid data in an erase block in which invalid data exists and then erase the erase unit, thereby rearranging the flash ROM.

While unused storage blocks exist in a flash ROM, updated data can be written in these unused storage blocks. However, if unused storage blocks are used up, a very large number of write operations take place to update data in one storage block. That is, if updating of data occurs in a storage block with no unused storage block being present, it is necessary to save all storage blocks in the erase unit, erase the erase unit, write all storage blocks, except the storage block in which the data updating has occurred, back into the flash ROM, and write the updated contents of the storage block in which the data updating has occurred. This significantly decreases the efficiency.

It is, therefore, still another object of the present invention to provide a flash ROM management method and apparatus and a computer control apparatus capable of preventing a decrease in the storage efficiency by preparing extra areas in addition to the total capacity of areas to be accessed to perform data read and write operations in a flash ROM.

To achieve the above object, a flash ROM management apparatus according to the present invention comprises managing means for forming a plurality of storage blocks each consisting of a data area and a management area corresponding to the data area in a flash ROM, storing state information indicating a storage state of the data area of each storage block in the management area of the storage block, and managing access to the flash ROM on the basis of the state information, saving means for extracting, from an erase block of the flash ROM, by referring to the state information in the management area, a storage block in which data in the data area is valid, and saving contents of the extracted storage block to the outside of the erase block, erasing means for erasing the erase block after the saving means has saved all storage blocks containing valid data in the erase block, and extra storage blocks in addition to the storage blocks to be accessed by the managing means.

Preferably, the storage area has a size of at least one erase block of the flash ROM. Consequently, unused areas corresponding to at least one erase block can be constantly reserved by the erase operation done by the erasing means.

It is still another object of the present invention to provide an IC card apparatus capable of managing a data read•write unit (storage unit) smaller than an erase unit in a flash ROM incorporated in an IC card and thereby adapting a flash ROM with a large erase unit to a file system.

When this object is achieved, it is possible to provide services similar to those provided by a hard disk by using an IC card incorporating a flash ROM designed for, e.g., BIOS, and having an erase unit of 64 KB.

To achieve the above object, an IC card apparatus according to the present invention which is attached to a host apparatus and to which a data write/read operation can be performed in accordance with a request from the host apparatus, comprises a flash ROM managed by forming a plurality of data areas and management areas corresponding to the data areas in the flash ROM, writing means for receiving from the host apparatus a write instruction containing specification information which specifies a data write destination, writing data in one of the data areas, and writing the specification information in a management area corresponding to the data area, and reading means for receiving from the host apparatus a read instruction containing specification information which specifies a data read source, retrieval-accessing a management area in which the specification information is stored, and reading out data stored in a data region corresponding to the retrieval-accessed management area.

Preferably, a connecting portion to be attached to the host apparatus has compatibility with an interface for an external storage of the host apparatus, and the IC card apparatus further comprises interpreting means for interpreting various commands for an external storage of the host apparatus. This allows the file system of the host apparatus to access the IC card.

It is still another object of the present invention to provide an electronic camera capable of adapting a flash ROM with a large erase unit to a file system.

To achieve the above object, an electronic camera of the present invention for storing data in a flash ROM comprises a plurality of data areas and management areas corresponding to the data areas formed in the flash ROM, writing means for receiving a write instruction containing specification information which specifies a data write destination, writing data in one of the data areas, and writing the specification information in a management area corresponding to the data area, and reading means for receiving a read instruction containing specification information which specifies a data read source, retrieval-accessing a management area in which the specification information is stored, and reading out data stored in a data region corresponding to the retrieval-accessed management area.

Preferably, the camera further comprises timer means for performing self-timer photography, and the moving means and the erasing means are executed while the timer means is measuring a time. Since the moving means and the erasing means are executed during self-timer photography, the flash ROM can be rearranged without interfering with the operation of the electronic camera.

Preferably, the camera further comprises power supply managing means for managing the use of a power supply, and the power supply managing means allocates power of a power supply, which is used to perform at least one of charging of an electronic flash, driving of a mechanical portion, and driving of a CCD, to write access to the flash ROM. Since the power supply used to charge an electronic flash, drive a mechanical portion, or drive a CCD can be used to perform write access to the flash ROM, it is no longer necessary to prepare a dedicated power supply for a write operation to the flash ROM.

The power supply managing means time-divisionally allocates power supplied from the power supply to charging of an electronic flash, driving of a mechanical portion, driving of a CCD, and write access to the flash ROM. Since the power supply is time-divisionally allocated, the power supply can always be obtained after a short holding time. Consequently, various processing activities can be smoothly executed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing a declare statement in which a device driver management block is described in C language;

FIG. 4 is a view showing an example of a sector structure in a flash ROM;

FIGS. 5A, 5B, and 5C are views showing a configuration which separately stores management area data and data areas;

FIG. 6 is a view showing meanings corresponding to the states of flags;

FIG. 15 is a view expressing in C language an operation procedure of confirming the completion of data write;

FIG. 16 is a view expressing in C language a program of managing a power supply such that the output capacity of a DC/DC converter is not exceeded;

FIG. 21 is a flow chart showing a procedure of destroying stored contents;

FIGS. 35A and 35B are views showing the allocation of IO addresses;

FIG. 36 is a flow chart for explaining a procedure of switching garbage collection processing on the basis of the type of power supply;

FIG. 37 is a flow chart showing a procedure of releasing unnecessary sectors when a file erase operation is designated by a file system;

FIG. 48 is a flow chart for explaining the time divisional use of a power supply resource (semaphore) in this embodiment.

DETAILED DESCRIPTION OF THE PREFERRED EMBODIMENTS

Preferred embodiments of the present invention will now be described in detail in accordance with the accompanying drawings.

[First Embodiment]

<Configuration of Camera System>

Figure 1:
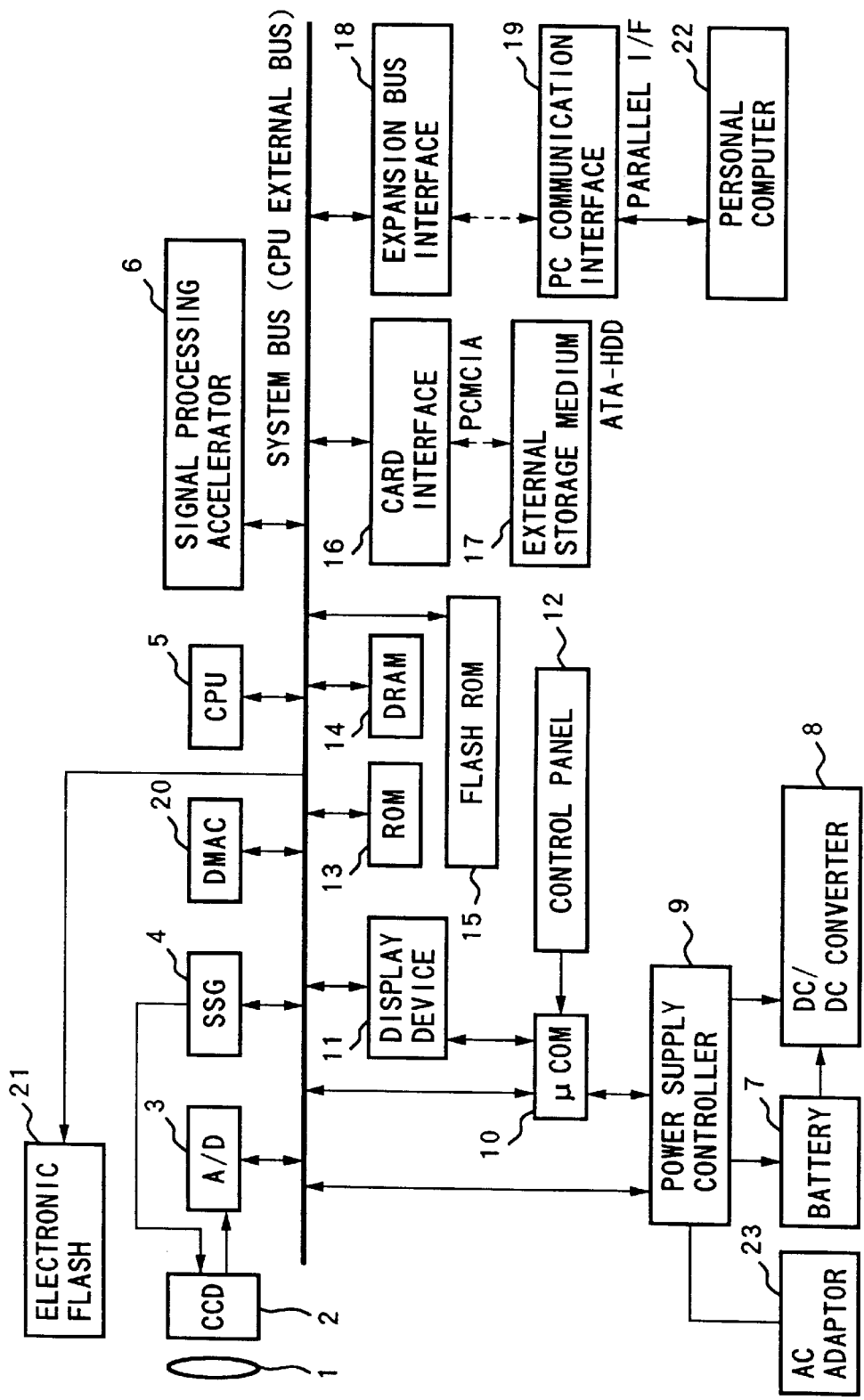
FIG. 1 is a block diagram showing the configuration of a camera system according to the first embodiment.

FIG. 1 is a block diagram showing the configuration of a camera system in the first embodiment. This camera system comprises an electronic camera, an external storage medium 17 which is detachable from the electronic camera, a PC communication interface 19, and a personal computer 22 connected to the electronic camera via the PC communication interface 19 so as to be able to communicate with the electronic camera.

A CCD unit 2 outputs light transmitted through a lens 1 as an electrical signal. An A/D converter 3 converts the analog signal from the CCD unit 2 into a digital signal. An SSG unit 4 supplies a sync signal to the CCD unit 2 and the A/D converter 3. A CPU 5 realizes various control operations in this camera system.

A signal processing accelerator 6 performs signal processing at a high speed. A DC/DC converter 8 supplies power from a battery 7 to the entire electronic camera. A power supply controller unit 9 controls the DC/DC converter 8. A microcomputer 10 controls panel operations, a display device, and the power supply. A display device 11 displays various information to the user. A liquid crystal panel is an example of the display device 11. A control panel 12 has a release switch that the user directly manipulates.

A ROM 13 stores a system program such as an OS. A DRAM 14 is the main memory of this electronic camera. A flash ROM 15 is used as an internal storage medium. Reference numeral 16 denotes an interface of a PCMCIA card; 17, the external storage medium described above such as an ATA hard disk; and 18, an expansion bus interface. The PC communication interface 19 is connected to, e.g., a personal computer, and exchanges data with the computer. Reference numeral 20 denotes a DMA controller; and 21, an electronic flash. The personal computer 22 communicates with the electronic camera via the PC communication interface 19.

<Photographing Operation>

The photographing operation of this electronic camera will be briefly described below. When the user depresses the release switch on the control panel 12, the CPU 5 detects the depression and starts a photographing sequence. Assume the following operation is entirely done under the control of the CPU 5.

When the release switch is depressed, the SSG unit 4 drives the CCD unit 2. An output analog signal from the CCD unit 2 is converted into a digital signal by the A/D converter 3. The output from the A/D converter 3 is DMA-transferred to the DRAM 14 by the DMA controller 20. When one frame is completely DMA-transferred, the CPU 5 starts a signal processing sequence.

In this signal processing sequence, a signal processing program is read out from the flash ROM 15 into the main memory (DRAM 14), and the signal processing is performed by transferring the data in the main memory to the signal processing accelerator 6. However, the signal processing accelerator 6 does not perform the whole signal processing. That is, the signal processing accelerator 6 is an arithmetic circuit which aids particularly time-consuming processing done by the CPU 5 and operates in association with the processing software of the CPU 5. When the signal processing is partly or entirely completed, the result is recorded as an image file in the flash ROM 15. If the file format to be recorded requires compression, the compression is also performed.

The signal processing program is one of files managed by a file system in the flash ROM 15. Programs of the camera are stored together with the OS and the file system in the ROM 13. The camera programs identify a file having a specific file name as a program.

The CPU 5 cannot directly execute the control program in the flash ROM 15 since files are discontinuously allocated in the flash ROM 15 and the file system of this embodiment frequently relocates these files. Accordingly, the control program must be read out into the main memory (DRAM 14) before being executed. Additionally, a memory manager dynamically allocates storage locations in the main memory. Therefore, the control program cannot be software supposed to be stored at a specific address. For these reasons, a file of the program for performing the signal processing in this embodiment has a format as shown in FIG. 41.

Figures 41, 42, 43:
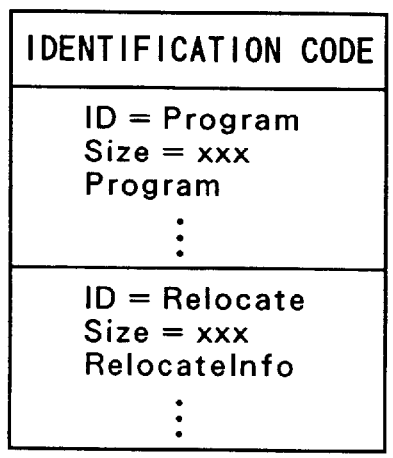
FIG. 41 is a view for explaining the way a control program is stored in the flash ROM in this embodiment.
FIG. 42 is a view showing an example of a program code expressed by relative addresses.
FIG. 43 is a view showing a table for storing data of relocation information records shown in FIG. 42.

FIG. 41 is a view for explaining the way the control program is stored in the flash ROM 15 in this embodiment. In FIG. 41, an identification code is used to show that this file is a program. The file is expressed as a set of variable-length records. In each record, an ID for identifying the type of information stored in the record is first stored, and then a value indicating the size of the record is stored.

A program record and a relocation information record are stored in the file. The program code is, for example, data as shown in FIG. 42. FIG. 42 is a view showing an example of a program code expressed by relative addresses. In FIG. 42, a jump instruction exists at address 0050 and the CPU recognizes this instruction as a jump instruction to an absolute address. An operand of this instruction is expressed by a relative address.

Data of the relocation information record shown in FIG. 42 is stored in a format as shown in FIG. 43. That is, of the program shown in FIG. 42, an address table indicating program addresses of data (expressed by relative addresses) to be converted into absolute addresses is stored as the relocation information.

Figures 44, 45:
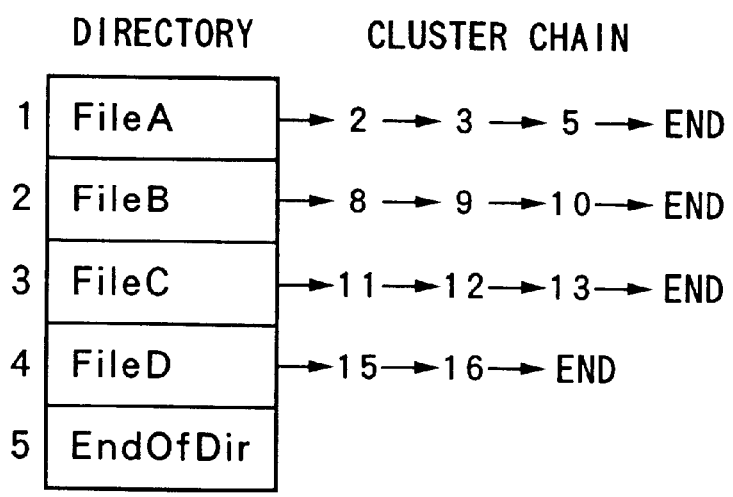
FIG. 44 is a view showing a program code when the program shown in FIG. 41 is mapped to address 8710 of the main memory.
FIG. 45 is a view showing the characteristic feature of a directory slot.

After an area for loading the file shown in FIG. 41 into the main memory is reserved, the memory manager of the OS in the ROM 13 determines an address. This allocation by the memory manager is a function equivalent to an alloc function in C language. If the memory manager allocates address 8710 to the program, the program is loaded as shown in FIG. 44. FIG. 44 is a view showing a program code when the program shown in FIG. 41 is mapped to address 8710 of the main memory. The operand of the jump instruction is replaced with an actual absolute address. The ROM 13 stores a program for reading out a program into the main memory while converting an operand into a real address.

With the above configuration, signal processing software and compression software can be stored in the form of files into the storage medium. Consequently, after being delivered to the final user, the camera can control various file formats such as new signal processing algorithms, BMP and TIFF formats of Windows (trademark), and any possible formats in the future.

As described above, the electronic camera of the first embodiment files photographed images into the flash ROM 15.

<Device Driver Interface>

Figure 2:
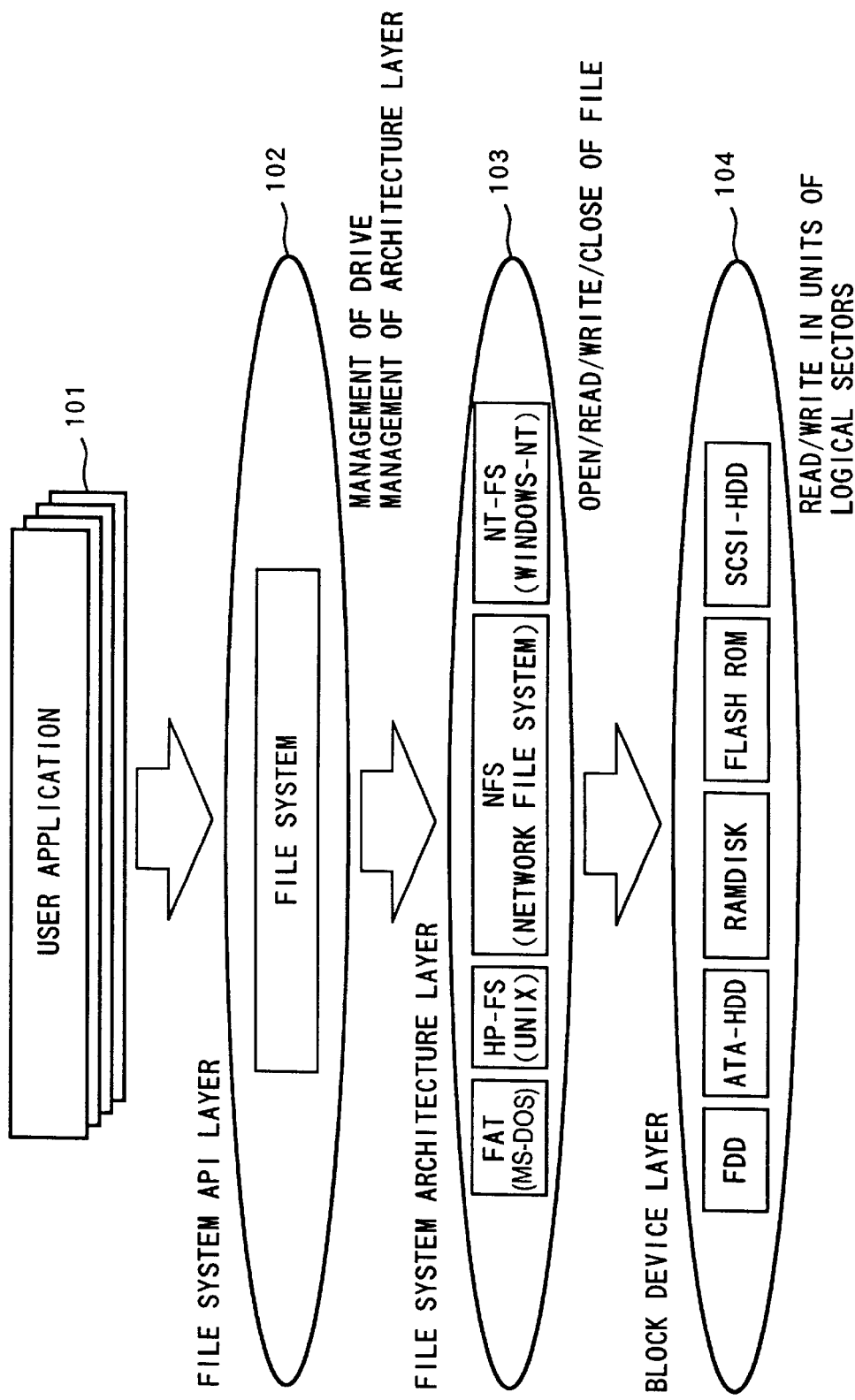
FIG. 2 is a view showing the hierarchical structure of a file system in an electronic camera of this embodiment.

FIG. 2 is a view showing the hierarchical structure of the file system in the electronic camera of this embodiment. The uppermost layer is a user application 101. The user application 101 is software operating inside the electronic camera. This software opens a file by its file name, reads or writes the file, and closes the file.

A file system API layer 102 is directly called by a function call from the user application 101. This file system API layer 102 manages drive names in relation to the file system. Since a file system architecture layer (to be described later) can be mounted in each drive, a plurality of file system architectures can be simultaneously used.

A file system architecture layer 103 performs actual file management. The lowermost layer is a block device layer 104. The file system architecture 103 accomplishes file input and output by using services provided by the block device layer 104. This block device layer 104 manages data in units of sectors, and one sector has, e.g., 512 bytes. The block device layer 104 absorbs the difference between input and output control operations of devices and the difference between parameters of heads or cylinders. With this configuration, a plurality of different devices can be simultaneously used.

The characteristic feature of the electronic camera of this embodiment is a memory management method of the flash ROM in the block device layer 104.

Various types of flash ROMs are available as the flash ROM 15 shown in FIG. 1 and roughly classified into those developed for flash disks and those developed for BIOSs of personal computers. The erase unit of the former flash ROM is 512 bytes which is a general erase unit of hard disks. Therefore, this flash ROM is highly compatible with a file system. The erase unit of the latter flash ROM is a large block unit, e.g., 64 KB. Also, some of flash ROMs of this type require a voltage of 12 V or higher as a write voltage as in the case of PROMS. However, flash ROMs of the latter type are readily obtainable because they are inexpensive. In this embodiment, a flash ROM having the characteristic features of the latter provides a file system with services analogous to those provided by hard disks.

<Flash ROM Driver Interface>

Generally, the block device provides the file system with the two services of (1) reading from a sector designated by a logical sector number, and (2) writing to a sector designated by a logical sector number.

If the block device additionally has a function of (3) releasing a sector designated by a logical sector number, the driver of the flash ROM can erase unnecessary sectors where necessary. Accordingly, data in the flash ROM can be efficiently erased.

The function (3) is unnecessary in common disks. In a system having a cache, however, released sectors can be positively deleted from a cache list by this function. Consequently, the hit rate of the cache can be increased. The file system informs the device driver of sectors which are made unnecessary by, e.g., an erase operation to files, by using the function (3). An erase operation to a flash ROM is very time-consuming, but this processing hardly consumes the CPU time. Therefore, the processing is preferably performed as background processing.

Although this will be also described in <FAT Cache> later, the cache of this embodiment discards the oldest data in a cache list when accessing new data (not existing in the cache). Moving unnecessary sectors to the bottom of the cache list (i.e., moving the oldest accessed data to the bottom of the cache) decreases the possibility that effective data is discarded from the cache. Especially in a system like a compiler which generates a large number of intermediate files, there is a high possibility that intermediate files to be erased remain in a cache. Therefore, the above cache management is very effective to increase the hit rate.

FIG. 3 is a view showing a declare statement describing the device driver management block in C language. Next in the structure is a ring pointer to the next device and used to retrieve the device from a memory. DevName is used as the name of the device. InitDev is a pointer to an initialization routine of the device. ShutDown is a pointer to a shut down routine of the device. ReadSector is a pointer to a routine which designates a logical sector and transfers the contents of a medium to a buffer. WriteSector is a pointer to a program which designates a logical sector and transfers (writes) the contents of a buffer to a medium. ReleaseSector is a pointer to a routine which designates a logical sector and releases the sector.

The file system uses device drivers via this structure. For hard disks or floppy disks, a pointer to a program which does not perform any work is substituted into ReleaseSector. Alternatively, a pointer which deletes a designated sector from a cache list of a disk cache can be substituted.

<Flash ROM Management Method>

A data write operation to the flash ROM is performed in units of sectors from the file system in the upper layer. FIG. 4 is a view showing an example of the sector structure of the flash ROM. In FIG. 4, reference numeral 151 denotes an erase block. This erase block 151 is a unit of erase and called a sector as a technical term of a flash ROM. However, in this embodiment, this sector is called an erase block to distinguish the sector from a "logical sector" which is a unit processed by the file system.

Referring to FIG. 4, a plurality of flash ROMs 15 are incorporated in the system, and each flash ROM 15 consists of a plurality of erase blocks 151. Each erase block 151 consists of an erase counter 152 and a plurality of sectors 153. The erase counter 152 counts the number of times the erase block 151 is erased. Each sector 153 has a management area and a data area. The management area includes a sector number 154 representing a logical sector number, a busy state flag 155 representing whether the sector is being effectively used, and a used state flag 156 representing that the use of the sector is completed. The data area has a 512-byte data portion 157.

The data area and the management area need not be arranged adjacent to each other. As shown in FIGS. 5A to 5C, these areas can also be separately managed. FIGS. 5A to 5C are views showing a configuration which separately stores the management area data and the data area. A sector number table stores the sector numbers 154 of the sectors 153. A flag table stores the busy state flags 155 and the used state flags 156. A data table stores the contents of the data portions 157. Although this data configuration is also possible, it is preferable that at least the management area and the corresponding data area be stored in the same erase block.

The system preferentially evaluates the "used state flag 156" rather than the "busy state flag 155". FIG. 6 is a view showing meanings corresponding to the states of flags. In FIG. 6, FALSE takes the same value as the state after an erase operation. Even when the busy state flag 155 is TRUE, data in the sector is invalid if the used state flag 156 is TRUE.

<Rewrite of Logical Sector in Flash ROM>

Like a PROM, to rewrite data in a flash ROM, it is necessary to once erase data and again write data. Additionally, a minimum erase unit is large (e.g., 64 KB) and an erase time is long (e.g., 1 sec). In this embodiment, therefore, when the file system in the upper layer is to rewrite a specific sector, the system moves a logical sector to an erased area. Consequently, data in the logical sector is apparently rewritten without performing any erase operation.

Figure 7:
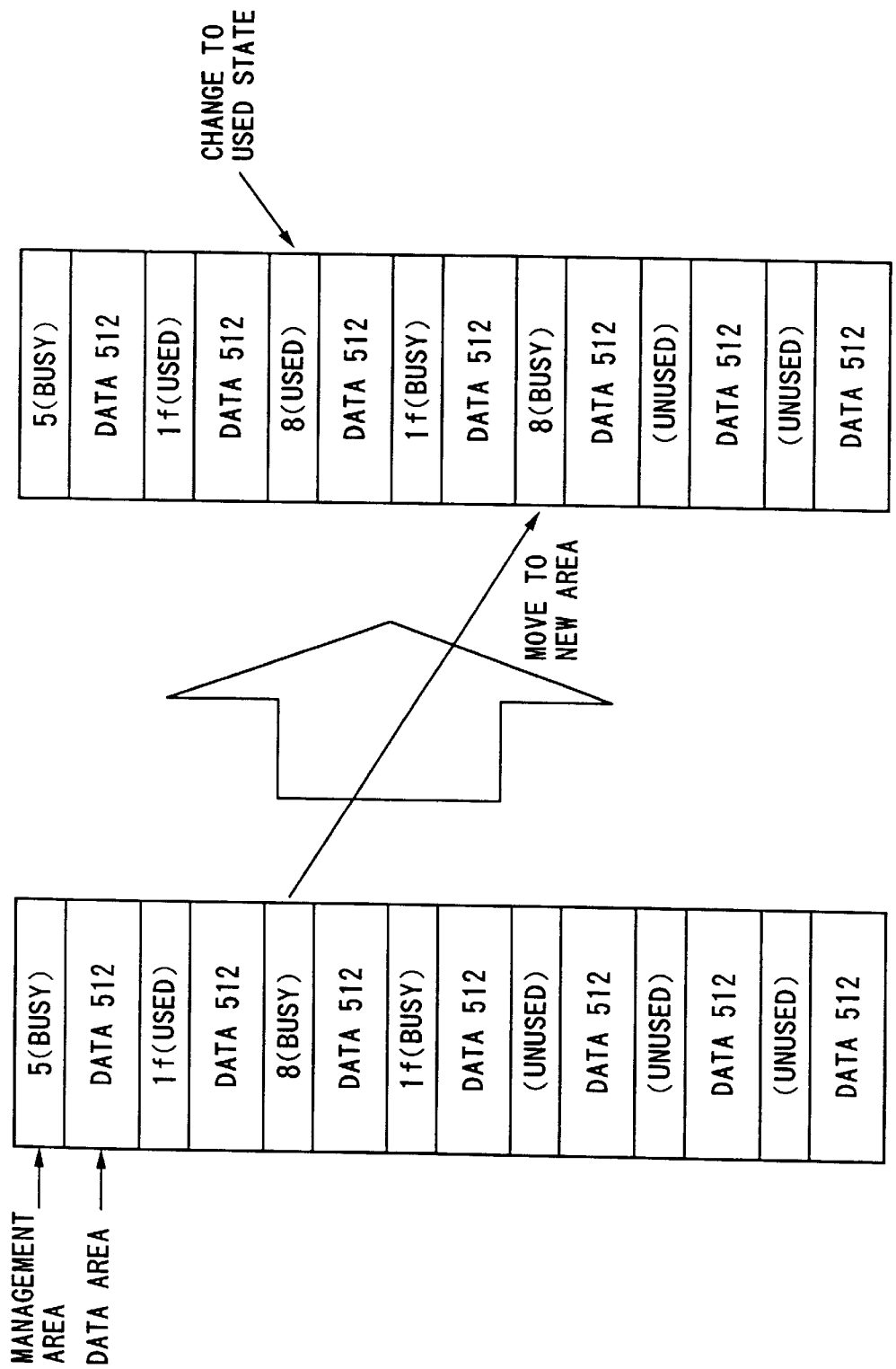
FIG. 7 is a view for explaining a procedure of rewriting a sector in the flash ROM.

FIG. 7 is a view for explaining a sector rewrite procedure. A rewrite operation to sector No. 8 (a sector whose logical sector number is 8) will be described in detail below with reference to FIG. 7. In FIG. 7, the left half indicates the state before the rewrite operation, and the right half indicates the state after the rewrite operation. Also, the numbers in the management areas indicate logical sector numbers, (busy) indicates the state in which the busy state flag 155 is TRUE and the used state flag 156 is FALSE, and (used) indicates the state in which both the busy state flag 155 and the used state flag 156 are TRUE. In addition, (unused) indicates the state in which both the busy state flag and the used state flag are FALSE. Note that the (unused) state is the state immediately after the sector is initialized, the (busy) state is the state in which valid data is written in the sector, and the (used) state is the state in which invalid data is written in the sector.

Data of sector No. 8 is stored in the location of "sector number 8 (busy)". Assume that sector No. 8 is being used as a part of a FAT or a file and the upper layer has generated a request to rewrite sector No. 8 in order to change the contents of the sector. When the rewrite request is generated, the device driver of the flash ROM searches the flash ROM for an unused sector. By using the searched location as a new location of sector No. 8, the device driver stores the sector number and the updated data and changes the busy state flag to TRUE. Subsequently, the device driver changes the used state flag of the sector previously used as sector No. 8 to TRUE. By this procedure, the data in sector No. 8 is rewritten.

<Garbage Collection>

Figure 8:
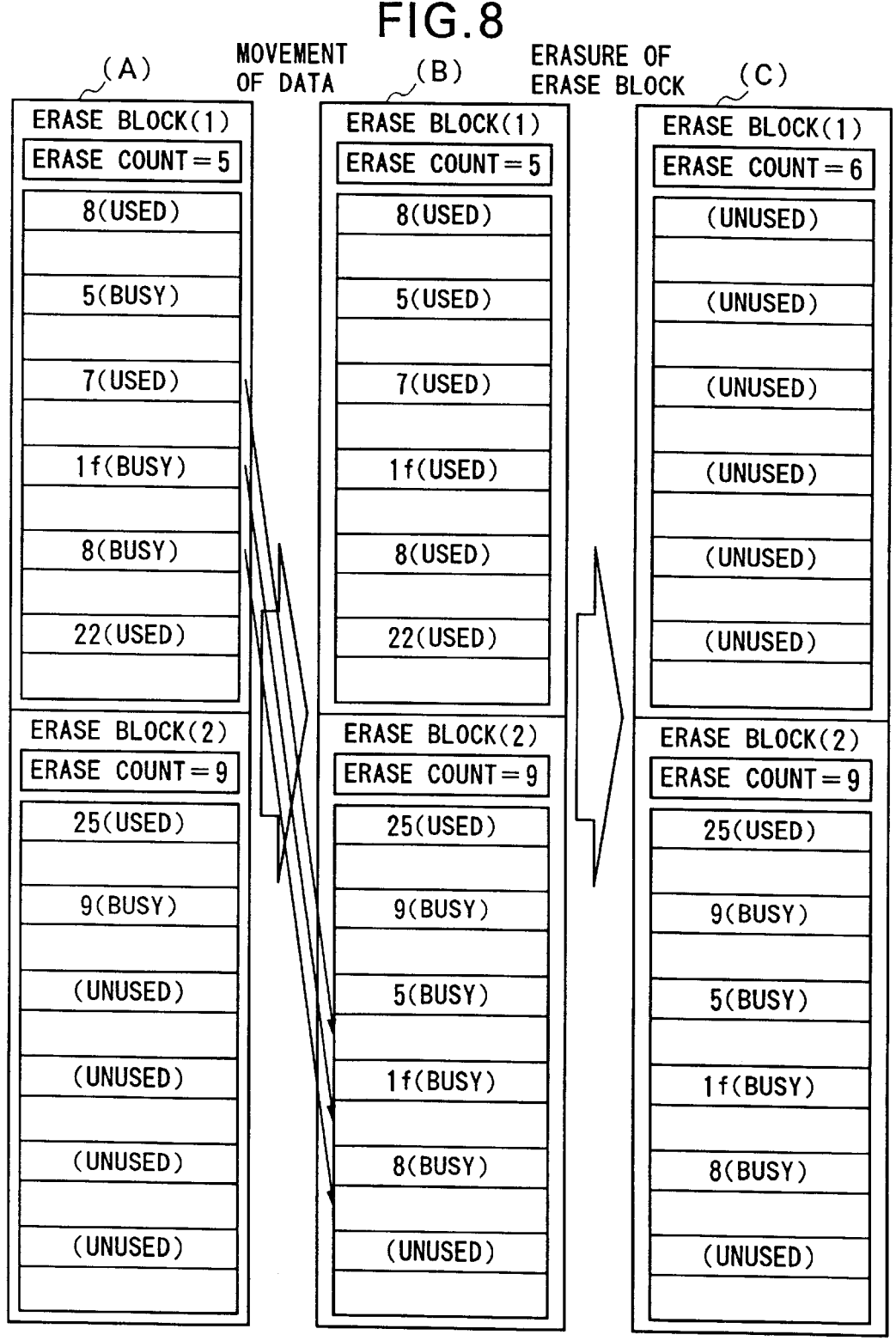
FIG. 8 is a view for explaining a garbage collecting operation of the flash ROM in this embodiment.

When logical sectors are kept rewritten by the above method, most areas in the flash ROM are turned into "used sectors" in due course. It is therefore necessary to once erase the data in the flash ROM at a certain timing to return "used sectors" to "unused sectors". A basic operation of garbage collection will be described below with reference to FIG. 8. FIG. 8 is a view for explaining the garbage collecting operation of the flash ROM in this embodiment.

Referring to FIG. 8, (A) indicates the state before garbage collection. To simplify the explanation, assume that the flash ROM of this embodiment is constituted by erase blocks each having six sectors. An erase block (1) has three used sectors and three busy sectors, and the erase count of the block is 5 (the content of the erase counter 152 is 5). An erase block (2) has one busy sector, one used sector, and four unused sectors, and the erase count of the sector is 9. From this state, garbage collection is started.

First, an erase block to be rearranged is chosen. This erase block to be rearranged is an erase block to be erased. The efficiency of rearrangement is improved when erase blocks having many used sectors are preferentially selected as erase blocks to be rearranged. However, erase blocks having smaller erase counts, except for those containing no used sectors, are preferentially selected as erase blocks to be rearranged, since erase blocks in the chip can be averagely used and the rewrite durability can be dispersed. Details of the selection procedure will be described later by using a flow chart.

Assume that the erase block (1) is chosen as an object of rearrangement. Busy sectors (in which the busy state flag is TRUE and the used state flag is FALSE) in the erase block (1) to be rearranged are moved to other erase blocks. A procedure of moving busy sectors is analogous to the sector rewrite operation. That is, unused sectors in other erase blocks are retrieval-accessed, the contents of the data areas and the management areas in the busy sectors are copied, and the used state flags in the busy sectors of the source of copying are changed to TRUE. Processing when there is no unused sector will be described later.

(B) in FIG. 8 indicates the state in which all busy sectors in the erase block (1) are moved to the erase block (2). Consequently, only used sectors exist in the erase block (1).

Subsequently, erase blocks having only used sectors are retrieval-accessed. This retrieval is performed because all sectors in an erase block can be accidentally used sectors when a common rewrite operation is performed. The retrieval-accessed blocks are then erased. Although the erase operation is time-consuming, a plurality of erase blocks are preferably erased, if possible, at once, since a plurality of erase blocks can be simultaneously erased. When the erase operation is completed, the value of the erase counter before the erase operation is incremented by one. In this way, the garbage collection is completed.

(C) in FIG. 8 indicates the state in which the garbage collection is completed. Since the efficiency is improved when erase blocks are simultaneously erased, it is preferable to simultaneously rearrange a large number of erase blocks as long as the blocks have used sectors and unused sectors. An erase block whose erase counter has a value extremely smaller than those of other erase blocks is rearranged even if the block has no used sector, because this disperses the rewrite durability. Dispersion of the rewrite durability is also triggered when rearrangement is once performed, since the arrangement of data is changed by the rearrangement.

<When There is No Unused Sector>

Figure 9:
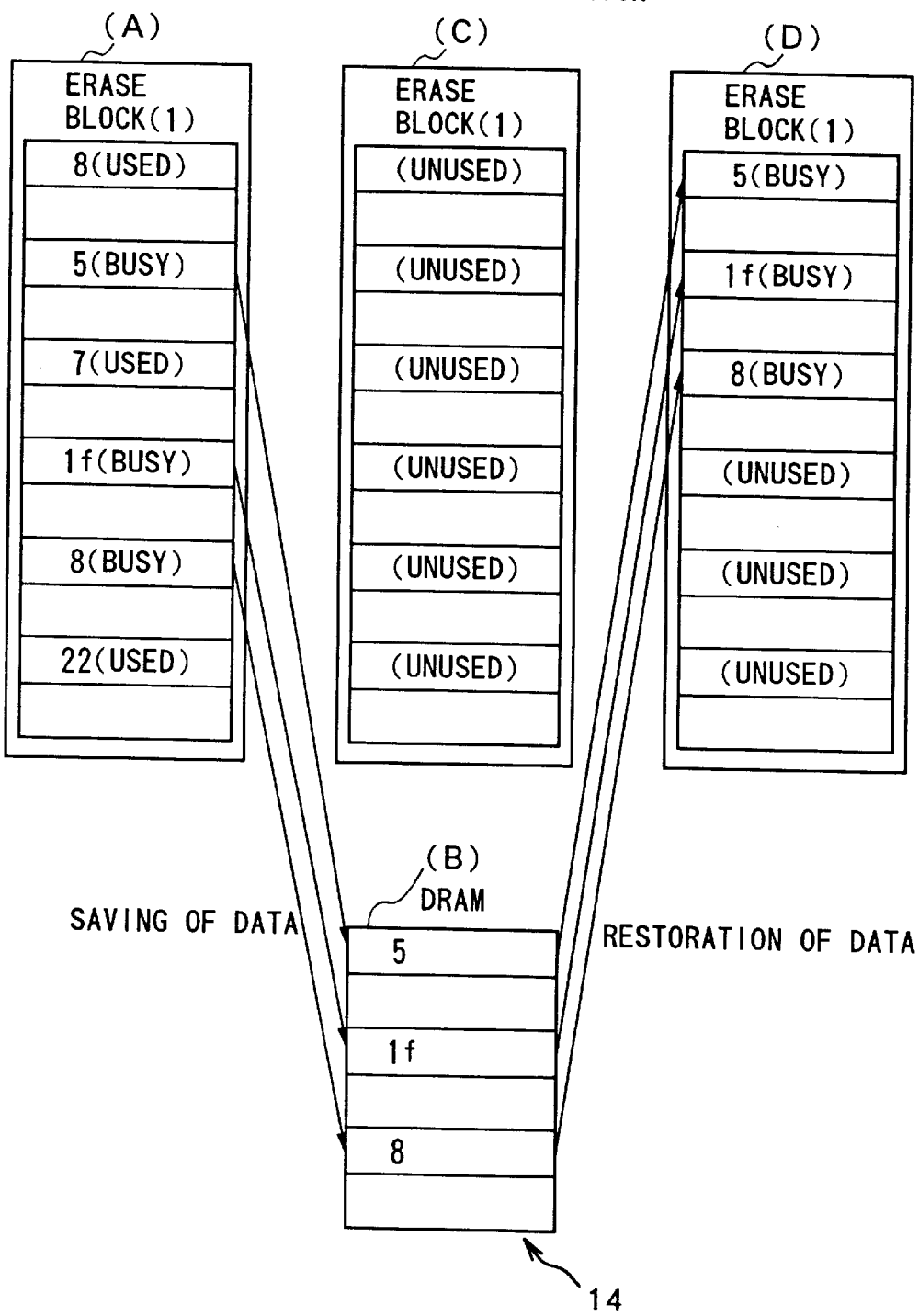
FIG. 9 is a view for explaining a garbage collecting operation when no unused sector exists.

A garbage collection procedure when no unused sectors exist although the system has used sectors will be described below with reference to FIG. 9. FIG. 9 is a view for explaining a garbage collecting operation when there is no unused sector.

First, in accordance with the basic garbage collection procedure described above, an erase block (1) is selected as an object to be rearranged. Unused sectors are retrieval-accessed to move busy sectors in the erase block (1). If unused sectors are found, sector movement is performed in the same manner as in the above basic garbage collection.

On the other hand, if no unused sectors are found by the retrieval, a memory block having a size necessary to save the data is allocated from a heap area of the DRAM 14. Subsequently, the used sectors in the erase block to be rearranged are copied to the DRAM 14. Unlike in sector movement to another area of the flash ROM, the used state flags in the original sectors are not changed to TRUE. This is because if an accident such as removal of the battery 7 from the electronic camera occurs at that time, the data in the DRAM disappears and this data cannot be restored. (B) in FIG. 9 indicates the sectors copied to the area in the DRAM 14. When all busy sectors in the erase block to be rearranged are saved, this erase block to be rearranged is chosen and erased ((C) in FIG. 9). After the erase operation, many unused sectors are present. Accordingly, unused areas are retrieval-accessed and the data saved in the DRAM 14 are restored. (D) in FIG. 9 indicates the state in which the garbage collection is completed.

Even when the garbage collection is done by the above procedure, data cannot be restored if an accident such as removal of the battery 7 from the electronic camera occurs from the erasure of the erase block to the restoration of the data. That is, to maintain the safety of the system, the method of saving sector data to the DRAM 14 is preferably performed as rarely as possible. Unused sectors can be used once garbage collection is performed by using the DRAM. Therefore, garbage collection is performed once by using the DRAM 14, and then normal garbage collection is performed. Although this processing is time-consuming, the safety can be improved. In contrast, if data is positively saved to the DRAM 14 (e.g., if data is saved as long as there is a heap area), the efficiency can be improved because the number of erase blocks which can be rearranged at the same time is increased. Accordingly, the system can also be designed so that the user can specify which of the safety and the efficiency is given priority. Alternatively, the priorities can be automatically switched such that the safety is given priority when the system is powered by the battery 7 and the efficiency is given priority when the power is supplied from an AC adaptor. This processing will be described in detail later with reference to FIG. 36.

<Preparation of One Extra Erase Block>

When the remaining capacity becomes very small, garbage collection frequently occurs and this extremely degrades the performance of the system. This event can be avoided by using one extra erase block in addition to erase blocks capable of containing all logical sectors. Assume that one erase block can store 127 sectors. When all sectors are busy and one sector is to be rewritten 10 times, an erase operation is performed 10 times and a write operation is performed for 1270 sectors if there is no extra erase block. However, if one extra erase block is prepared, a write operation is performed for only 10 sectors.

In this embodiment, the number of erase blocks is determined by the configuration of the chip. Therefore, the number of total logical sectors is so designed as to prepare at least one extra erase block.

<Timing of Garbage Collection>

Garbage collection is very time-consuming because an erase operation is also performed. Therefore, the timing of garbage collection determines the convenience of the camera. For example, the user does not feel any stress if garbage collection is performed when no photography is performed for a few seconds such as when photography is performed using a self-timer.

<Management of Storage Locations in RAM>

Since sector numbers and actual storage locations have no relation in the flash ROM 15, the flash ROM 15 must be searched to read- or write-access to a specific sector. Therefore, when the system is rebooted a storage location management table indicating the storage address of each sector in the flash ROM 15 is formed in the DRAM 14. This realizes a high-speed data read/write operation to the flash ROM 15. Once the storage location management table is formed, this table can be correctly maintained simply by updating a storage position in the table only when the storage location is changed due to a sector write operation to the flash ROM 15 or garbage collection.

Figure 10:
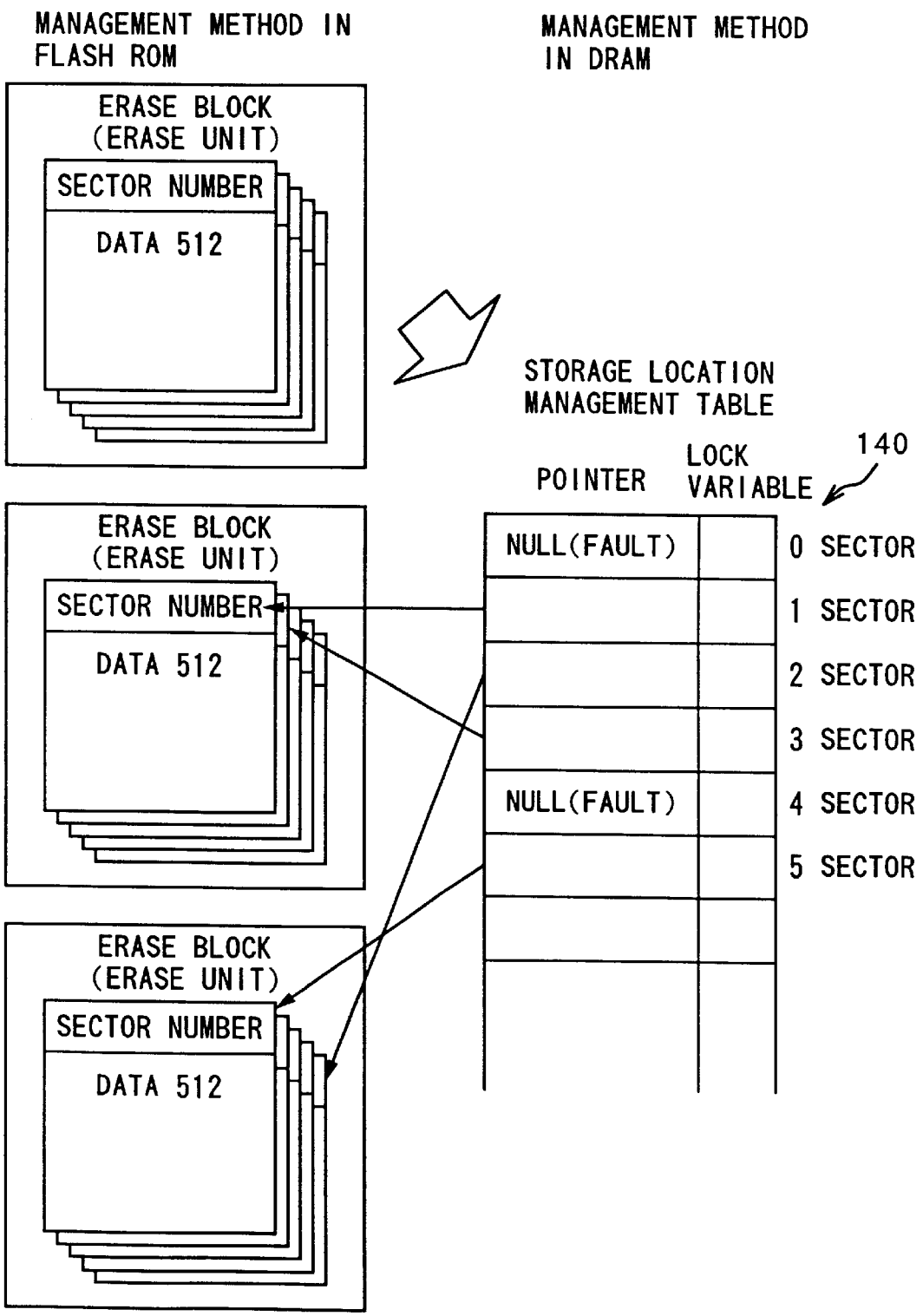
FIG. 10 is a view for explaining a storage location management table formed in a DRAM.

FIG. 10 is a view for explaining the storage location management table formed in the DRAM. In FIG. 10, the right half indicates a storage location management table 140 formed in the RAM. Sectors 0 and 4 contain a value (NULL) which means a storage location fault. The sectors 0 and 4 are sectors in which nothing is written after formatting or sectors released by the file system.

When the file system outputs to the driver an instruction of releasing a sector made unnecessary by file erasure or the like, the device driver operates as follows. First, the driver refers to the pointer of the designated sector in the storage location management table 140 in the DRAM 14 and searches the flash ROM 15 for the corresponding sector currently being used. The driver then changes the used state flag of the sector to TRUE and substitutes the fault value (NULL) into the pointer of the designated sector in the storage location management table 140 in the DRAM 14.

If the contents of the sector are saved to the DRAM 14 to perform garbage collection, a pointer to the DRAM is substituted as the storage location. It is also desirable that the table contain a lock variable for inhibiting simultaneous operations for the same logical sector.

<File Restoration by MS-DOS>

It is convenient if this electronic camera and the personal computer 22 can exchange data in their respective storage media. By using the flash ROM management method explained in this embodiment, a file system compatible with MS-DOS (trademark) presently widely used in personal computers can be obtained. MS-DOS includes a utility which restores once erased files. In this embodiment, however, the data portion of an erased sector is discarded in order to improve the erase efficiency of the flash ROM. That is, in this embodiment, a medium erased by the camera cannot be restored by the personal computer in principle.

This accident can be avoided if it is possible to inhibit the file restore function in the personal computer. In this embodiment, the file restore function is inhibited by destroying data that MS-DOS uses to restore files. This will be described in detail below.

In MS-DOS (trademark), an empty slot is formed in a directory when a file is erased. A directory stores information such as file name/time stamp/first cluster. FIG. 45 is a view showing the characteristic feature of the directory slot. EndOfDir indicating the end of a list is stored at the end of the directory slot.

Figure 46:
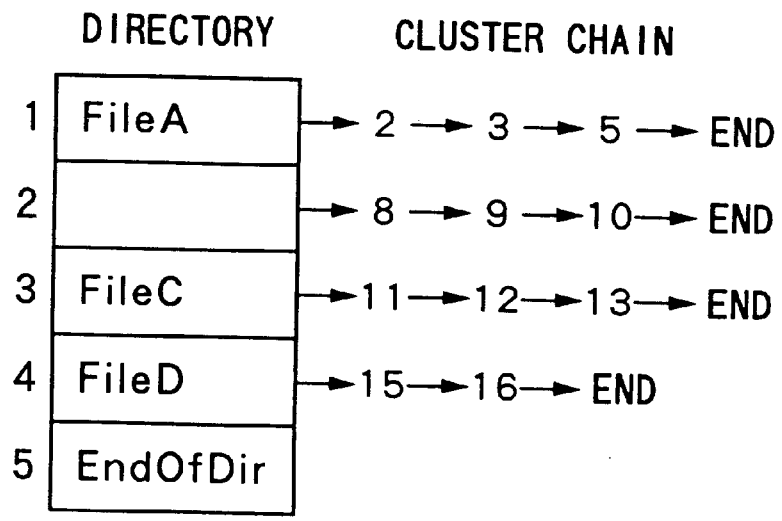
FIG. 46 is a view showing the state in which File B is deleted from the directory slot shown in FIG. 45.

When File B is deleted, the leading position of the file name is replaced with a symbol indicating deletion, and the cluster chain of the FAT is erased. This is shown in FIG. 46.

An undelete program attempts to restore the files on the basis of the information remaining in the second slot. If this information does not exist, restoration of the files can be prevented.

Figure 47:
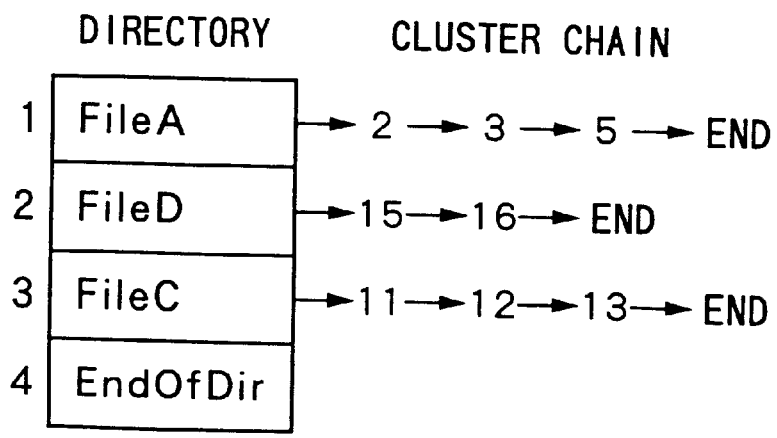
FIG. 47 is a view showing the state in which a file is erased by the DOS-compatible file system of this embodiment.

FIG. 47 illustrates the state after files are erased by the DOS-compatible file system of this embodiment. In this embodiment, a file stored at the end of a directory entry table is overwritten in the entry of an erased file, and EndofDir is overwritten in the portion of the directory entry table where the last file existed. In this manner, it is possible to prevent the file restore function from restoring files.

There is another method by which data in sectors is left unerased (no sectors are released) when files are erased as in the case of the MS-DOS, and unnecessary portions are simultaneously erased while referring to the relationship between the FAT and the data when garbage collection is performed.

<Preprocessing in Background>

Some flash ROMs can be erased at a high speed when data before the erasure is "0". Whether erasure of a flash ROM is completed is checked by data polling as in the case of a data write operation. Therefore, the performance of this type of a flash ROM can be improved by performing "preprocessing" by which data in "used" sectors are rewritten to 0 in background. The throughput is not decreased when this preprocessing is executed as a task with the lowest priority.

The efficiency of this background preprocessing can be raised by preparing flags to manage "preprocessed sectors".

For this purpose, management flags indicating four possible states of sectors, "unused", "busy", "used", and "preprocessed", are prepared in sectors of a flash ROM. This improves the efficiency of the preprocessing.

Figure 38:
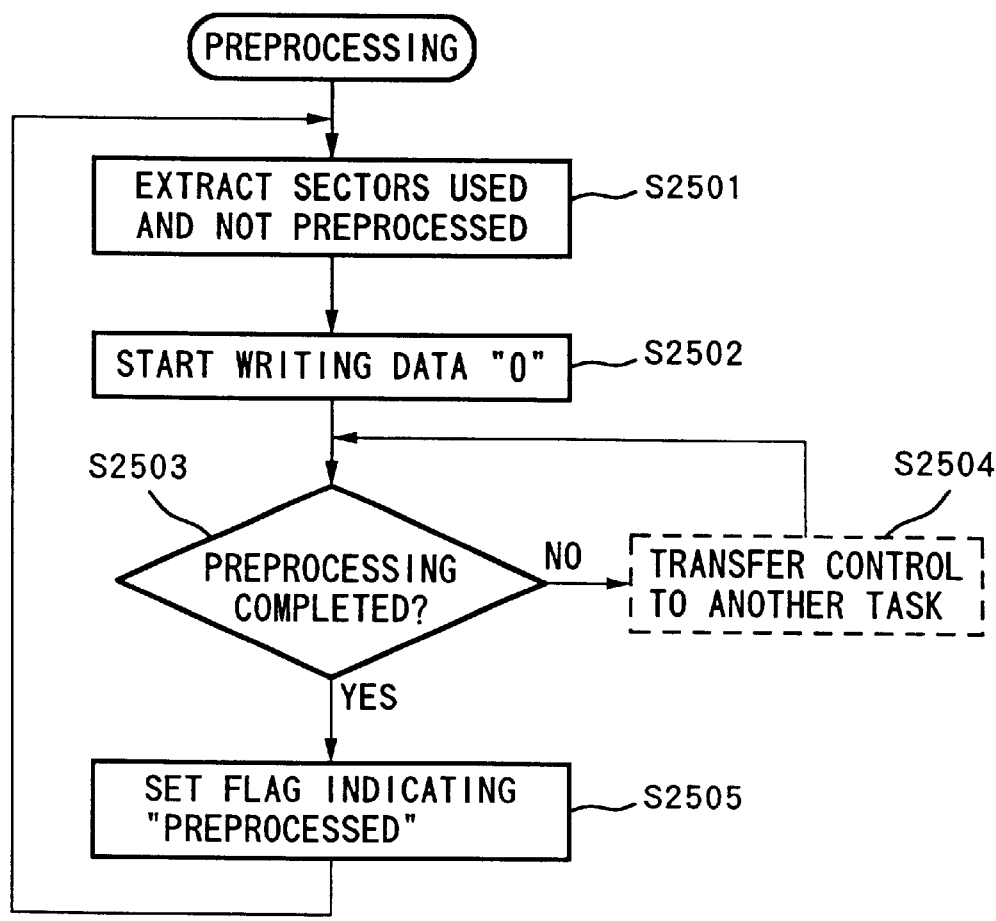
FIG. 38 is a flow chart showing the control procedure of preprocessing of increasing an erase processing rate in this embodiment.

FIG. 38 is a flow chart showing the control procedure of the preprocessing for increasing the erase processing rate in this embodiment. Referring to FIG. 38, in step S2501 a sector used and not preprocessed is extracted. This is accomplished by extracting a sector in which the management flag indicates "used" but does not indicate "preprocessed". In step S2502, data "0" is started to be overwritten in the extracted sector. In step S2503, whether the sector is completely preprocessed is checked. Since a flash ROM is written in units of bytes, it is necessary to write the number of bytes corresponding to one sector. If the preprocessing for the sector is not completed, the flow advances to step S2504 to transfer the control to another task.

As described above, this processing is performed by a task having the lowest priority. Accordingly, this processing is again executed when the CPU 5 begins idling. In this case, the flow returns to step S2503. If the previous write operation is not completed at that time, the flow immediately advances to another task.

When "0s" are completely written in all bytes of the sector, the flow advances from step S2503 to step S2505, and the management flag of the sector is set to a state indicating "preprocessed". The flow then returns to step S2501 to perform the preprocessing for other sectors.

<FAT Cache>

In this system, a storage location is changed whenever write access occurs and an "unused sector" is produced each time a storage location is changed. Therefore, it is expected that the total write frequency greatly decreases if there is a cache which preferentially buffers a portion used frequently. Although a memory prepared as the cache has as large a capacity as possible, the memory of the system has its limit.

Data in a sector whose use frequency is high also has a high probability at which it exists in the cache. When a large number of sectors with a low use frequency are read or written, the data is naturally unloaded from the cache.

Accordingly, if the management area managed by the file system is preferentially cached, the throughput can be expected to be improved. This is because the management area of the file system is frequently updated.

In the FAT system of the MS-DOS widely used in personal computers, one cluster is constituted by one sector in a 720-k or 1.4-M format. Consequently, even when files are sequentially read, the FAT must be read once while the files are read twice. In writing files, a larger number of FAT accesses occur. Accordingly, if a large number of files are opened in the system, the hit rate of the cache decreases.

Figure 11:
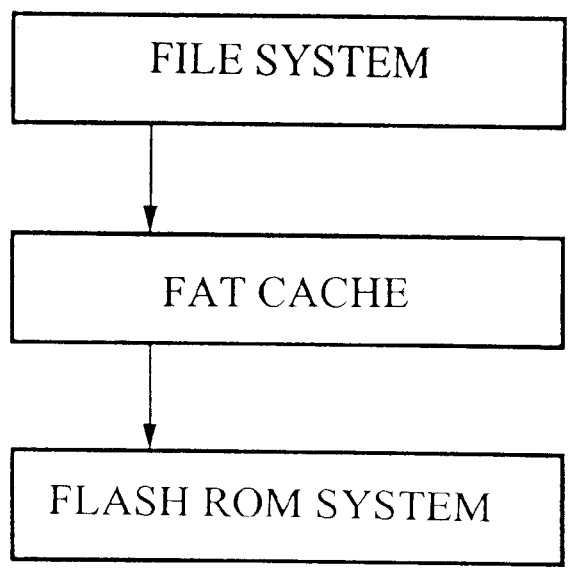
FIG. 11 is a view showing the hierarchical position of cache software.

Although it depends upon application software, a cache dedicated to a FAT in a FAT system can maintain a hit rate, which is equivalent to the hit rate of a cache provided for an entire disk, with a memory half that of the cache provided for an entire disk. FIG. 11 is a view showing hierarchical positioning of cache software. As shown in FIG. 11, the cache software is positioned between the file system and the flash ROM.

Figure 12:
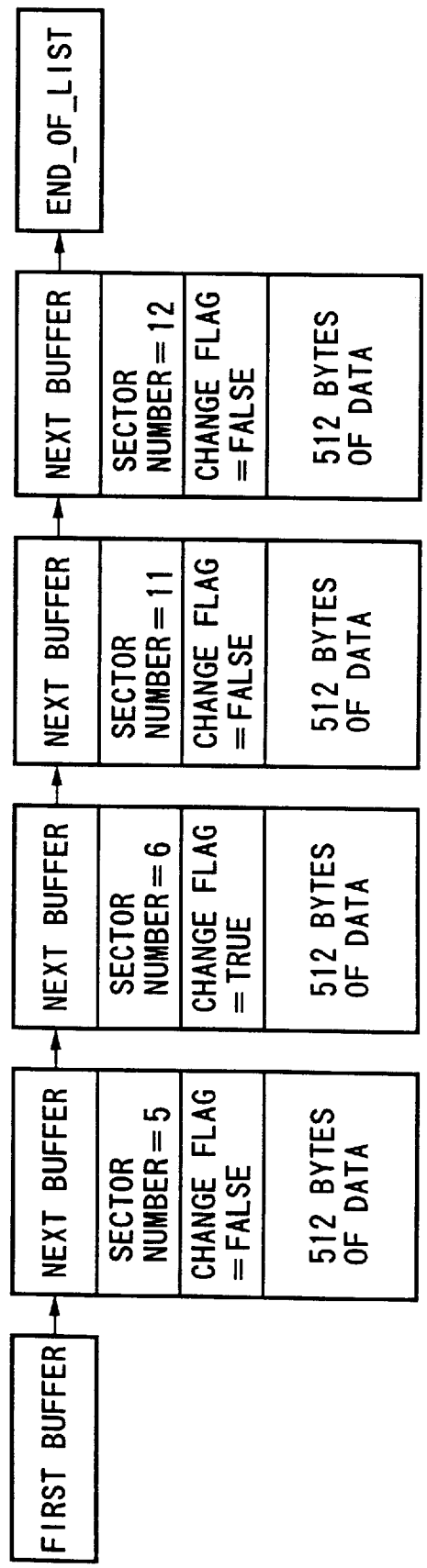
FIG. 12 is a view showing a data structure in the main memory of a cache.
Figure 13:
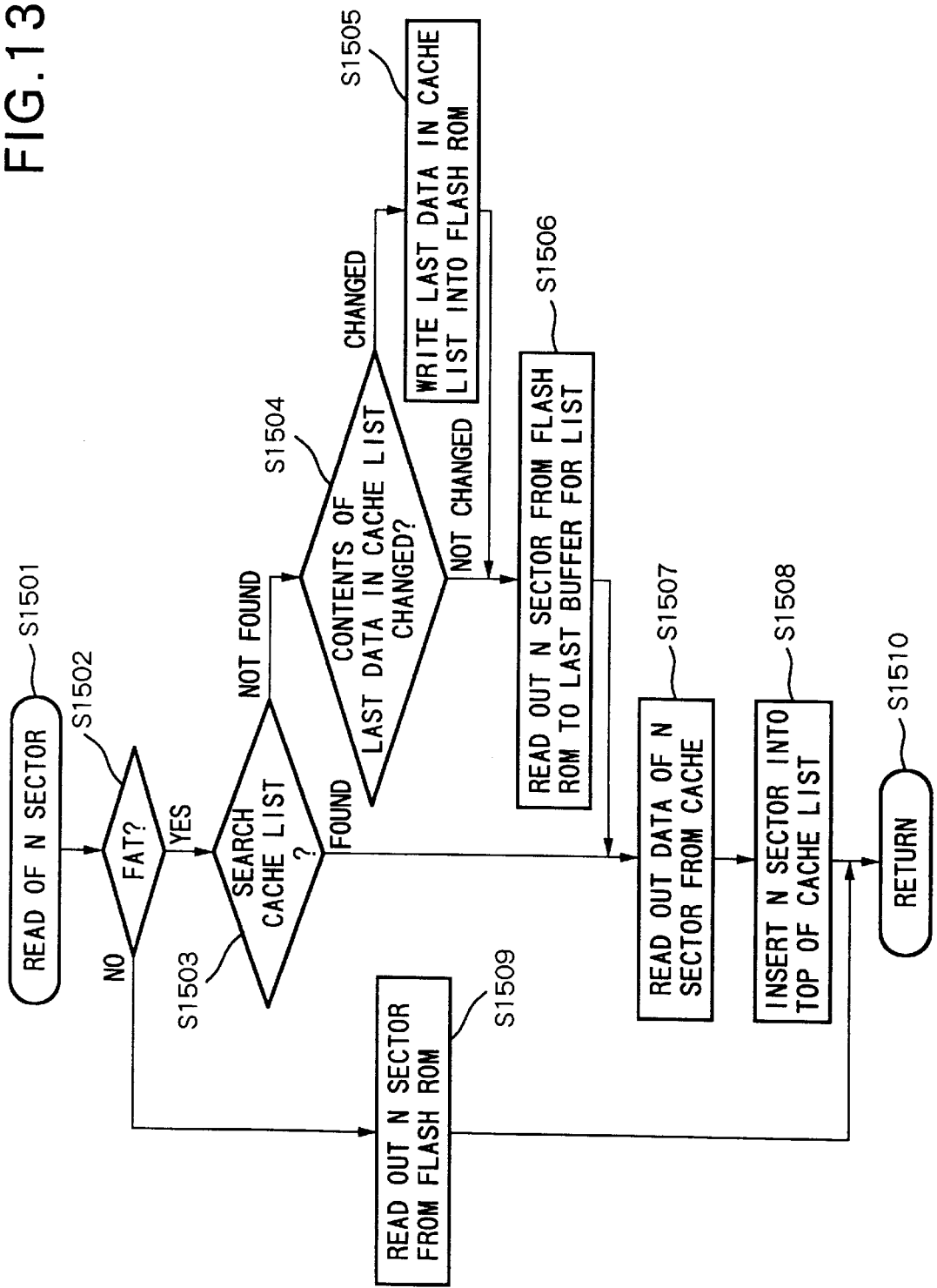
FIG. 13 is a flow chart showing a FAT cache read procedure.
Figure 14:
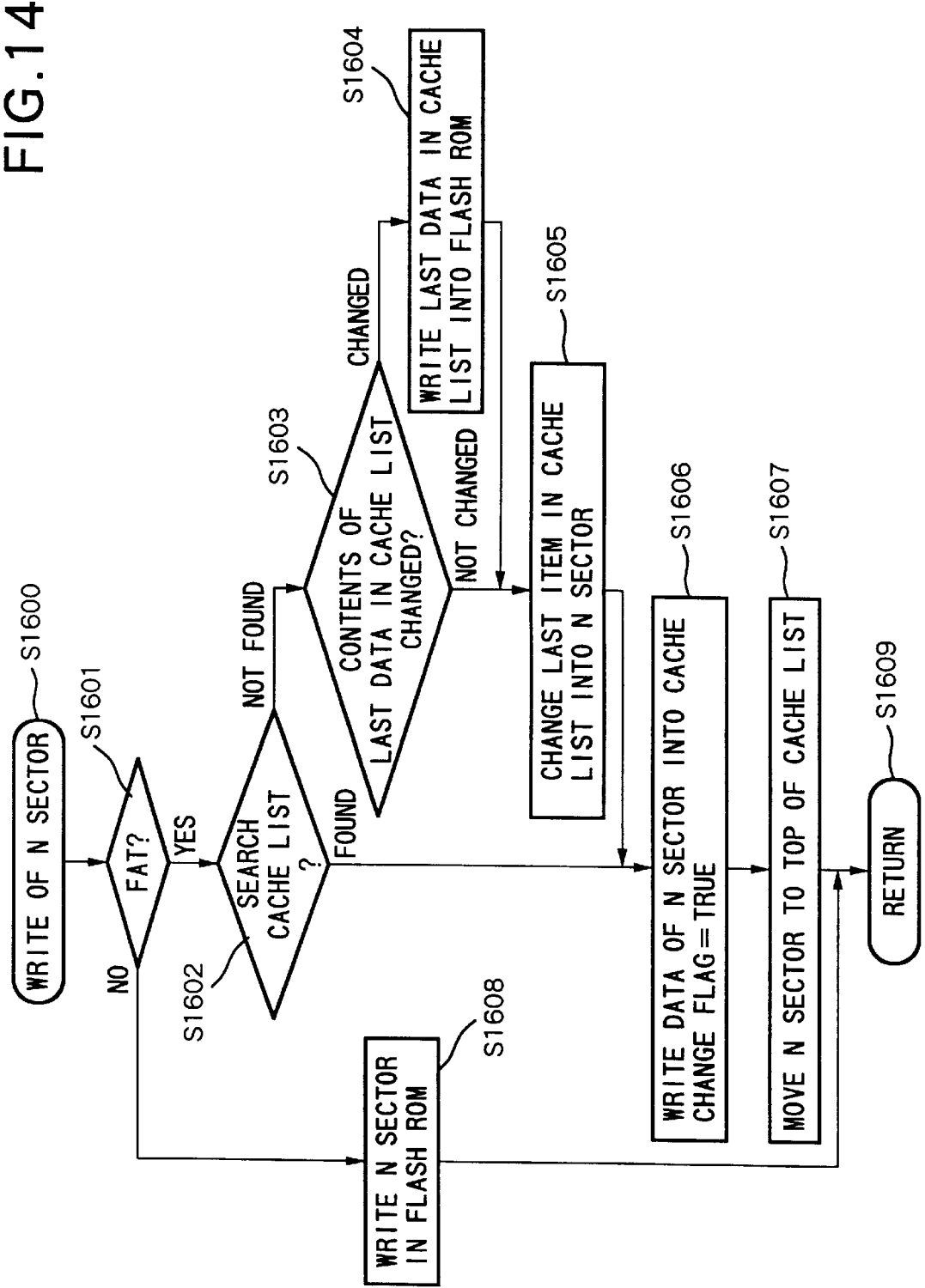
FIG. 14 is a flow chart showing a FAT cache write procedure.

FIG. 12 is a view showing a data structure in the main memory of the cache. A whole buffer is managed by a one-way linear list structure. Data becomes older in the direction of retrieval. The order shown in FIG. 12 results when accesses occur in the order of logical sector numbers 12, 11, 6, and 5. Also, each sector has a change flag. When data is updated in the cache, the change flag changes from FALSE to TRUE. Procedures of reading and writing this FAT cache will be described below with reference to FIGS. 13 and 14. FIG. 13 is a flow chart showing the FAT cache read procedure, and FIG. 14 is a flow chart showing the FAT cache write procedure.

Referring to FIG. 13, in step S1501 a read operation to an N sector is started. In step S1502, whether the N sector is a FAT is checked. If the N sector is not a FAT sector, data is read out from the flash ROM 15 in step S1509.

On the other hand, if it is determined in step S1502 that the N sector is a FAT sector, the flow advances to step S1503, and a cache list is retrieval-accessed. In this case, the one-way linear list shown in FIG. 12 is retrieval-accessed. If the N sector exists in the cache, the flow advances to step S1507, and data is read out from a buffer for the N sector.

If it is determined in step S1503 that the N sector does not exist in the cache list, the flow branches to step S1504, and data (data in sector No. 12 in FIG. 12) in a sector which has not been accessed for the longest time is unloaded. First, in step S1504, a change flag in the last item of the cache list is checked. If the change flag is TRUE, the flow advances to step S1505, and the contents of the change are written in the flash ROM 15. If nothing is changed (if the change flag is FALSE), the control is immediately transferred to step S1506. Although it seems strange to write data during the read procedure, to improve the efficiency, it is preferable to write the contents of the buffer as rarely as possible until data is unloaded from the cache.

In step S1506, the contents of the N sector are read out from the flash ROM 15 to the last buffer in the cache list. In step S1507, data is read out from the buffer for the N sector. In step S1508, the buffer for the N sector is moved to the top of the cache list. This is accomplished by changing the value of a "next buffer" (an address indicating the next buffer) for each sector in FIG. 12. The operation in step S1508 is executed each time the FAT cache is accessed. Consequently, buffers that are not accessed are automatically shifted from the top to the bottom of the list. Accordingly, the oldest buffer is unloaded when the last buffer in the cache list is selected in step S1504.

The write procedure will be described below with reference to FIG. 14.

In step S1600, a write operation to the N sector is started. In step S1601, whether the N sector is a FAT sector is checked. If the N sector is not a FAT sector, the flow advances to step S1602, and the cache list is retrieval-accessed. If the N sector exists in the cache list, the flow advances to step S1606, and data is written in the buffer of the N sector.

If it is determined in step S1602 that the N sector does not exist in the cache list, the flow branches to step S1603, a sector which has not been accessed for the longest time is unloaded from the buffer, and the N sector is registered in the cache. First, in step S1603, a change flag in the last item of the cache list is checked. If the change flag is TRUE, the contents of the change are written in the flash ROM in step S1604, and the flow advances to step S1605. If nothing is changed (if the change flag is FALSE), the control is immediately transferred to step S1605. In step S1605, the last item in the cache list is changed to the N sector. In step S1606, data is written in the buffer for the N sector.

In step S1607, the buffer for the N sector is moved to the top of the cache list. In this write procedure, no write operation is performed to the flash ROM. This is because the efficiency is improved when the contents of the buffer are written in the flash ROM as seldom as possible until data is unloaded from the cache.

Also, the FAT determination is performed in steps S1501 and S1601. Even in a system such as an IC card in which information in an upper layer (file system) cannot be perfectly shared, the FAT area can be located by analyzing the contents of written data. This is so because it is determined that information such as the position of a FAT is stored in a portion corresponding to a logical sector O.

<Writing One Byte in Flash ROM>

All read and write actions (including the management area) to the flash ROM are finally executed by a one-byte read/write instruction. A write operation to the flash ROM 15 consumes a time equivalent to the time consumed by a normal PROM. Until this one byte is completely written, no write operation to the same chip can be performed. Some chips are provided with a signal line for a write completion signal, and some chips are not provided with any such special signals. In the latter case, the write completion must be confirmed by using a method called data polling. The data polling is a busy control method which is very similar to verification and which waits until written data and readout data agree with each other.

If the write completion can be known from a signal line, a write waiting CPU time can be assigned to another task in combination with an interrupt to the CPU 5.

In the case of a chip having no signal line as described above, the data polling must be performed. To increase the data write efficiency, it is necessary to perform write operations to a number of chips in a pipeline manner and thereby suppress the loss of a data polling time. To this end, it is necessary to transfer the control to the next operation before one byte is completely written. It is preferable to check before a new read or write operation is performed whether the previous write operation is completed. FIG. 15 expresses this check in C language.

The first line in FIG. 15 is the entrance to a function of performing a data write operation. The first argument is a pointer to a structure for storing the last written address and data. The second argument is an address to be written. The third argument is data to be written.

In the third line, data written in the chip is compared with the last written data by referring to the last written address, and the loop is executed until the two data agree. This is the data polling. When the last write operation is completed, the control leaves this loop.

In the fourth line, data is written at a new address. In the fifth and sixth lines, the address and data currently written are stored. This information is used in the next data polling.

RotateRdyQueue in the seventh line of the list is a system call for an operating system which transfers the access right to the CPU to an executable task to be executed next to the current task and having the same priority.

The ninth line is the entrance to a read function. The first argument is a pointer to a structure for storing an address and data, and the second argument is an address to be read. This function returns data stored in the address designated by the second argument to a host program.

In the eleventh line, if an address to be read is the last written address, this means that a value to be returned is the last written data, and so the information stored in the structure is returned. The twelfth line is data polling analogous to the third line. If data polling is unsuccessful, another address in the chip cannot be read. The contents of the address designated in the thirteenth line are returned after data polling is completed.

When a write operation to one chip is done as described above, the apparent write rate can be reliably increased only by increasing the number of chips and the number of write tasks. To increase the throughput as a whole, it is effective to intentionally prepare the number of sector buffers equal to the number of chips (e.g., two sectors for two chips) and perform no processing until contents to be written are stored in a buffer.

The program shown in FIG. 15 is characterized in that data polling is performed before the next write operation is performed, rather than immediately after data is written. For this purpose, a RAM area for storing the last written address and data is prepared for each chip and stored as a structure "struct DEV".

Figure 39:
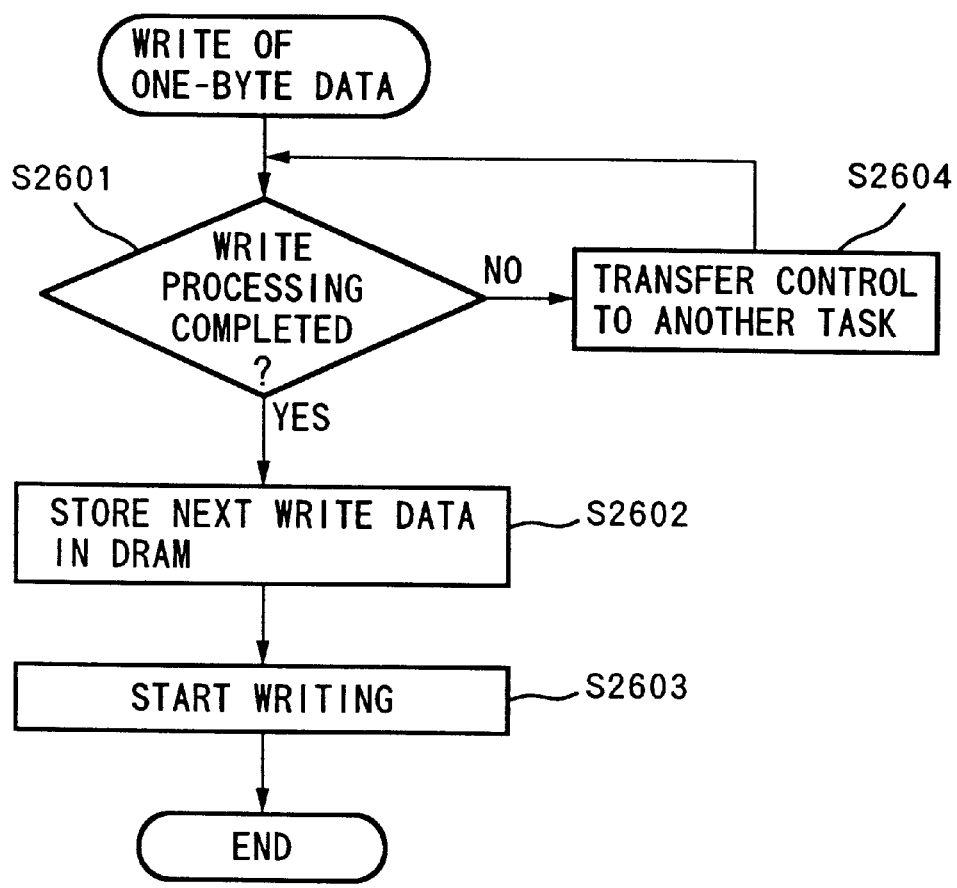
FIG. 39 is a flow chart showing a procedure of writing 1-byte data in a flash ROM in this embodiment.

FIG. 39 is a flow chart showing a procedure of writing one-byte data in the flash ROM in this embodiment. This flow chart shows a procedure of controlling a write action to one flash ROM chip. In step S2601, whether the previous write processing is completed is checked. If the previous write processing is not completed, the flow advances to step S2604, and the control is immediately transferred to another task.

On the other hand, if the previous write processing is completed, the next write data is prepared and stored in the DRAM 14. The write completion determination in step S2601 is accomplished by comparing the data written in the flash ROM with this data stored in step S2602.

In step S2603, a data write operation is started. In the above processing, write processing using so-called round-robin scheduling can be performed when write operations are performed for a plurality of flash ROM chips by a plurality of tasks. Consequently, data can be efficiently written in a plurality of ROM chips. Note that a multitask management program is stored in the ROM 13 described previously. VxWorks (trademark) and PSOS (trademark) are commercially available as real-time OS for installation. This real-time OS is stored in the ROM 13.

<Sharing Flash ROM Write Power Supply>

Some chips require a special write voltage of, e.g., 12 V, as in the case of a PROM, to write or erase data, and some chips increase the write speed when applied with a write voltage. If a voltage generator such as a dedicated DC/DC converter is provided to use chips of these kinds, the cost of an electronic camera is increased. Fortunately, conventional cameras include portions requiring a special voltage, e.g., an electronic flash requiring charging and a mechanical portion and a CCD requiring driving, and so the conventional cameras incorporate a DC/DC converter or the like. Therefore, the write voltage of a flash ROM and the charging of an electronic flash or the driving of a mechanism are performed in a time-division multiplex manner. Consequently, the system can be constructed by a small-capacity DC/DC converter, and this reduces the increase in cost of the system.

FIG. 16 expresses, in C language, a program for managing a power supply so that the output capacity of a DC/DC converter is not exceeded. Lines 1 to 6 are zoomup functions in one step, and lines 7 to 13 are write functions of write-accessing one sector in the flash ROM. The zoomup function in the line 3 acquires a semaphore "SemDCDC" for managing the resource of the DC/DC converter. A function of moving a motor one step is called in line 4. When motor driving is completed, a semaphore "SemDCDC" for managing the resource of the DC/DC converter is released. A semaphore is a general method of managing resources in a multitask operating system. Many operating systems prepare a semaphore as a system call.

That is, assume that "SemDCDC" is already used by some other task in line 3. In this instance, the execution of a task which is to perform zoomup is held until another task releases the semaphore "SemDCDC".

The write function acquires the semaphore "SemDCDC" in line 9 and writes data of one sector in the flash ROM. The write function performs data polling in line 11. If the write function determines that the last write operation is completed, the write function releases the semaphore "SemDCDC" in line 12. When the program is thus configured, zoomup and a write operation to the flash ROM are no longer performed at the same time. Since zoom is performed in units of steps and a write operation is performed in units of sectors, a power supply can always be acquired after a very short holding time.

FIG. 16 will be described in more detail below. Line 1 in FIG. 16 is the entrance to a zoomup function. This function has no argument. In line 3, one SemDCDC right declared as the right to use the power supply is acquired. If there is no right to use, the execution of a task which has called the function is held. If the right to use the power supply is released by another task, the task which has called ZoomUp is again made executable. The motor driving function in line 4 can be called. In line 5, the right to use the power supply is returned, and the work of this function is completed. Line 7 is the entrance to a function of writing data of one sector in an EEPROM. The right to use the power supply is acquired in line 9 and returned in line 12.

Figure 40:
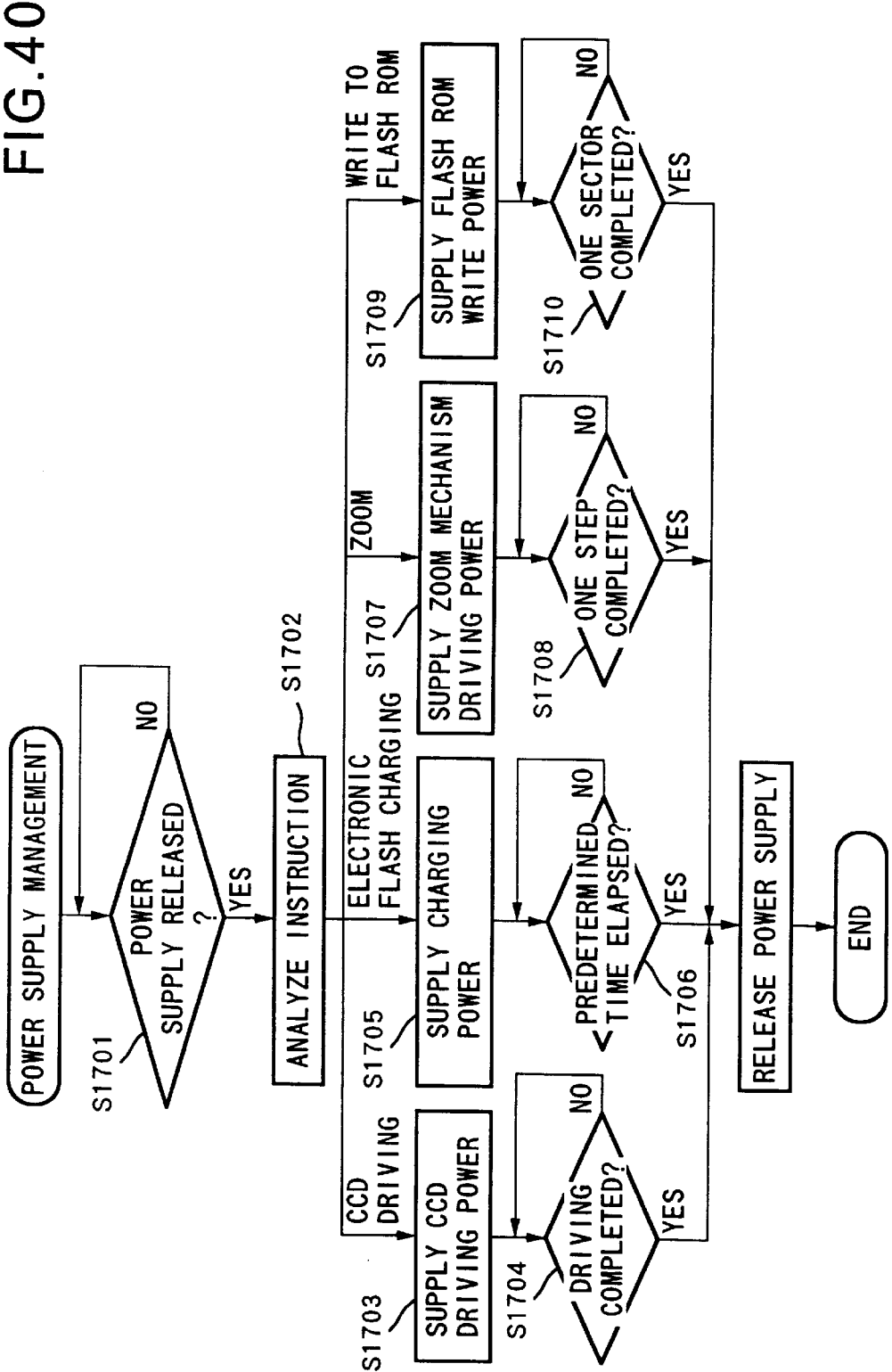
FIG. 40 is a flow chart for explaining a procedure of sharing a power supply.

FIG. 40 is a flow chart for explaining the above procedure of sharing the power supply. Referring to FIG. 40, in step S1701, whether the power supply controller 9 releases the supply of output power from the DC/DC converter 8 is checked. In step S1702, the contents of an instruction for acquiring the power supply are analyzed. In accordance with the result of the analysis, the flow advances to one of steps S1703, 1705, 1707, and 1709.

If the contents of the instruction indicate the supply of CCD driving power, the flow advances to step S1703, and CCD driving power is supplied to the CCD 2. If it is detected in step S1704 that the CCD driving is completed (i.e., photography is completed), the flow advances to step S1711 to release the power supply. If the contents of the instruction request charging of the electronic flash, the flow advances to step S1705, and the power supply controller 9 is made to provide power of charging the electronic flash 21. If it is determined in step S1706 that the charging of the electronic flash is completed, the flow advances to step S1711 to release the power supply. Note that during the supply of charging power, the power supply is released to supply power to other parts whenever charging is performed a predetermined time. That is, a program for managing the charging of the electronic flash 21 separately exists in another task, and the completion of the charging is managed by that task.

If the contents of the instruction indicate driving of a zoom mechanism, the flow advances to step S1707, and power is supplied to a driving mechanism (not shown) of the zoom mechanism. If it is determined in step S1708 that a zoom operation of one step is completed, the flow advances to step S1711 to release the power supply. If the contents of the instruction indicate write access to the flash ROM, the flow advances to step S1709, and write power is supplied to the flash ROM 15. When a write operation of one sector is completed, the flow advances from step S1710 to step S1711 and the power supply is released.

In each of steps S1704, S1706, S1708, and S1710, the completion of each corresponding operation is awaited. In this wait loop, the control is transferred to another task to realize multitask processing. This management processing can be activated any time from each individual task and can also be activated by a plurality of tasks at the same time. Accordingly, the release of the power supply is checked in step S1701.

In the flow chart shown in FIG. 40, the power supply can be used time-divisionally. However, the above control is one program in which all systems (CCD/electronic flash/zoom/flash ROM) depend upon each other. When this type of software is developed, the cost of development/debug/maintenance is increased, and this makes the expandability and the flexibility difficult to maintain.

The development efficiency can be improved by using a resource management function provided by an OS while regarding the power supply as one resource. To this end, the resource management by the semaphore described above is performed. That is, the power supply can be time-divisionally assigned by allowing the respective control programs of the CCD driver, the electronic flash driver, the zoom mechanism driver, and the flash ROM driver to acquire and release a resource (semaphore) named the power supply.

FIG. 48 is a view for explaining the time-divisional use of the power supply in this embodiment. As shown in FIG. 48, if the power supply semaphore is in a released state when a certain task A (e.g., a CCD) generates a power supply request, this semaphore is acquired to occupy the power supply (steps S2001 to S2003). In step S2004, predetermined processing is performed by obtaining power from the power supply. Thereafter, the flow advances to step S2005 to release the semaphore.

On the other hand, a task B which has requested the power supply after the task A cannot acquire the semaphore in a power supply request in step S2011. Therefore, the task B waits in step S2012 until the semaphore is released. When the task A releases the semaphore, the task B acquires the semaphore and occupies the power supply (step S2013). Thereafter, the task B executes predetermined processing (step S2014) and releases the power supply (step S2015).

The power supply can be time-divisionally used by the management of the power supply resource using a semaphore as described above.

Although FIG. 48 shows only one semaphore indicating the right to use the power supply resource, a plurality of semaphores can naturally exist at the same time.

<Operation of Electronic Camera of This Embodiment>

Figure 17:
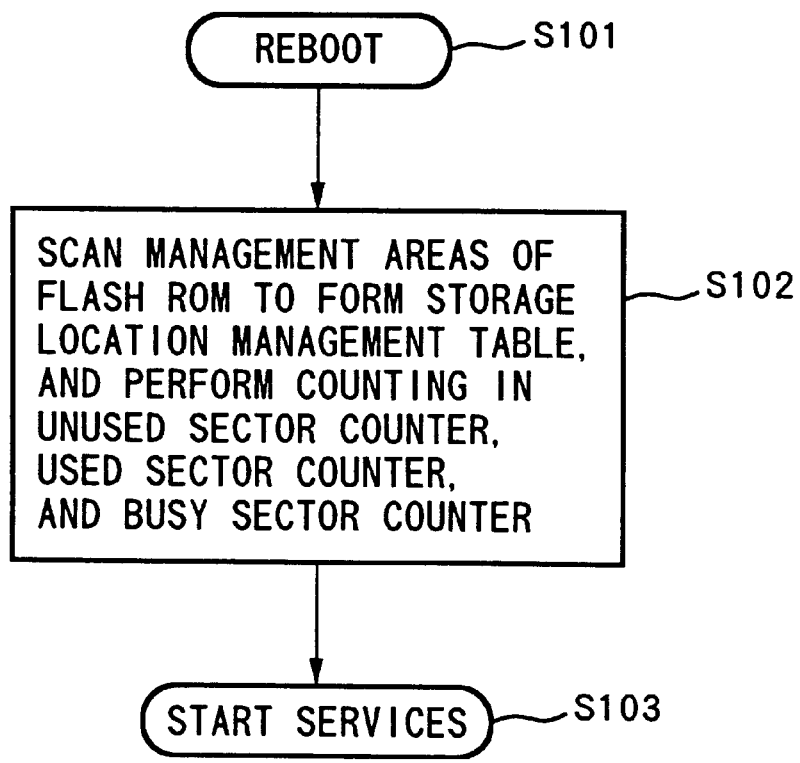
FIG. 17 is a flow chart showing an operation procedure from reboot to the start of services in this embodiment.

FIG. 17 is a flow chart showing an operation procedure from reboot to the start of services in this embodiment. In step S101, the system is rebooted. In step S102, the management area in the flash ROM 15 is scanned and the storage location management table 140 is formed in the DRAM 14. In parallel with this processing, unused sectors, used sectors, and busy sectors are counted and the counts are set in an unused sector counter, a used sector counter, and a busy sector counter, respectively. These counters are updated when an operation is later performed for the flash ROM 15 and used to check the storage efficiency. Thereafter, the flow advances to step S103 to start various services.

Figure 18:
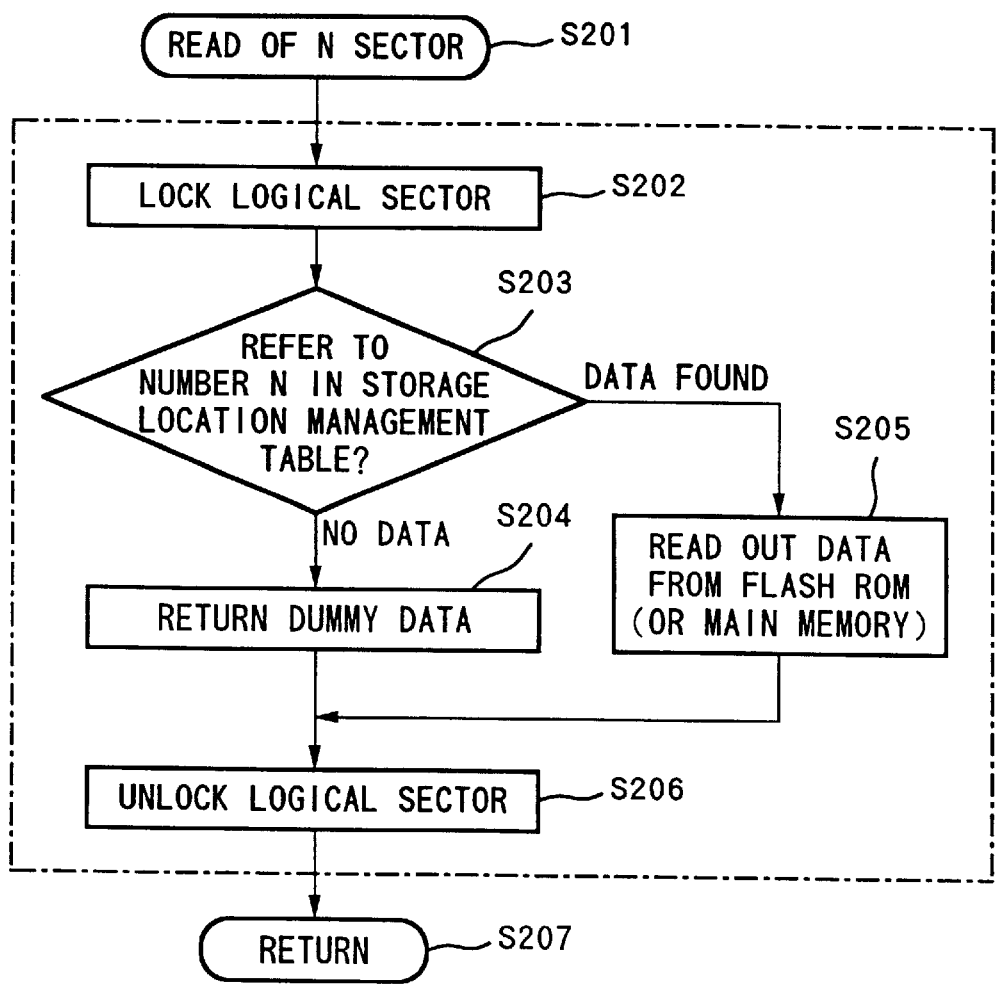
FIG. 18 is a flow chart showing the procedure of a designated sector read service.

FIG. 18 is a flow chart showing the procedure of a designated sector read service. In step S201, a read operation to an N sector is started. In step S202, the N sector is locked. Locking of a sector is done by using a lock variable. This lock variable is managed together with the storage location of each sector in the storage location management table 140. If the sector is already locked by another task in step S202, the flow waits until the sector is unlocked by that task. After being unlocked by the task, the sector is locked by the task of interest. This task can occupy the locked sector until it is unlocked in step S206.

When the logical sector is locked in step S202, the storage location management table is referred to in step S203, checking whether valid data is stored in the sector. If no valid data is recorded, the flow branches to step S204. In step S204, dummy data (e.g., all 0s) is read out as the contents of the sector. If it is determined in step S203 that valid data is stored, the flow branches to step S205. In step S205, data is read out from the flash ROM (or the main memory) on the basis of the value in the storage location management table. When the above processing is completed, the flow advances to step S206 to unlock the logical sector.

If the N sector is saved in the main memory (DRAM 14) because garbage collection is being executed, the pointer of the storage location management table points to the main memory. A portion enclosed by the long and short dashed lines in FIG. 18 indicates a period during which the N sector is occupied. Since the safety of one sector operation is assured by this locking mechanism, sectors not being operated can be freely read out even during garbage collection.

Figure 19:
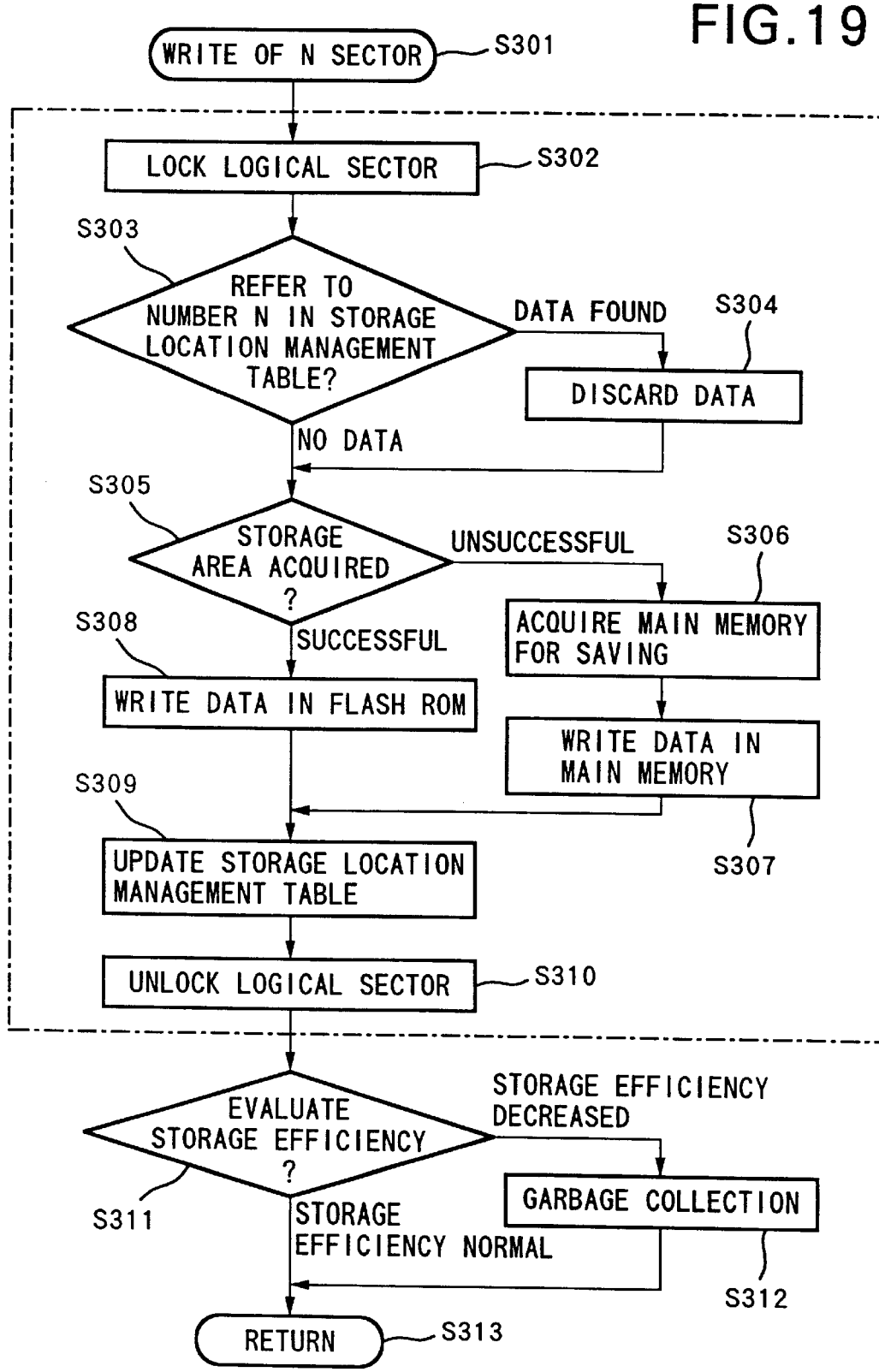
FIG. 19 is a flow chart showing the procedure of a logical sector write service.

FIG. 19 is a flow chart showing the procedure of a logical sector write service. In step S301, a write operation to an N sector is started. In step S302, as in step S202, a logical sector is locked.

In step S303, the storage location management table is searched to check whether valid data is recorded in the N sector. If valid data is recorded, the flow branches to step S304. If no valid data is recorded, the flow branches to step S305. In step S304, data in the flash ROM (or the main memory) recorded as valid data is discarded. The data discarding processing in step S304 will be described in detail later with reference to a flow chart in FIG. 21. The control is transferred from step S304 to step S305.

In step S305, a storage area for write-accessing the N sector is acquired in the flash ROM 15. Details of the storage area acquiring procedure in step S305 will be described later with reference to FIG. 23. If a storage area is successfully acquired in step S305, the control is transferred to step S308. In step S308, the data of the N sector is written in the acquired area of the flash ROM 15.

On the other hand, if it is determined in step S305 that the flash ROM 15 has no storage location, i.e., if the acquisition of a storage location is failed, the flow branches to step S306. In step S306, an area in the main memory is acquired to save data. The acquisition of an area in the main memory is performed by a memory management function provided by the operating system. This function is equivalent to an alloc function in C language. The acquired area is managed by a one-way linear list structure.

Figure 20A:
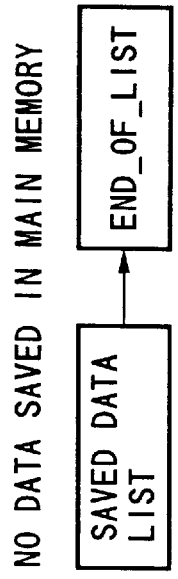
FIGS. 20A and 20B are views showing saved data lists acquired in the main memory.
Figure 20B:
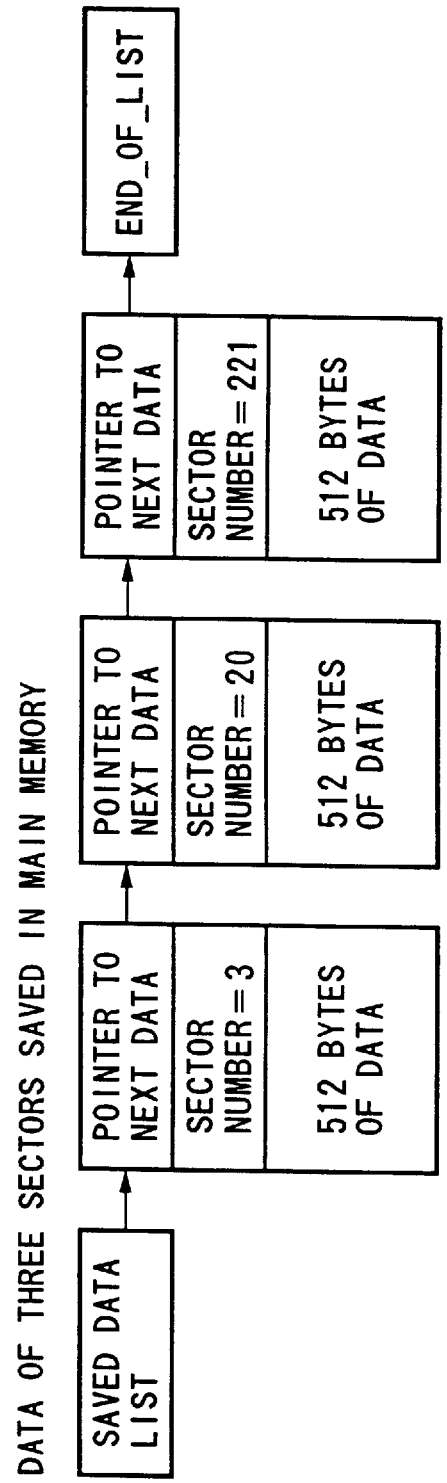

FIGS. 20A and 20B illustrate saved data lists acquired in the main memory. FIG. 20A shows the state in which the saved data list has no data. In this case END_OF_LIST is substituted into the list. FIG. 20B shows the state in which the contents of sectors of sector Nos. 3, 21, and 221 are saved in the saved data list.

In step S309, the storage location management table is updated. That is, a pointer to the data area (logical sector) in the flash ROM (or the main memory) in which the data is recorded is substituted. In step S310, the logical sector is unlocked. The task of interest can occupy the logical sector during a period enclosed by the long and short dashed lines in FIG. 19. In step S311, the storage efficiency is evaluated. A procedure of the storage efficiency evaluation will be described in detail later with reference to a flow chart in FIG. 21. If it is determined by the storage efficiency evaluation that the storage efficiency is low, the control is transferred to step S312. In step S312, the garbage collection described previously is performed. Details of the garbage collection will be described later with reference to a flow chart in FIG. 24. In step S313, the write operation to the N sector is completed and the flow returns to the main routine.

Note that the data stored in the storage location management table is a pointer (an address in a bus space) of the storage location. In the data saved to the main memory shown in FIG. 20B, fields next to "pointer to next data" (fields illustrated immediately below "pointer to next data") are compatible with the data structure in the flash ROM illustrated in the left half of FIG. 10. The data stored in the storage location management table is a pointer to this compatible portion. With this configuration, the data read program can control the flash ROM and the main memory by using the same algorithm.

The procedure (in step S304) of discarding stored data in a designated sector will be described below. FIG. 21 is a flow chart showing the data discarding procedure.

In step S401, data discarding in a designated area is started. In step S402, whether an area for storing a designated sector exists in the main memory is checked. If the area exists in the main memory, the flow branches to step S405. In step S405, the designated area is deleted from a saved sector list (in this embodiment, the one-way linear list shown in FIG. 20).

A procedure of deleting the designated area from the one-way linear list is as follows. First, the list is traced in the retrieval direction from the top of the list to detect an item in which a pointer is pointing itself. A value pointed by the pointer in the detected item is substituted into the pointer. In step S406, the main memory area deleted from the list is returned to the operating system. The return of the storage area to the operating system is equivalent to a free function in C language.

On the other hand, if it is determined in step S402 that the designated area is not present in the main memory (i.e., the flash ROM has the area), the flow branches to step S403. In step S402, the management flag of the designated sector in the flash ROM is changed to "used". This is accomplished by setting the used state flag to TRUE. In step S404, the value of the used sector counter in the main memory is incremented by one. In step S407, the flow returns to the main sequence.

Figure 22:
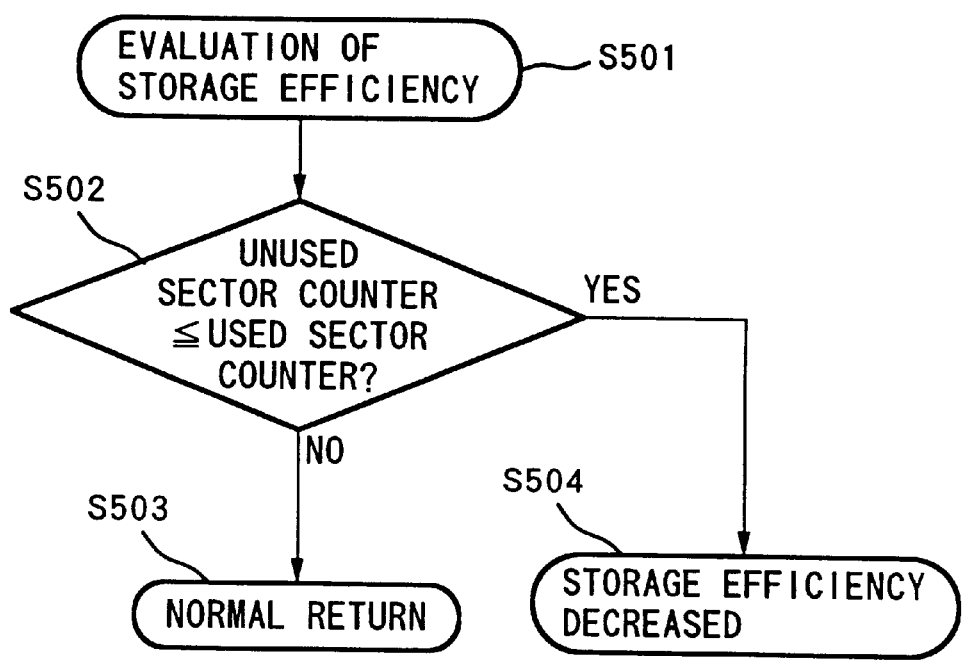
FIG. 22 is a flow chart showing a procedure of evaluating a storage efficiency.

The storage efficiency evaluation procedure (step S311) will be described below. FIG. 22 is a flow chart showing the storage efficiency evaluation procedure.

In step S501, the evaluation of the storage efficiency is started. In step S502, the value of the unused sector counter and the value of the used sector counter set in the main memory are compared. If the value of the used sector counter is equal to or larger than the value of the unused sector counter, a decrease in the storage efficiency is reported to a host program (steps S502 and S504). If the value of the unused sector counter is larger than the value of the used sector counter, it is determined that the evaluation result is normal, and the flow normally returns to the main sequence (step S503).

Figure 23:
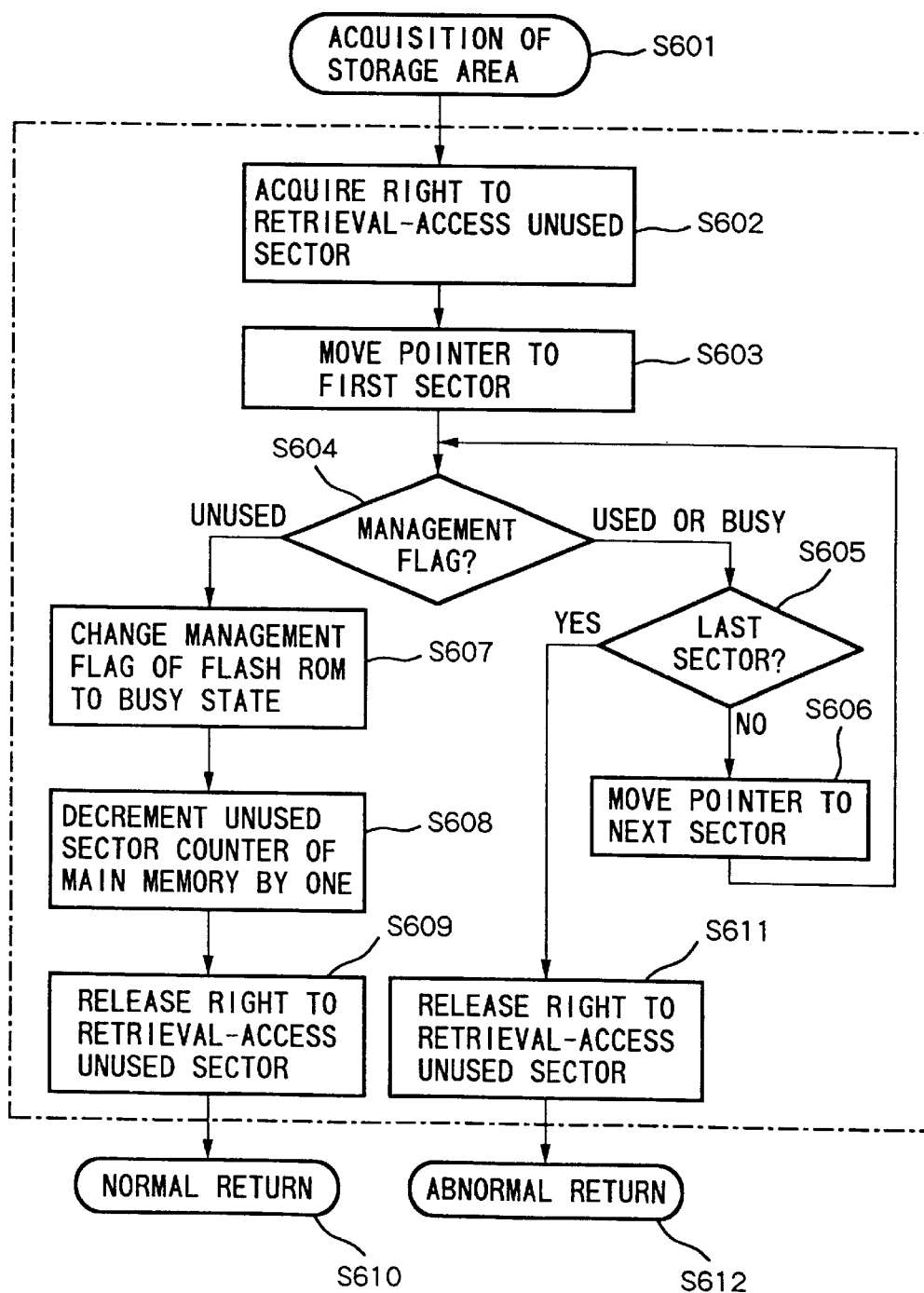
FIG. 23 is a flow chart showing a procedure of acquiring a storage area of the flash ROM.

The procedure of acquiring a storage area in the flash ROM (step S305) will be described below. FIG. 23 is a flow chart showing the procedure of acquiring a storage area in the flash ROM.

In step S601, the acquisition of a storage area in the flash ROM is started. In step S602, the right to retrieval-access an unused sector is acquired. In this embodiment, the right to retrieval-access an unused sector is managed by using the function of a semaphore provided by the operating system. In this embodiment, the right to retrieval-access an unused sector can be exclusively possessed during a processing period enclosed by the long and short dashed lines from step S602 to step S609/step S611 in FIG. 23. This is a mechanism for preventing an event in which a plurality of tasks simultaneously acquire the same area.

In step S603, a pointer is moved to the first sector in the flash ROM. In step S604, the state of the sector is checked by referring to the management flag (the busy state flag or the used state flag) of the sector. If the sector is already used or busy, the flow branches to step S611. If this is the case, no usable area exists in the flash ROM 15. Therefore, the right to retrieval-access an unused sector is released in step S611, and the flow abnormally returns to the main sequence in step S612. If it is determined in step S605 that the sector currently being pointed is not the last sector, the flow branches to step S606. In step S606, the pointer is moved to the next sector and the flow returns to step S604.

If the management flag in the sector indicated by the pointer indicates "unused" in step S604, the flow branches to step S607. In step S607, the management flag of the flash ROM is changed to "busy" (the busy state flag is set to TRUE). In step S608, the value of the unused sector counter provided in the main memory is decremented by one. Since the storage area is successfully acquired in the flash ROM, the right to retrieval-access an unused sector is released in step S609, and the flow normally returns to the main sequence in step S610.

Figure 24:
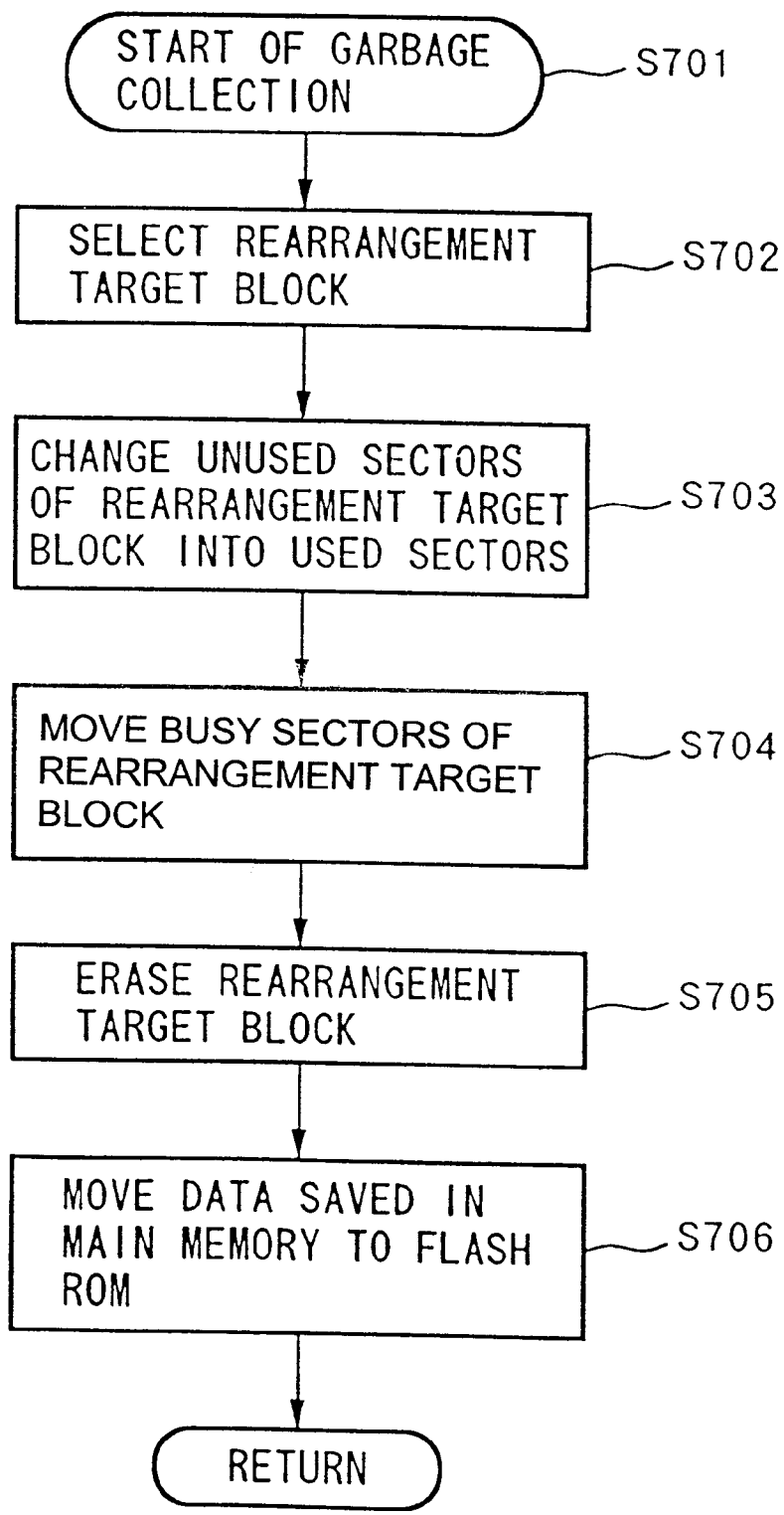
FIG. 24 is a flow chart showing the procedure of garbage collection.

The procedure of garbage collection (step S312) will be described below. FIG. 24 is a flow chart showing the garbage collection procedure.

In step S701, garbage collection is started. In step S702, an erase block to be rearranged (to be referred to as a rearrangement target block hereinafter) is selected. A procedure of selecting the rearrangement target block will be described in detail below with reference to a flow chart in FIG. 25. In step S703, unused sectors in the rearrangement target block are changed into used sectors. A procedure of changing unused sectors into used sectors will be described in detail later with reference to a flow chart in FIG. 26. This system is so configured that even while a certain task is executing garbage collection, another task can read- and write-access sectors including a sector in a rearrangement target block. Therefore, unused sectors in the rearrangement target block are first changed into used sectors in order to prevent another task from writing new data in a sector of the rearrangement target block during garbage collection.

In step S704, busy sectors in the rearrangement target block are moved to another storage area (i.e., another erase block). Details of processing of moving busy sectors to another storage area will be described later with reference to a flow chart in FIG. 27.

In step S705, the rearrangement target block from which unused sectors are completely moved is erased. A procedure of erasing the rearrangement target block will be described in detail later with reference to a flow chart in FIG. 28. When the rearrangement target block is erased, the contents of the erase counter 152 are copied to the main memory. When the erasure of the rearrangement target block is completed in step S705, the flow advances to step S706 and the data saved in the main memory is returned to the erase counter of the erase block in the flash ROM. In step S707, the flow returns from the garbage collection.

Figure 25:
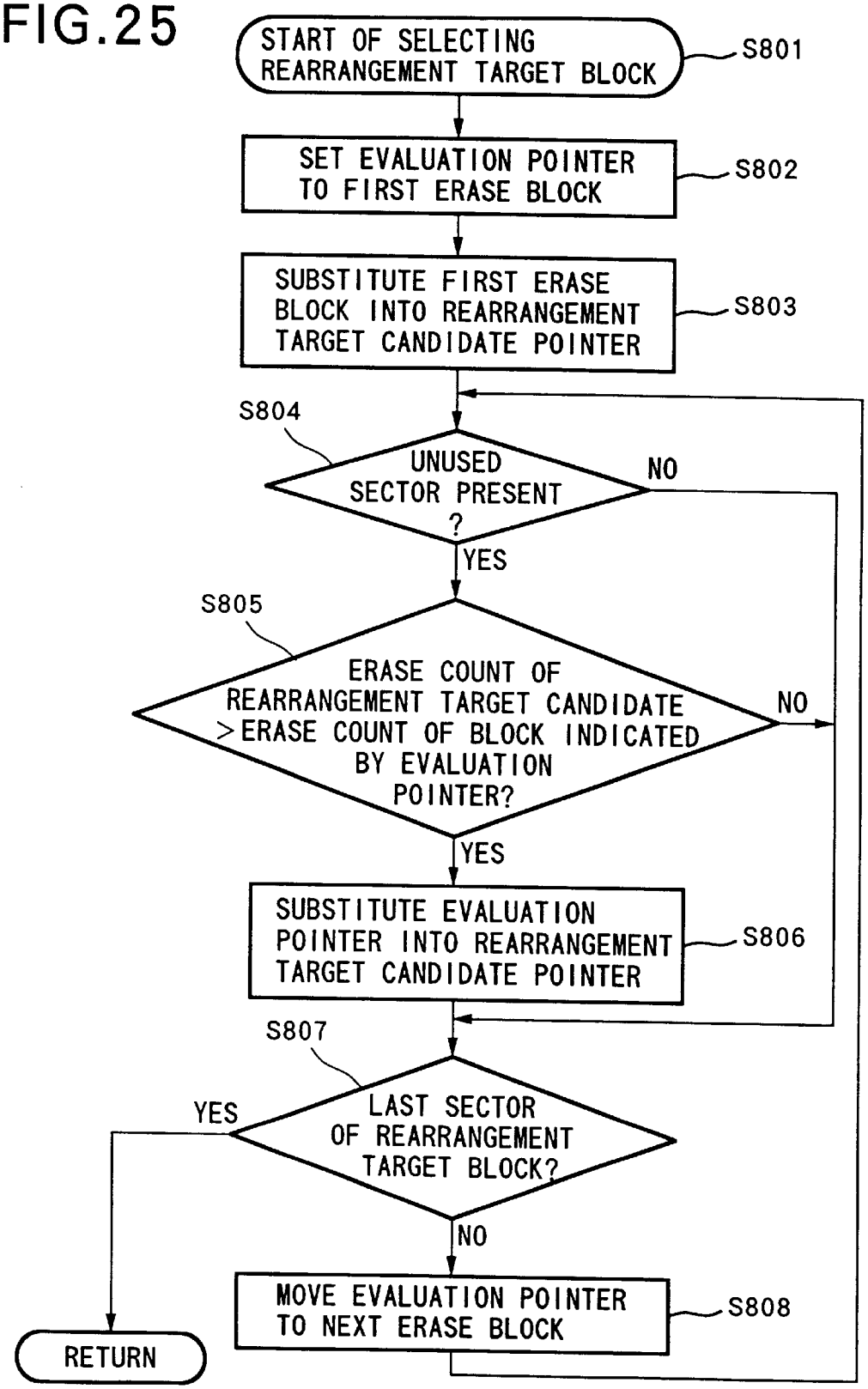
FIG. 25 is a flow chart showing a procedure of selecting a block to be rearranged.

The procedure (step S702) of selecting the rearrangement target block in the garbage collection will be described below. FIG. 25 is a flow chart showing the rearrangement target block selecting procedure.

In step S801, the selection of the rearrangement target block is started. In step S802, the first erase block is set in an evaluation pointer. Similarly, in step S803, a rearrangement target candidate pointer is set in the first erase block.

In step S804, whether a used sector is contained in the erase block indicated by the evaluation pointer is checked. If no used sector is contained, the control is transferred to step S807 by skipping steps S804 and S805.

On the other hand, if it is determined in step S804 that a used sector is contained in the erase block indicated by the evaluation pointer, the control is transferred to step S805. In step S805, the value of the erase counter of the erase block indicated by the rearrangement target candidate pointer is compared with the value of the erase counter of the erase block indicated by the evaluation pointer. If the erase count of the erase block indicated by the evaluation pointer is smaller, the control is transferred to step S806. In step S806, the evaluation pointer is substituted into the rearrangement target candidate pointer. On the other hand, if it is determined in step S805 that the erase count of the erase block indicated by the evaluation pointer is larger, the control is immediately transferred to step S807.

In step S807, whether the evaluation pointer indicates the last erase block is checked. If the evaluation pointer does not indicate the last erase block, the evaluation pointer is moved to the next erase block in step S808, and the flow returns to step S804. By repeating the processing from step S804 to step S808 as described above, the rearrangement target candidate pointer is made to indicate an erase block containing a used sector and having a small erase count.

If it is determined in step S807 that the evaluation pointer indicates the last erase block, the flow branches to step S808. In step S808, the flow returns to the garbage collection processing (FIG. 24). An erase block indicated by the rearrangement target candidate pointer at that time is selected as a rearrangement target.

Figure 26:
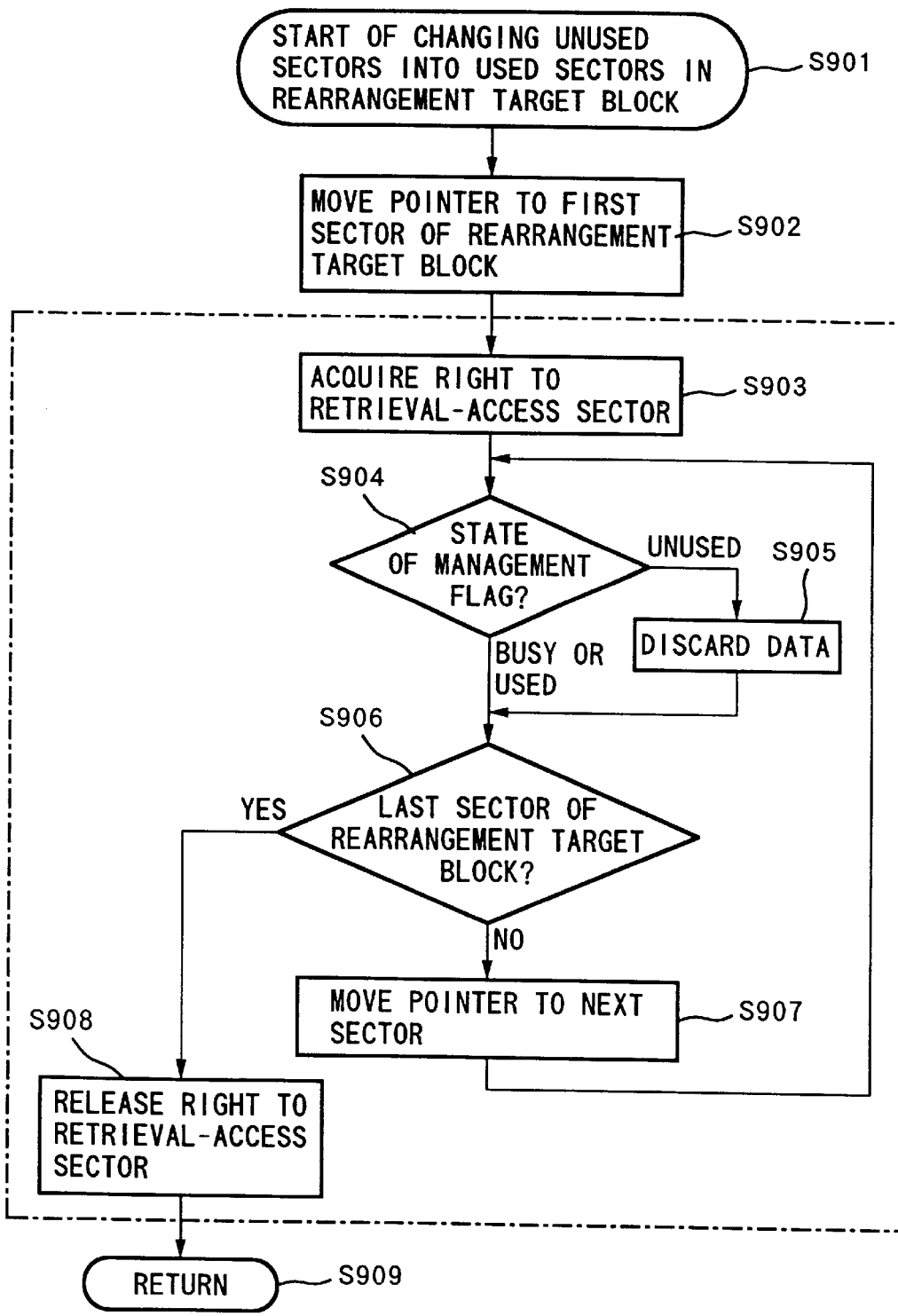
FIG. 26 is a flow chart showing a procedure of changing unused sectors into used sectors in the block to be rearranged.

The processing (step S703) of changing used sectors in the selected rearrangement target block into used sectors will be described below. FIG. 26 is a flow chart showing the procedure of changing unused sectors in the rearrangement target block into used sectors.

In step S901, the processing is started. In step S902, the pointer is moved to the first sector in the rearrangement target block. In step S903, the right to retrieval-access an unused sector is acquired. This processing has the same effect as step S602 in the flow chart of FIG. 23 and exclusively possesses the right to retrieval-access an unused sector during a period enclosed by the long and short dashed lines from step S903 to step S908 in FIG. 26. That is, any other task is inhibited from retrieval-accessing an unused sector until all sectors in the rearrangement target block are scanned and unused sectors are changed into used sectors. However, the time of the exclusive possession of the retrieval right is short because unused sectors are changed into used sectors by operating only the management flag. Accordingly, the throughput of the whole system is not decreased.

In step S904, whether a sector indicated by the current pointer is an unused sector is checked. If the sector is an unused sector, the flow branches to step S905 where the stored contents of the sector are discarded. The procedure in step S905 is already explained with reference to the flow chart in FIG. 21. By this processing, an unused sector is changed into a used sector. In step S906, whether the pointer indicates the last sector in the rearrangement target block is checked. If the pointer indicates the last sector, the flow branches to step S908. If the pointer does not indicate the last sector, the flow branches to step S907. In step S907, the pointer is moved to the next sector and the control is returned to step S904.

If it is determined in step S906 that the pointer indicates the last sector of the rearrangement target block, the right to retrieval-access an unused sector is released in step S908, and the flow returns to the garbage collection processing (the flow chart in FIG. 24) in step S909.

Figure 27:
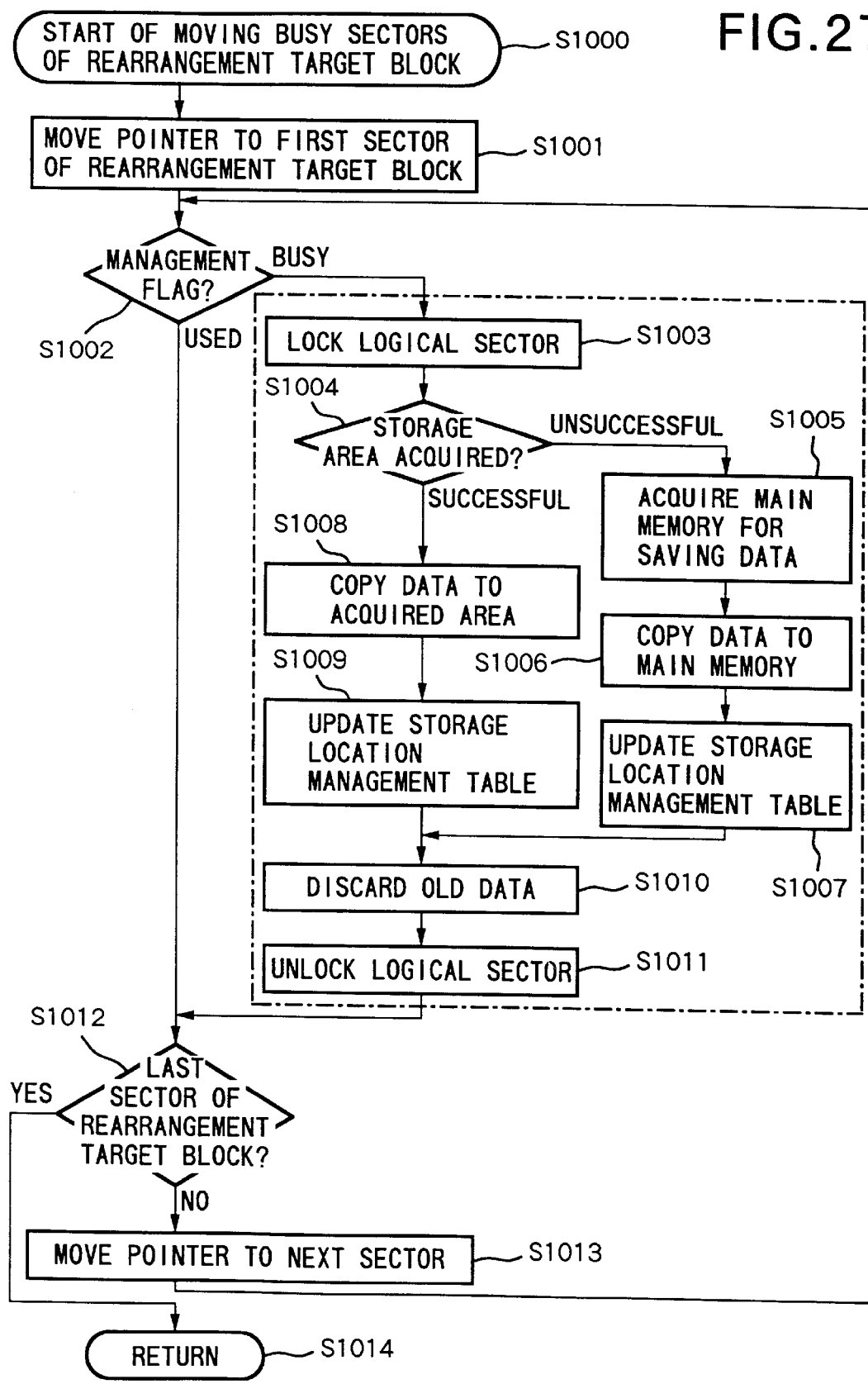
FIG. 27 is a flow chart showing a procedure of moving busy sectors in the block to be rearranged.

The processing (step S704) of moving a busy sector in the rearrangement target block to an unused sector in another erase block will be described below. FIG. 27 is a flow chart showing the procedure of moving a busy sector in the rearrangement target block.

In step S1000, the processing is started. In step S1001, a pointer is moved to the first sector in the rearrangement target block. The sector indicated by the pointer is processed in steps S1002 to S1012 below.

In step S1002, the management flag (the busy state flag or the used state flag) of the sector is checked. If it is determined in step S1002 that the value of the management flag indicates "busy", the control is transferred to step S1003. If the value of the management flag indicates "used", the control is transferred to step S1012. In step S1003, a logical sector is locked. The task of interest occupies the locked sector until it is unlocked in step S1011.

In step S1004, a storage area is acquired. The procedure of acquiring a storage area in step S1004 is as explained with reference to the flow chart in FIG. 23. Since all sectors in the rearrangement target block are changed into used sectors by the processing in step S703, the storage area acquired is an erase block excluding the rearrangement target block.

When the storage area is successfully acquired, the flow advances to step S1008. In step S1008, data in the sector of interest is copied to the acquired area. In accordance with this movement of the sector, the storage location management table 140 is updated in step S1009.

On the other hand, if the acquisition of a storage area is failed in step S1004, the flow branches to step S1005. In step S1005, a storage area for saving data is acquired from the main memory (DRAM). The acquisition of the data saving storage area is as explained in step S306 of the flow chart in FIG. 19. In step S1006, data in the sector of interest is copied to the acquired area. In step S1007, the storage location management table is updated. In step S1010, the original stored contents are discarded. That is, the used state flag of the sector indicated by the pointer is set to TRUE. In step S1011, this logical sector is unlocked.

In step S1012, whether the sector indicated by the pointer is the last sector of the rearrangement target block is checked. If the sector is the last sector, the flow branches to step S1014. If the sector is not the last sector, the flow branches to step S1013. In step S1013, the pointer is moved to the next sector. The flow then returns to step S1002, and the above processing is repeated for the next sector. In step S1014, the flow returns to the garbage collection processing (the flow chart in FIG. 24) since all sectors in the rearrangement target block are completely processed.

Figure 28:
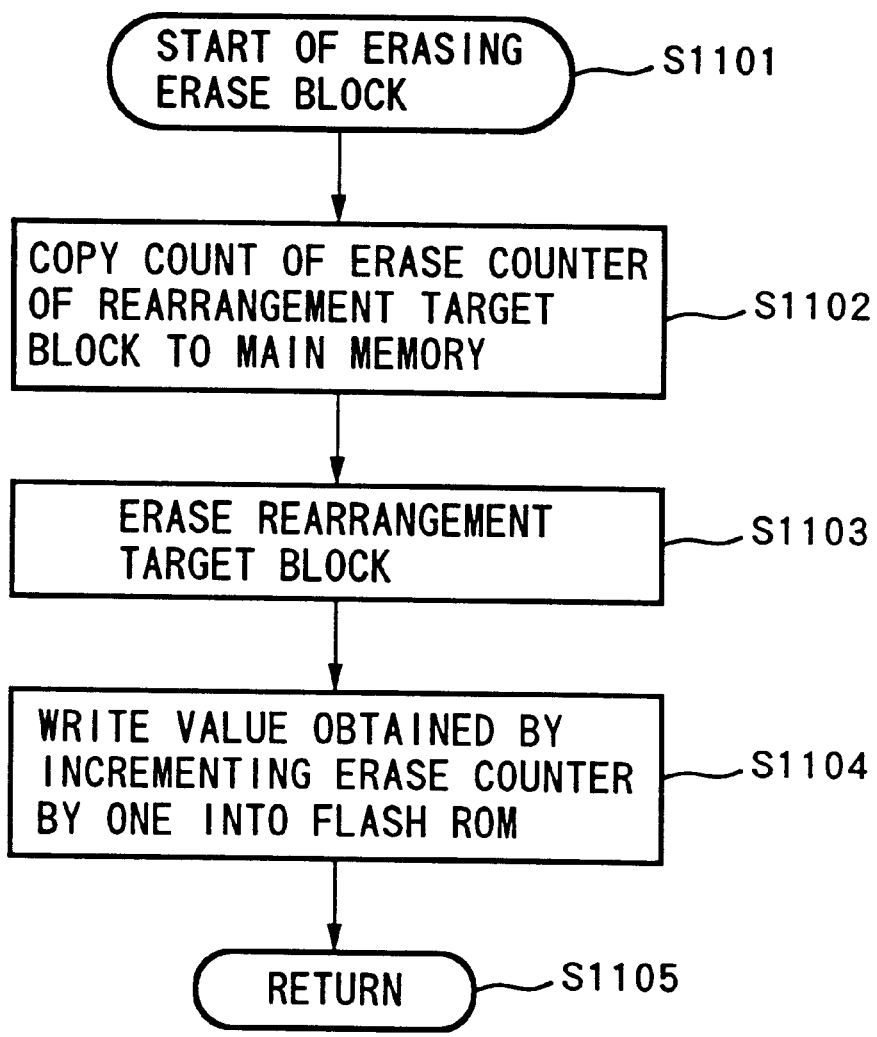
FIG. 28 is a flow chart showing a procedure of erasing an erase block to be rearranged.

The procedure (step S705) of erasing the rearrangement target block will be described below. FIG. 28 is a flow chart showing the procedure of erasing an erase block to be rearranged.

In step S1101, the processing is started. In step S1002, the erase counter of the rearrangement target block is copied to the main memory. In step S1103, the rearrangement target block is erased. In step S1104, a value obtained by incrementing the value of the erase counter copied to the main memory by one is written in the flash ROM. That is, the value of the erase counter of the rearrangement target block is incremented by one from the value before the erasure. In step S1105, the flow returns to the garbage collection processing (the flow chart in FIG. 24).

The garbage collection processing shown in FIG. 24 is done by using the flash ROM as frequently as possible, and so the safety of the saved data is high. However, as explained previously in <When There Is No Unused Sector>, the efficiency of the erase processing is improved when the main memory (DRAM 14) is positively used to save data in busy sectors and erase-access a plurality of erase blocks at the same time. Since data is saved in the DRAM 14, however, the safety of the saved data is lowered (e.g., if the supply of power is stopped due to removable of the battery, the data saved in the DRAM is lost). Therefore, the system can also be so designed that the type of power supply is checked. That is, if the power supply is a battery, the safety of the saved data is assigned priority. If the power supply is an AC adaptor, the efficiency of the erase processing is assigned priority because the power supply hardly stops. This processing will be described below with reference to FIG. 36.

FIG. 36 is a flow chart for explaining a procedure of switching the forms of garbage collection processing on the basis of the type of power supply. In FIG. 36, the same step numbers as in the flow chart of FIG. 24 denote steps for performing the same processing, and a detailed description thereof will be omitted.

When the garbage collection processing is activated in step S1300, the flow advances to step S1301 to check the type of power supply of this apparatus. In this embodiment, the power supply controller 9 shown in FIG. 1 checks whether the power supply is the battery 7 or the AC adaptor 23 and informs the CPU 5 of the result. If the type of power supply is the battery 7, the flow advances to step S1304 to execute the garbage collection processing shown in FIG. 24.

On the other hand, if it is determined in step S1301 that the type of power supply is the AC adaptor, the flow advances to step S1302. In step S1302, processes corresponding to steps S702, S703, and S704 in FIG. 24 are executed to change unused sectors in the selected rearrangement target block into used sectors and save busy sector data. In step S1303, whether the main memory (DRAM 14) has an enough empty area to save sector data is checked. If the main memory has an enough empty area, the flow returns to step S1302. In step S1302, a rearrangement target block different from the previous rearrangement target block is selected, and the above processing is repeated.

If there is no enough empty area any longer in the DRAM 14, the flow advances from step S1303 to step S1304, and the rearrangement target block selected by the above processing is erased. In step S706, the data saved in the main memory is returned to the flash ROM 15, and this processing is completed.

In the processing shown in FIG. 36 as described above, if the power is supplied by the AC adaptor, data is saved by actively using an empty capacity of the main memory. Consequently, a plurality of rearrangement target blocks can be selected and simultaneously erased. This improves the efficiency of the erase processing.

In the above processing, the forms of garbage collection are automatically switched on the basis of the type of power supply. However, it is also naturally possible to manually switch the garbage collection forms by operating the control panel 12.

Figure 29:
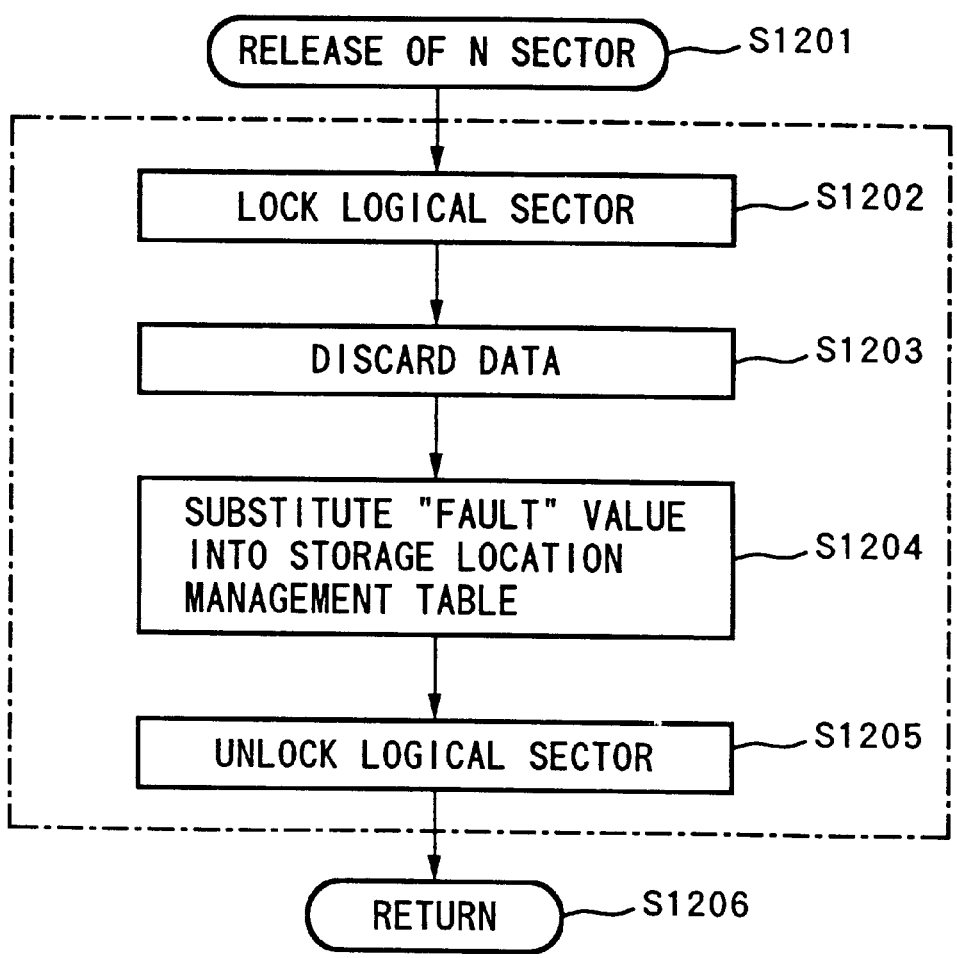
FIG. 29 is a flow chart showing a procedure of releasing a logical sector.

A logical sector release procedure as one basic service will be described below. FIG. 29 is a flow chart showing the logical sector release procedure.

In step S1201, release of an N sector is started. In step S1202, the N sector is locked. As a result, the task of interest can occupy the logical task until it is unlocked in step S1205. In step S1203, the data stored in the sector is discarded. This data discarding processing is as explained in the flow chart of FIG. 21. In step S1204, a "fault" value is substituted into the storage location management table 140 of the DRAM 14. In step S1205, the logical sector is unlocked. In step S1206, the flow returns to the main sequence.

When a general file system such as the MS-DOS (trademark) erases a file, the system overwrites sectors belonging to the file in a FAT but does not release each sector. Therefore, if a file system like this is applied to the flash ROM management system of this embodiment, data rendered invalid on the file system is left as a valid sector, and this decreases the efficiency of, e.g., garbage collection. Accordingly, unnecessary sectors are detected and released on the basis of an instruction (e.g., file erasure) from the file system. Consequently, the efficiency of garbage collection can be improved.

FIG. 37 is a flow chart showing an unnecessary sector release procedure when the file system designates file erasure. Referring to FIG. 37, in step S1401, whether the file system designates file erasure is checked. If file erasure is designated, the flow advances to step S1402, and sectors contained in the file whose erasure is designated are extracted. The extraction of sectors can be performed by referring to the FAT. In step S1403, the sector release processing explained in the flow chart of FIG. 29 is executed for each of the sectors extracted in step S1402.

[Second Embodiment]

The second embodiment will be described below.

<Disk Controller Emulation>

The characteristic features of the flash ROM management system explained in the above first embodiment are very similar to those of a disk medium when viewed from upper layers. Accordingly, by incorporating this memory management system into a system including a disk controller emulation function, a disk controller and a disk medium can be replaced with the disk controller emulation and the memory management system of this embodiment (or an IC card incorporating the memory management system of the embodiment). Recently, IC cards represented by a PCMCIA have become popular, and these IC cards can be used as removal storage media by incorporating the disk controller emulation function and the memory management system of the first embodiment in the cards. In the second embodiment, an IC card incorporating the memory management system of the first embodiment will be described.

Figure 30:
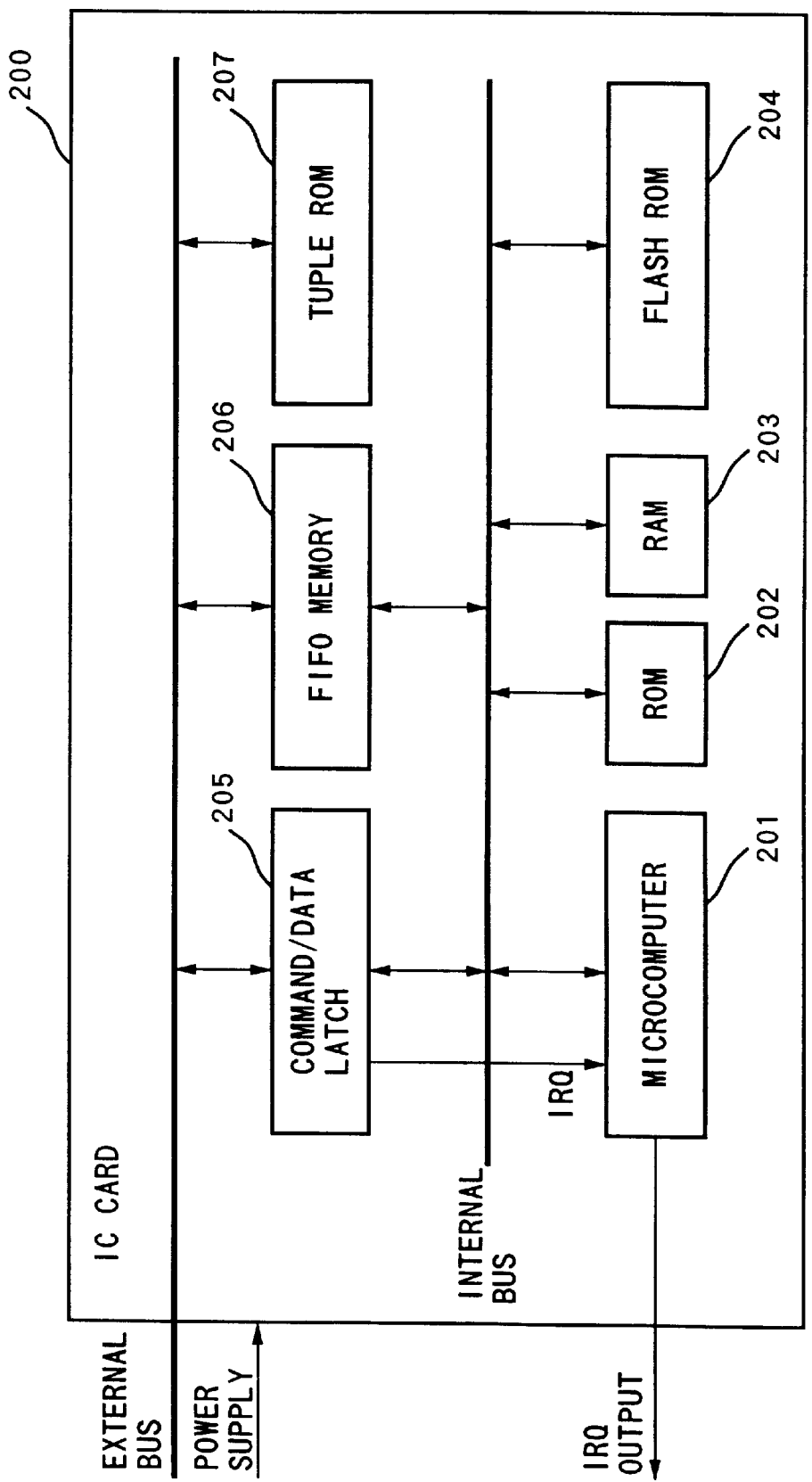
FIG. 30 is a block diagram showing the configuration of an IC card according to the second embodiment.

FIG. 30 is a block diagram showing the configuration of the IC card according to the second embodiment. In FIG. 30, reference numeral 200 denotes the whole IC card. A microcomputer 201 performs disk controller emulation and memory management. A ROM 202 stores programs of the microcomputer 201. A RAM 203 functions as a main memory of the microcomputer 201. A flash ROM 204 stores data in accordance with the memory management system explained in the first embodiment. That is, the flash ROM 204 is managed by the management area and the data area shown in FIG. 4.

A command/data latch 205 latches, e.g., commands and cylinder numbers received from a host apparatus through an external bus. A FIFO memory 206 inputs and outputs data by first-in first-out. A tuple ROM 207 stores, e.g., the characteristic features of this card and can be read out only from the external bus.

The functions of the individual components will become more apparent from the following description of operations.

Figure 31:
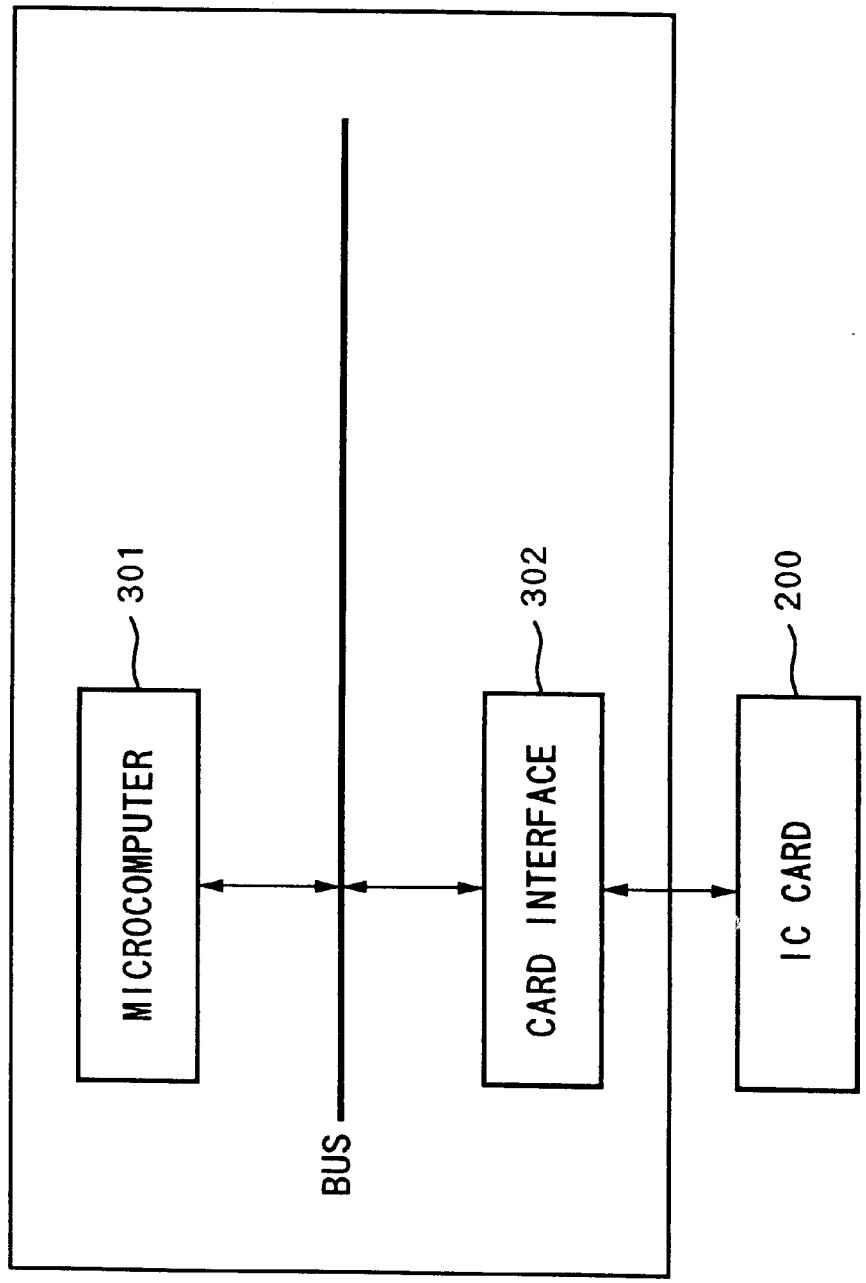
FIG. 31 is a schematic block diagram showing a host system which uses the IC card of the second embodiment.

FIG. 31 is a schematic block diagram showing a host system which uses the IC card of the second embodiment. In FIG. 31, reference numeral 301 denotes a microcomputer of the host system. A card interface 302 connects the internal bus of the host system and the external bus of the IC card 200. This card interface 302 also includes a power supply line for supplying power to the IC card 200 and a signal line for accepting an interrupt request (IRQ output) from the IC card 200.

Figure 32:
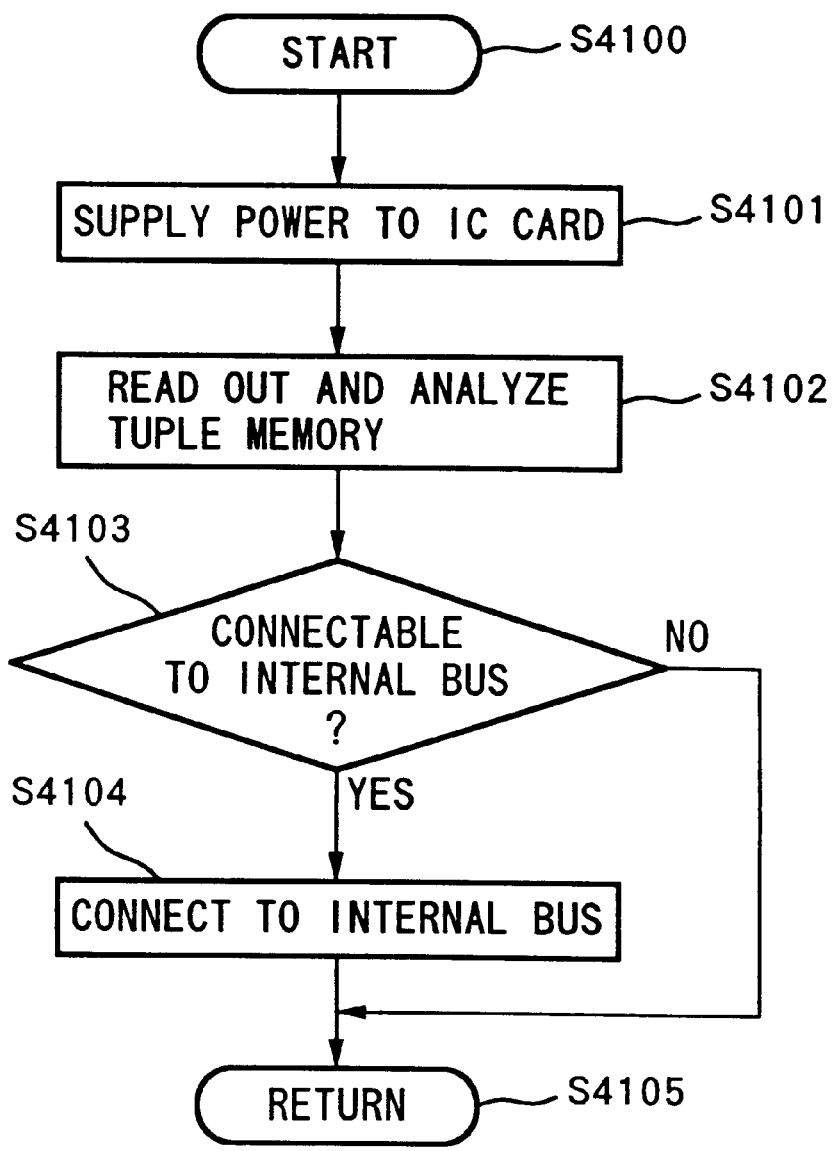
FIG. 32 is a flow chart showing a procedure by which the host system shown in FIG. 31 connects the IC card.

FIG. 32 is a flow chart showing a procedure by which the host system shown in FIG. 31 connects the IC card. In step S4100, the processing is started. In step S4101, power supply to the IC card is started. In step S4102, data stored in a tuple form in the tuple ROM 207 of the IC card 200 is analyzed. The features of the connected IC card can be known by analyzing the contents of the tuple ROM 207.

In step S4103, whether the connected IC card is connectable to the internal bus is checked by using the tuple information analyzed in step S4102. If the IC card is connectable, the flow branches to step S4104. If the IC card is not connectable, the flow branches to step S4105. In step S4104, the bus of the IC card is mapped in the memory space and the IO space of the internal bus of the host. The result is equivalent to the state in which a disk controller exists in the bus space of the host apparatus.

Figure 33:
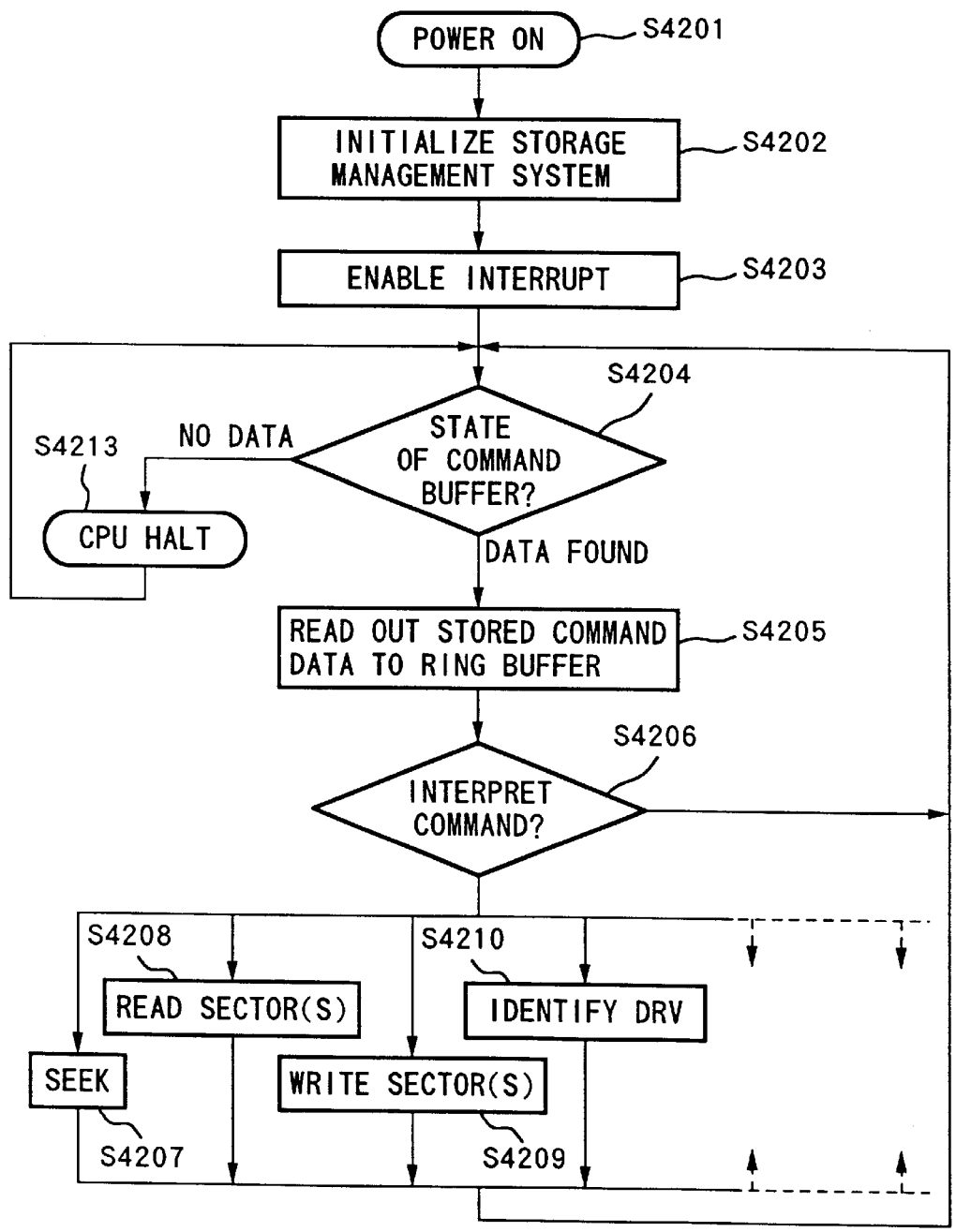
FIG. 33 is a flow chart showing the main sequence of a microcomputer in the IC card.

FIG. 33 is a flow chart showing the main sequence of the microcomputer 201 of the IC card 200. When power supply to the IC card is started in step S4201, the memory management system is initialized in step S4202. That is, the states of logical sectors in all erase blocks of the flash ROM 204 are once read out, and a storage location management table is formed in the RAM 203 as the main memory in accordance with the readout information. In step S4203, a ring-like buffer is prepared as a command buffer in the main memory, and interrupt processing is enabled. After this processing the operation of an interrupt routine is started.

Figure 34:
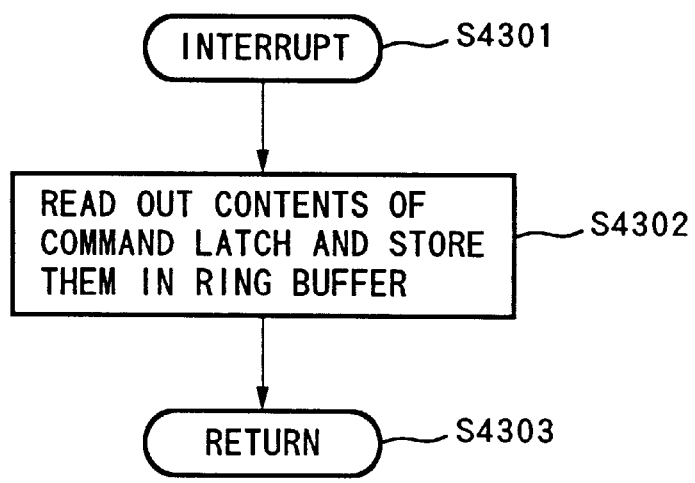
FIG. 34 is a flow chart showing the procedure of interrupt processing done by the microcomputer in the IC card.

FIG. 34 is a flow chart showing the sequence of this interrupt routine. The flow chart in FIG. 34 will be described below because understanding the operation of the interrupt routine simplifies the explanation of the flow chart in FIG. 33.

When the host system writes a command at a command address of the command/data latch 205, the command/data latch 205 generates an interrupt to the microcomputer 201. The command/data latch 205 is mapped in the IC address space of the host bus and the internal bus of the IC card, and commands and data are assigned IO addresses as shown in FIG. 35. In this embodiment, an interrupt is generated to the microcomputer 201 when a command (e.g., ReadSector(s)) which designates a data read operation) is written at an address Command in FIG. 35.

When the interrupt occurs, the software of the microcomputer 201 transfers the control to step S4301 of the flow chart in FIG. 34. In step S4302, the data written in the command/data latch 205 is read out and stored in the ring buffer of the main memory. In step S4303, the interrupt routine is completed and the flow returns to the flow chart shown in FIG. 33.

Referring back to the flow chart in FIG. 33, the microcomputer 201 checks the state of the command buffer in step S4204. If data is stored in the command buffer, the flow branches to step S4205. If no data is stored in the command buffer, the flow branches to step S4213. In step S4123, the CPU is halted. Many one-chip microcomputers have a function of reducing the consumption current by halting the execution of commands. The CPU of this embodiment also has a function of this sort. When an interrupt request signal is input by IRQ, the CPU 201 returns from the halted state and executes the interrupt routine described above. When the execution of the interrupt program is completed, the flow returns from step S4213 to step S4204.

If data is stored in the command buffer in step S4204, the flow advances to sep S4205. In step S4205, data is read out from the ring buffer. In step S4206, the command is interpreted. If the command is a Seek command, a ReadSector(s) command, a WriteSector(s) command, or an IdentifyDrv command, the flow branches to step S4207, S4208, S4209, or S4210. Although there are some other commands, those not so important to explain this embodiment are omitted to simplify the flow chart. When the execution of commands in steps S4207 to S4210 is completed, the flow returns to step S4204 to repeat the above processing.

In step S4207, the Seek command is executed. Since the flash ROM does not have a head unlike a disk device, "Seek" is to merely check, e.g., the validity, to prepare for the next command. If a head position exceeding the number of heads supported by the IC card is specified, an error occurs as in the case of a disk device.

In step S4208, processing corresponding to the ReadSector(s) command is executed. In the ReadSector(s) command, the number of sectors to be read out is specified by SectorCount shown in FIG. 35. In step S4208, therefore, SectorCount sectors in the specified location are read out. The memory management system of this embodiment performs management by using linear logical sector numbers. Accordingly, the system calculates linear logical sector numbers on the basis of cylinder/head/sector numbers, transfers the contents of the logical sectors to the FIFO memory 206, and also increments SectorNumber in the command/data latch 205. The FIFO memory 206 can read out data written from the internal bus of the IC card 200 from the external bus and read out data written from the external bus from the internal bus of the IC card.

The linear logical sector numbers will be described below. Generally, numbers specified for a hard disk are three-dimensional discontinuous numbers determined by three parameters, a sector, a cylinder, and a head. As an example, in a hard disk having 1024 cylinders, 16 heads, and 63 sectors, the number of sectors is 1024×16×63=1,032,192.

Although it is convenient if these sectors can be accessed as sector Nos. 0 to 1,032,192, the device is so designed that each sector is accessed by specifying all of the three parameters described above. For example, cylinder 501•head 0•sector 1 is accessed after cylinder 500•head 16•sector 63. These three parameters are called CHS parameters by using their respective first letters.

In an operating system such as the MS-DOS (trademark), linear (continuous) sector numbers are internally used, but a device driver converts these numbers into CHS parameters. Since linear sector numbers are used in the system of this embodiment, linear sector numbers are obtained on the basis of the values of CHS parameters. In the case of the above hard disk, a linear logical sector number is obtained by calculating cylinder number×(16×63)+head number×(63)+sector number In step S4209, data is written in a sector of the location specified by the data latch. The data is received from the host system via the FIFO memory 206.

In step S4210, information indicating a specific hard disk that the IC card 200 is emulating is returned. That is, data containing the specification of a hard disk such as the number of cylinders and ModelNumber is written in the FIFO memory 206.

<Analysis of File System>

As described above, an IC card incorporating the memory management system explained in the first embodiment can be used to replace, e.g., an ATA hard disk. However, there is no method of obtaining, from a host system, information such as an ATA command for performing processing of releasing a FAT cache or unnecessary sectors produced by file erasure. This function of releasing a FAT cache and unnecessary sectors can be realized by adding a sector release command and a command for designating a sector number to be cached by using an empty area of an ATA command. It is of course convenient if the release of a FAT cache and sectors is realized in existing systems such as the MS-DOS in which a function like this is not supposed.

A FAT system stores the location and the size of a FAT in a portion corresponding to logical sector No. 0. In this embodiment, the location and the size of a FAT are obtained by reading this sector and used to process a FAT cache. Analogously, although IC cards originally do not understand the contents of written data, by analyzing information (a directory entry or a FAT) for a file system it is also possible to allow IC cards to independently find and release unnecessary files. This is naturally not limited to a FAT. For example, unnecessary sectors can be detected by analyzing the contents of written data even in file systems of HPSF and Macintosh (trademark). With this arrangement, optimization meeting the operation of a file system can be performed even by the use of an interface of an ATA hard disk.

Figure 49A:
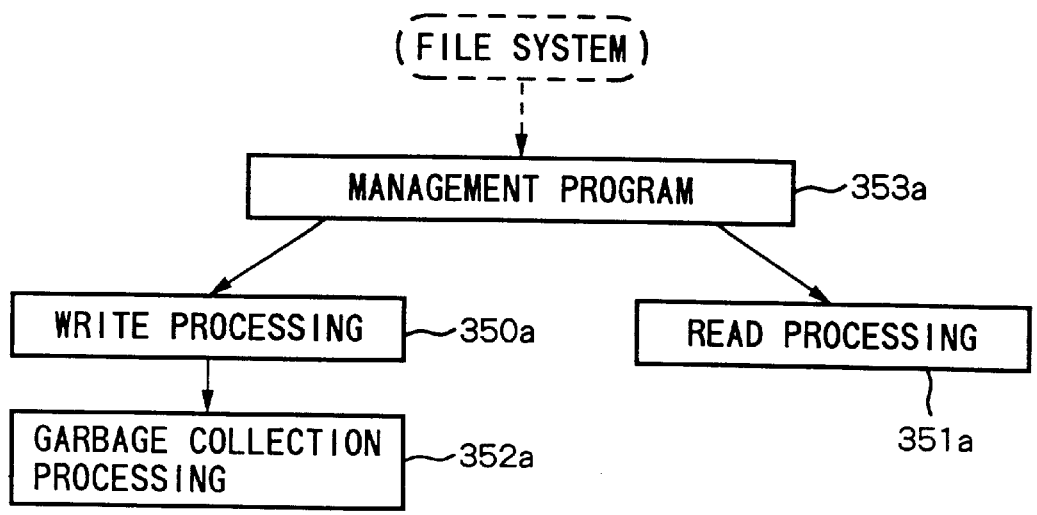
FIGS. 49A to 56B are views for explaining the contents of storage media which provide control programs for accomplishing the control of the embodiment.
Figure 49B:
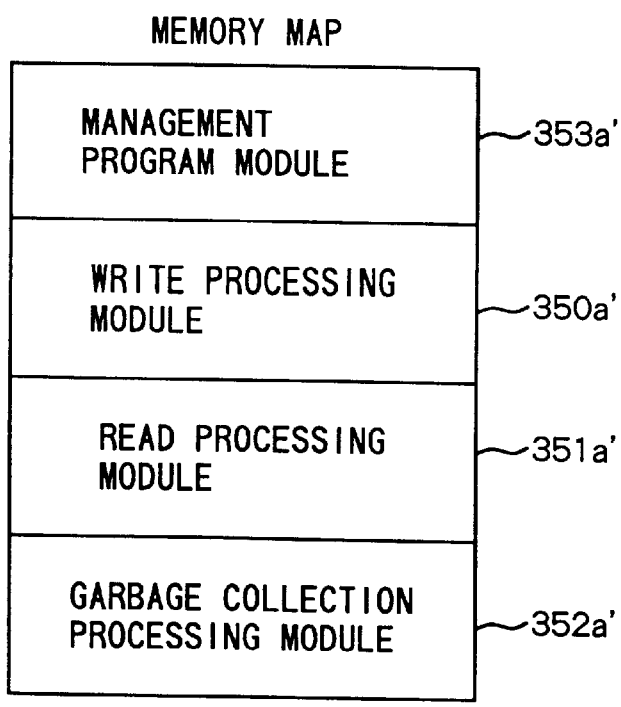

The object of the present invention achieved by the function of the above apparatus or method can be achieved by a storage medium storing the program of the above embodiment. For example, the storage medium is mounted in a personal computer, and a flash ROM management program (to be described below) read out from the storage medium is executed. Consequently, the flash ROM can be used like a disk system. FIGS. 49A and 49B illustrate the structural features of a program according to the present invention by which a storage unit of data in the flash ROM is made smaller than an erase unit and thereby made compatible with the file system.

FIG. 49A is a view showing a control procedure of a control program stored in a storage medium of this embodiment. FIG. 49B is a view showing a memory map of this storage medium.

In FIG. 49A, write processing 350a receives a write instruction including a logical sector number which indicates a write destination of data, writes the data in one of a plurality of data areas, and writes the logical sector number in a management area corresponding to the data area. A detailed processing procedure is as explained with reference to the flow chart shown in FIG. 19. Read processing 351a receives a read instruction including a logical sector number which indicates a read source of data, retrieval-accesses a management area in which the logical sector number is stored, and reads out the data stored in a data area corresponding to the retrieval-accessed management area. A detailed processing procedure is as explained with reference to the flow chart in FIG. 18.

The write processing 350a and the read processing 351a are executed in accordance with a write request and a read request, respectively, from the host file system. A management program 353a manages requests from the host file system and controls the activation of the write processing 350a and the read processing 351a.

Garbage collection processing 352a selects an erase block to be rearranged, saves valid data in the selected erase block, and erases the erase block. This garbage collection processing is as explained in the flow chart of FIG. 24. The garbage collection processing is executed on the basis of the result of evaluation of the storage efficiency done by the write processing 350a (steps S311 and S312 in FIG. 19). A control program for accomplishing the above control procedure is stored in the form of a configuration as shown in the memory map of FIG. 49B in a storage medium such as a floppy disk, a hard disk, or a CD-ROM.

Figure 50A:
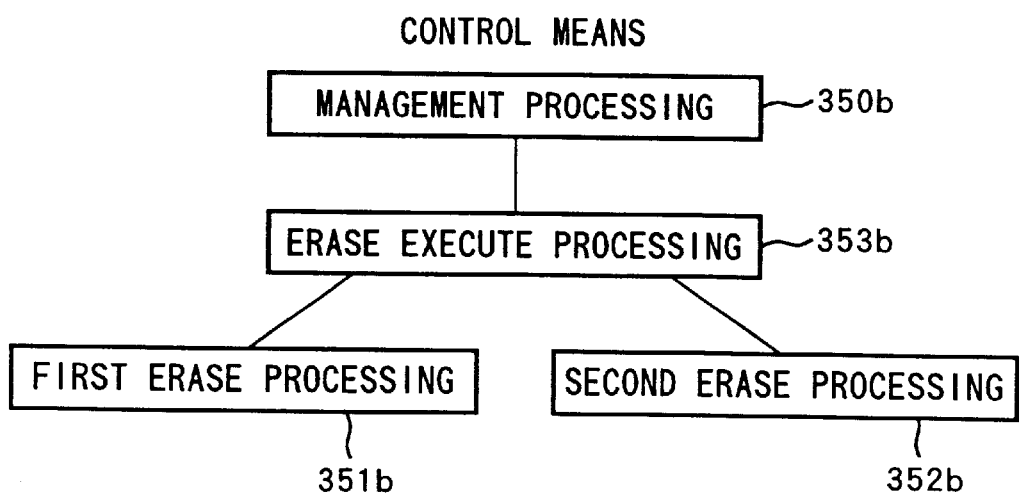
Figure 50B:
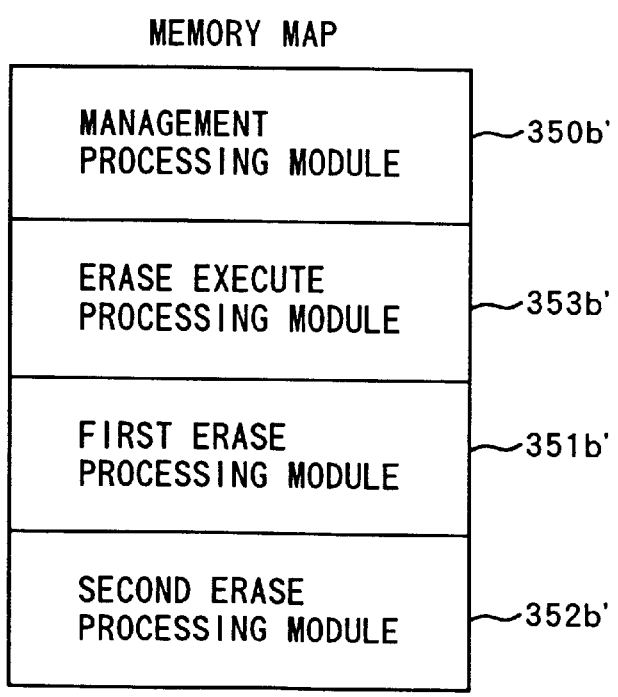

FIGS. 50A and 50B illustrate the structural features of a program according to the present invention by which valid data to be erased existing in an erase unit of the flash ROM is safely and rapidly retained. FIG. 50A shows a control procedure of a control program stored in a storage medium of this embodiment. FIG. 50B shows a memory map of this storage medium.

In FIG. 50A, management processing 350b forms a plurality of sectors each consisting of a data area and a management area corresponding to the data area in the flash ROM 15, stores a management flag indicating the storage state of the data area and a sector number in the management area of each sector, and manages access to the flash ROM on the basis of the information in the management area. For example, the management processing 350b controls data write and read operations to the flash ROM in units of sectors as shown in the flows charts of FIGS. 18 and 19.

As shown in the flow chart of FIG. 24, first erase processing 351b extracts sectors in which valid data exists in the data area, from one erase block in the flash ROM 15, on the basis of the management flag, preferentially moves the extracted contents to another erase block in the flash ROM 15, and erases the first erase block. Also, as shown in steps S1302 to S1304 and S706 of FIG. 36, second erase processing 352b extracts sectors in which valid data exists in the data area, from a plurality of erase blocks, on the basis of the management flag, positively moves the extracted contents to the DRAM 14, and erases these erase blocks.

Erase execute processing 353b selects one of the first erase processing and the second erase processing on the basis of the type of power supply of the apparatus in which the flash ROM is incorporated, and executes the selected erase operation (step S1301 in FIG. 36).

A control program for accomplishing the above control procedure is stored in the form of a configuration as shown in the memory map of FIG. 50B in a storage medium such as a floppy disk, a hard disk, or a CD-ROM.

Figure 51A:
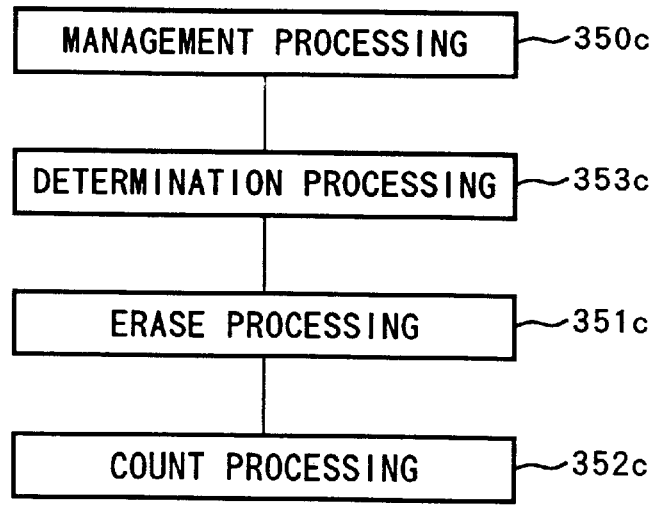
Figure 51B:
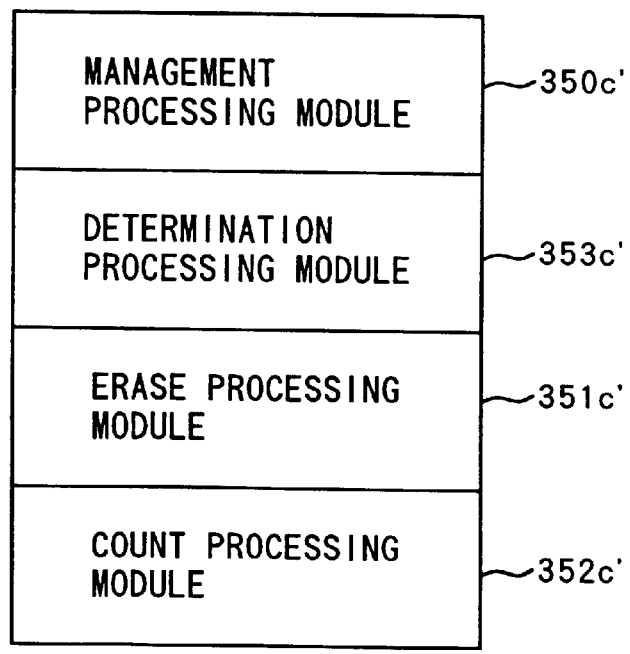

FIGS. 51A and 51B illustrate the structural features of a program according to the present invention by which variations, resulting from, e.g., garbage collection, in the erase counts of individual erase units of the flash ROM are reduced. FIG. 51A shows a control procedure of a control program stored in a storage medium of this embodiment. FIG. 51B shows a memory map of this storage medium.

In FIG. 51A, management processing 350c forms a plurality of sectors each consisting of a data area and a management area corresponding to the data area in the flash ROM, stores state information (a sector number 154, a busy state flag 155, and a used state flag 156) indicating the storage state of the data area in the management area of each sector, and manages access to the flash ROM 15 on the basis of this state information. For example, the management processing 350c controls data write and read operations to the flash ROM in units of sectors as illustrated in the flow charts of FIGS. 18 and 19.

Erase processing 351c extracts sectors in which valid data exists in the data area, from an erase block in the flash ROM, on the basis of the state information, moves the extracted contents, and erases the erase block. This is the garbage collection processing shown in the flow chart of FIG. 24.

Count processing 352c counts the number of erase operations performed by the erase processing 351c, as the erase count, for each erase block, and stores the erase count in an erase counter 152 of each erase block. This is the processing shown in steps S1102 and S1104 of FIG. 28.

Determination processing 353c determines an erase block to be erased by the erase processing 351c on the basis of the value of the erase counter. This is the processing shown in the flow chart of FIG. 25.

An actual control procedure is as follows. When the management processing 350c designates the start of the garbage collection processing, the determination processing 353c refers to the erase counter 152 and determines an erase block to be erased. The erase processing 351c erases the erase block to be erased which is determined by the determination processing. The count processing 352c increments the erase counter 152 of this erase block by one.

A control program for accomplishing the above control procedure is stored in the form of a configuration as shown in the memory map of FIG. 51B in a storage medium such as a floppy disk, a hard disk, or a CD-ROM. This control program is read out by an information processing apparatus such as a personal computer, loaded in a main memory (RAM), and executed by a CPU. The control program can also be loaded in the main memory via a LAN.

In FIG. 51B, a management processing module 350c', a determination processing module 353c', an erase processing module 351c', and a count processing module 352c' are program modules for executing the management processing 350c, the determination processing 353c, the erase processing 351c, and the count processing 352c, respectively, depicted in the control procedure.

Figure 52A:
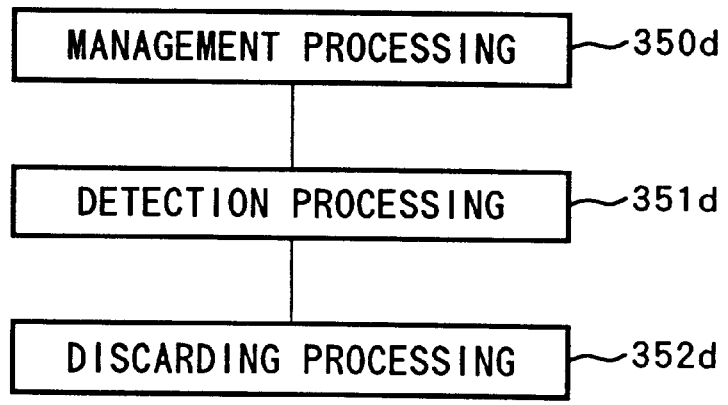
Figure 52B:
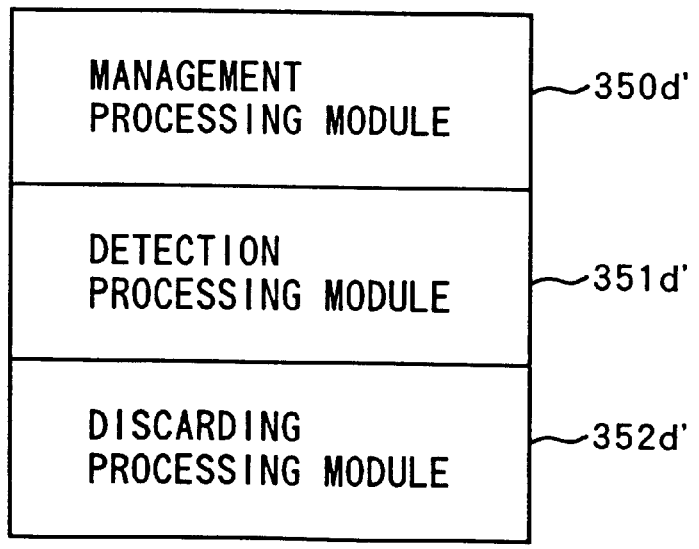

FIGS. 52A and 52B illustrate the structural features of a program according to the present invention by which a storage block corresponding to a sector in the flash ROM can be released. FIG. 52A shows a control procedure of a control program stored in a storage medium of this embodiment. FIG. 52B shows a memory map of this storage medium.

In FIG. 52A, management processing 350d forms a plurality of sectors each consisting of a data area and a management area corresponding to the data area in the flash ROM, stores state information (the sector number 154, the busy state flag 155, and the used state flag 156) indicating the storage state of the data area in the management area of each sector, and manages access to the flash ROM on the basis of the state information. For example, the management processing 350d controls data write and read operations to the flash ROM in units of sectors as shown in the flow charts of FIGS. 18 and 19.

Detection processing 351d detects unnecessary sectors on the basis of an instruction from the file system. For example, if the instruction indicates erasure of a file, the detection processing refers to a FAT and detects sectors belonging to the file (this corresponds to step S1402 in FIG. 37).

Discarding processing 352d sets the used state flag in the management area of a designated sector to TRUE, updates the storage location management table, and discards (releases) the designated sector (the flow chart in FIG. 29). The discarding processing 352*d* can also discard a sector detected by the detection processing 351*d* (step S1403 in FIG. 37) and discard a sector designated by the file system.

A control program for accomplishing the above control procedure is stored in the form of a configuration as shown in the memory map of FIG. 52B in a storage medium such as a floppy disk, a hard disk, or a CD-ROM.

In FIG. 52B, a management processing module 350*d'*, a detection processing module 351*d'*, and a discarding processing module 352*d'* are program modules for executing the management processing 350*d*, the detection processing 351*d*, and the discarding processing 352*d*, respectively, depicted in the control procedure.

Figure 53A:
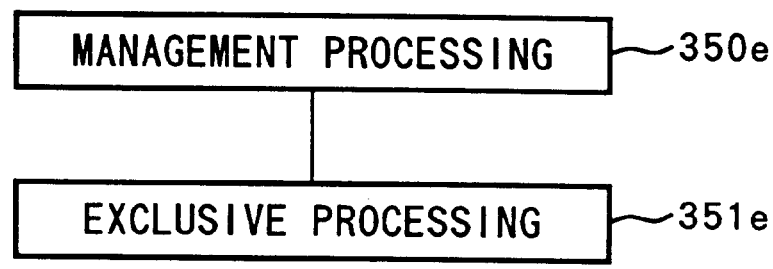
Figure 53B:
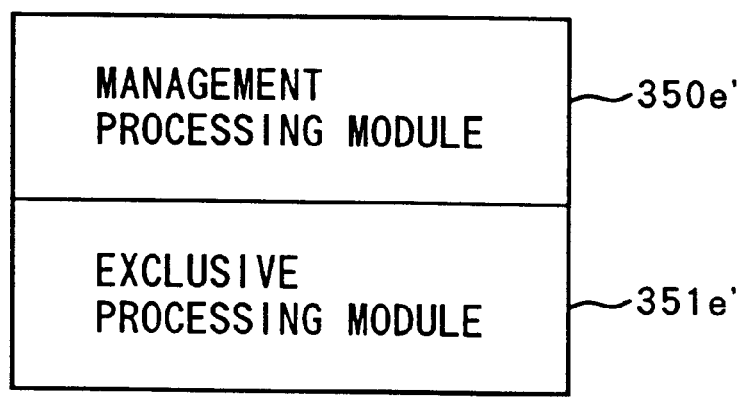
Figure 54A:
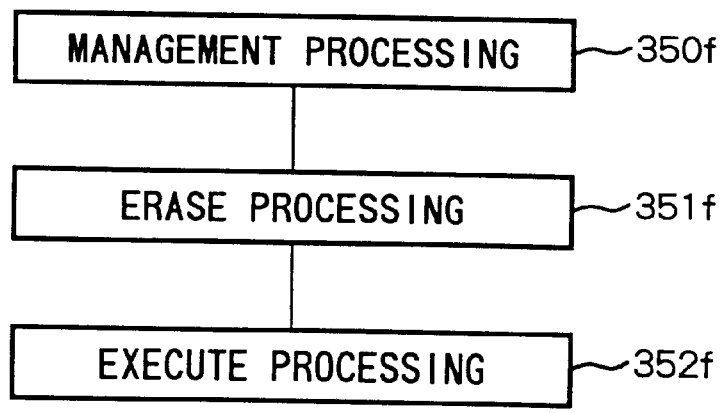
Figure 54B:
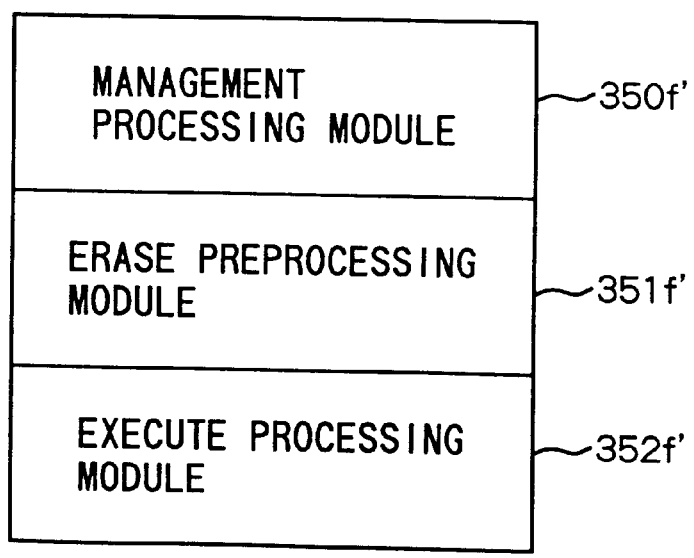

FIGS. 53A, 53B, 54A, and 54B illustrate the structural features of programs according to the present invention by which a management method of adapting the flash ROM to the file system can be suitably applied to a multitask system. FIGS. 53A and 54A show control procedures of control programs stored in a storage medium of this embodiment. FIGS. 53B and 54B show memory maps of this storage medium.

In FIG. 53A, management processing 350*e* forms a plurality of sectors each consisting of a data area and a management area corresponding to the data area in the flash ROM, stores state information (the sector number 154, the busy state flag 155, and the used state flag 156) indicating the storage state of the data area in the management area of each sector, and manages access to the flash ROM on the basis of the state information. For example, the management processing 350*e* controls data write and read operations to the flash ROM in units of sectors as shown in the flow charts of FIGS. 18 and 19.

When one of the storage blocks is accessed by one of a plurality of tasks which can be executed in parallel, exclusive processing 351*e* inhibits access to this accessed storage block from other tasks. This is equivalent to the logical sector locking processing in step S202 of FIG. 18 or step S302 of FIG. 19.

A control program for accomplishing the above control procedure is stored in the form of a configuration as shown in the memory map of FIG. 53B in a storage medium such as a floppy disk, a hard disk, or a CD-ROM.

In FIG. 53B, a management processing module 350*e'* and an exclusive processing module 351*e'* are program modules for executing the management processing 350*e* and the exclusive processing 351*e*, respectively.

In FIG. 54A, management processing 350*f* performs the same processing as the management processing 350*e*. Erase preprocessing 351*f* performs preprocessing for improving the erase rate with respect to a storage block whose state information indicates invalid data. That is, this processing is equivalent to the preprocessing shown in FIG. 38. Execute processing 352*f* assigns the erase preprocessing to a task with a low priority of a plurality of tasks whose operations are scheduled in accordance with the given priorities, and makes this task execute the erase preprocessing. When this program is applied to a multitask system in which priorities can be set, a task with a low priority is made to execute the erase preprocessing. This prevents the erase preprocessing from having influences on other tasks.

In FIG. 54B, a management processing module 350*f'*, an erase preprocessing module 351*f'*, and an execute processing module 352*f'* are program modules for executing the management processing 350*f*, the erase preprocessing 351*f*, and the execute processing 352*f*, respectively.

Figure 55A:
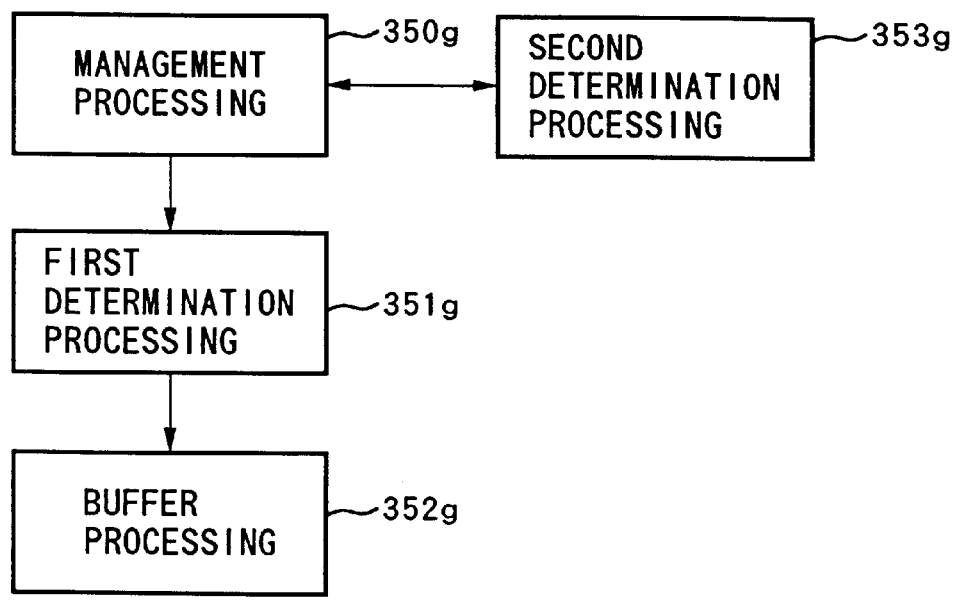
Figure 55B:
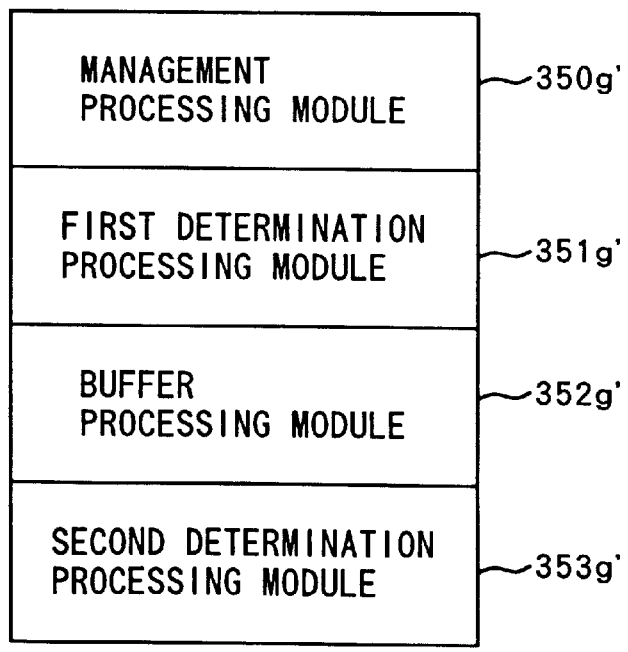

FIGS. 55A and 55B illustrate the structural features of a program according to the present invention by which an increase in invalid data in the flash ROM is reduced by using a cache memory. FIG. 55A shows a control procedure of a control program stored in a storage medium of this embodiment. FIG. 55B shows a memory map of the storage medium.

In FIG. 55A, management processing 350*g* forms a plurality of sectors each consisting of a data area and a management area corresponding to the data area in the flash ROM, stores state information (the sector number 154, the busy state flag 155, and the used state flag 156) indicating the storage state of the data area in the management area of each sector, and manages access to the flash ROM on the basis of the state information. For example, the management processing 350*g* controls data write and read operations to the flash ROM in units of sectors as shown in the flow charts of FIGS. 18 and 19.

First determination processing 351*g* determines whether a sector has predetermined information to be buffered by using a cache. Buffer processing 352*g* performs buffering for caching in units of storage blocks for a sector found to require buffering by the determination processing. In the first embodiment, buffering is performed for sectors for storing FAT data as shown in FIGS. 11, 13, and 14.

When the flash ROM 15 is accessed, second determination processing 353*g* determines whether a storage block as the destination of access has predetermined information. If the second determination processing 353*g* determines that a sector having predetermined information is accessed, the management processing 350*g* preferentially accesses the contents buffered by the buffer processing (step S1502 in FIG. 13 and step S1600 in FIG. 14).

A control program for accomplishing the above control procedure is stored in the form of a configuration as shown in the memory map of FIG. 55B in a storage medium such as a floppy disk, a hard disk, or a CD-ROM. In FIG. 55B, a management processing module 350*g'*, a first determination processing module 351*g'*, a buffer processing module 352*g'*, and a second determination processing module 353*g'* are control modules for executing the management processing 350*g*, the first determination processing 351*g*, the buffer processing 352*g*, and the second determination processing 353*g*, respectively.

Figure 56A:
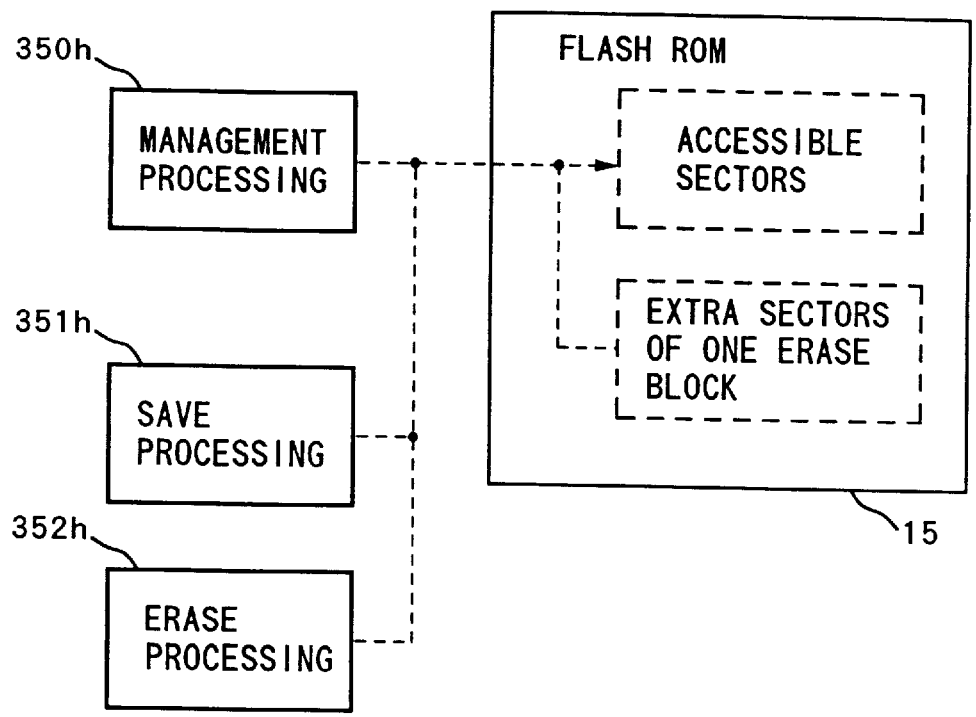
Figure 56B:
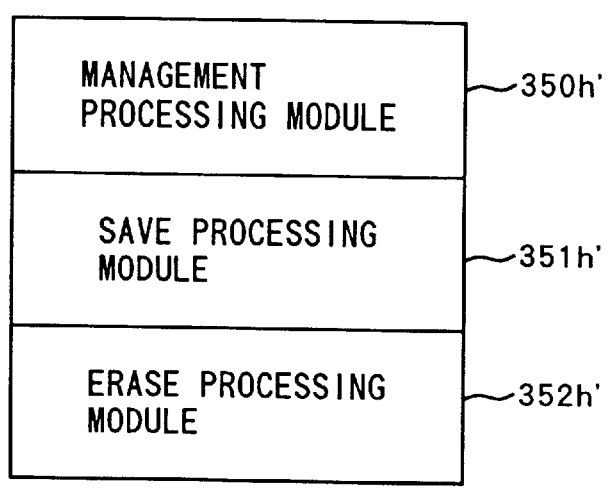

FIGS. 56A and 56B illustrate the structural features of a program according to the present invention by which a decrease in the storage efficiency is prevented by preparing extra areas in addition to the total amount of areas accessed by the file system in flash ROM management. FIG. 56A shows a control procedure of a control program stored in a storage medium of this embodiment. FIG. 56B shows a memory map of this storage medium.

In FIG. 56A, management processing 350*h* forms a plurality of sectors each consisting of a data area and a management area corresponding to the data area in the flash ROM, stores state information (the sector number 154, the busy state flag 155, and the used state flag 156) indicating the storage state of the data area in the management area of each sector, and manages access to the flash ROM on the basis the state information. For example, the management processing 350*h* controls data write and read operations to the flash ROM in units of sectors as shown in the flow charts of FIGS. 18 and 19.

Save processing 351*h* extracts sectors in which data in the data area is valid (sectors in which the busy state flag is TRUE and the used state flag is FALSE) from an erase block in the flash ROM 15, and saves the contents of the extracted sectors to the outside of the erase block. Erase processing 352*h* erases this erase block after the save processing has completely saved all sectors having valid data in the erase block.

Since the program includes the save processing 351*h* and the erase processing 352*h* as described above, sectors having invalid data can be changed into unused sectors, and this permits the flash ROM to be efficiently used. However, if data to be stored increases to use up all unused sectors in the flash ROM, it is no longer possible, when data is updated, to write the updated data in another area. As a consequence, to update one sector, it is necessary to execute the save processing 351*h* and the erase processing 352*h* by using the DRAM 14 as a destination to which data is saved, change the sector in which the data is updated into an unused area, and write the updated data into that sector.

To avoid this complicated processing, sectors (extra sectors) are formed in the flash ROM 15 in addition to sectors to be accessed by the management processing 350*h*, and the management processing 350*h* manages access to the flash ROM 15 by using all of these sector areas. For example, when extra sectors corresponding to one erase block are prepared, it is possible to reserve unused areas corresponding to one erase block. This makes it possible to prevent a decrease in the efficiency of the storage processing in the flash ROM 15.

That is, the management processing 350*h* has extra sectors corresponding to one erase block in addition to sectors which can be accessed by a request from, e.g., the file system.

A control program for accomplishing the above control procedure is stored in the form of a configuration as shown in the memory map of FIG. 56B in a storage medium such as a floppy disk, a hard disk, or a CD-ROM. In FIG. 56B, a management processing module 350*h*', a save processing module 3501*h*', and an erase processing module 352*h*' are program modules for executing the management processing 350*h*, the save processing 351*h*, and the erase processing 352*h*, respectively.

The above control program is read out by an information processing apparatus such as a personal computer, loaded in a main memory (RAM), and executed by a CPU. The control program can also be loaded in the main memory via a LAN.

The present invention can be applied to a system constituted by a plurality of devices or to an apparatus comprising a single device. Further, the present invention can also be achieved by providing programs to a system or an apparatus. In this case, the storage medium storing the programs according to the present invention constitutes the invention. By reading out the programs from the storage medium into the system or the apparatus, the system or the apparatus operates in a predetermined manner.

In the present invention, as has been described above, a data read•write unit (storage unit) smaller than an erase unit can be managed in a flash ROM. Consequently, a flash ROM with a large erase unit can be made compatible with a file system.

The above effect also permits a flash ROM designed for BIOS and having an erase unit of 64 KB to provide a file system with services similar to those provided by a hard disk.

In the present invention, valid data present in an erase unit to be erased can be saved safely and rapidly.

In the present invention, variations in erase counts of erase units can be reduced in a management method capable of adapting a flash ROM to a file system.

In the present invention, storage blocks equivalent to sectors can be released and invalid data can be efficiently erased in a management method capable of adapting a flash ROM to a file system.

In the present invention, it is possible to detect a storage block whose data is to be invalidated on the basis of the contents of access from a file system to a flash ROM and discard (invalidate) the data in the storage block. This facilitates management of valid and invalid data in a storage block.

In the present invention, a management method capable of adapting a flash ROM to a file system can be suitably applied to a multitask system.

In the present invention, a plurality of tasks can efficiently perform write operations to a plurality of flash ROMS.

In the present invention, a task with a low priority can execute preprocessing for improving the processing speed of erase processing. Consequently, garbage collection processing or the like can be performed at a high speed.

In the present invention, data access is performed while information whose contents are frequently rewritten is stored in a cache memory. This decreases the number of write operations to a flash ROM and reduces an increase in invalid data in the flash ROM.

In the present invention, extra areas are prepared in a flash ROM in addition to the total capacity of areas to be accessed by data read and write operations. Consequently, a decrease of the storage efficiency in the flash ROM can be prevented.

In the present invention, it is possible to manage a data read•write unit (storage unit) smaller than an erase unit in a flash ROM incorporated into an IC card. Accordingly, a flash ROM with a large erase unit can be made compatible with a file system.

The above effect allows an IC card incorporating a flash ROM designed for BIOS and having an erase unit of 64 KB to provide services analogous to those provided by a hard disk.

The present invention also provides an electronic camera capable of adapting a flash ROM with a large erase unit to a file system.

The present invention is not limited to the above embodiments and various changes and modifications can be made within the spirit and scope of the present invention. Therefore, to apprise the public of the scope of the present invention the following claims are made.

What is claimed is:

1. A flash ROM management apparatus comprising:
   management means for managing a plurality of blocks formed in a flash ROM, each of said blocks including a plurality of sectors and each of said sectors containing a data area and a management area corresponding to the data area, said management area storing a sector identifier and state information indicating at least three states, including an unused state indicating that a corresponding data area is writable, a busy state indicating that data written in the data area is valid, and a used state indicating that the data written in the data area is invalid;
   writing means for receiving a write instruction containing a sector identifier which specifies a data write destination sector, searching for a sector having a management area whose state information indicates the unused state, writing the sector identifier and data in the management area and a corresponding data area, respectively, altering the state information from the unused state to the busy state in the management area in the found sector, and altering the state information from the busy state to the used state in the management area in the sector previously storing the specified sector identifier;
   reading means for receiving a read instruction containing a sector identifier which specifies a data read source sector, accessing a sector having a management area in which the specified sector identifier is stored, and reading out data stored in a data area in the accessed sector;

counting means for counting total numbers of unused sectors and used sectors, respectively, in said flash ROM by counting down the total number of unused sectors and counting up the total number of used sectors when said writing means writes data in a sector;

determination means for determining whether a proportion of the total number of used sectors to the total number of unused sectors exceeds a predetermined value when said counting means updates the total numbers of unused sectors and the used sectors;

selection means for selecting an erase block to be erased from among said plurality of blocks in said flash ROM if the determined proportion exceeds the predetermined value;

moving means for retrieving all sectors whose state information indicates the busy state in the erase block and moving contents of the retrieved sectors to the outside of the erase block; and erasing means for erasing the erase block after the execution of said moving means.

2. The apparatus according to claim 1, wherein a moving destination of the contents of the sectors which are to be moved by said moving means is another block in said flash ROM.

3. The apparatus according to claim 2, wherein said moving means determines the moving destination as a random access memory when no writable data area exists in other blocks of said flash ROM.

4. The apparatus according to claim 3, further comprising write-back means for writing the data moved to said random access memory back into said flash ROM after erasure by said erasing means.

5. The apparatus according to claim 1, wherein a moving destination of the contents of the sectors which are to be moved by said moving means is a random access memory.

6. The apparatus according to claim 1, wherein the management area and the corresponding data area exists in the same block of said flash ROM.

7. The apparatus according to claim 1, wherein said determination means determines whether the total number of used sectors equals or exceeds the total number of unused sectors.

8. A flash ROM management method of forming a data area and a management area corresponding to the data area in a flash ROM, the management area storing state information indicating at least three states, including an unused state indicating that a corresponding data area is writable, a busy state indicating that data written in the data area is valid and a used state indicating that the data written in the data area is invalid, and controlling data storage of the flash ROM, said method comprising:

a writing step, of receiving a write instruction containing a sector identifier which specifies a data write destination sector, searching for a sector having a management area whose state information indicates the unused state, writing the sector identifier and data in the management area and a corresponding data area, respectively, altering the state information from the unused state to the busy state in the management area in the found sector, and altering the state information from the busy state to the used state in the management area in the sector previously storing the specified sector identifier and changing the state information of the management area to the busy state;

a reading step, of receiving a read instruction containing a sector identifier which specifies a data read source sector, accessing a sector having a management area in which the specified sector identifier is stored, and reading out data stored in a data area in the accessed sector;

a counting step, of counting total numbers of unused sectors and used sectors, respectively, in the flash ROM by counting down the total number of unused sectors and counting up the total number of used sectors when, in said writing step, data is written in a sector;

a determination step, of determining whether a proportion of the total number of used sectors to the total number of unused sectors exceeds a predetermined value when, in said counting step, the total numbers of unused sectors and the used sectors are updated;

a selection step, of selecting an erase block to be erased from among the plurality of blocks in the flash ROM if the determined proportion exceeds the predetermined value;

a moving step, of retrieving all sectors whose state information indicates the busy state in the erase block and moving contents of the retrieved sectors to the outside of the erase block; and an erasing step, of erasing the erase block after the execution of said moving step.

9. A computer control apparatus for controlling a computer by reading out a predetermined program from a memory medium, wherein said memory medium stores a control program which forms a plurality of blocks formed in a flash ROM, each of said blocks including a plurality of sectors and each of said sectors containing a data area and a management area corresponding to the data area, said management area storing a sector identifier and state information indicating at least three states including an unused state indicating that a corresponding data area is writable, a busy state indicating that data written in the data area is valid and a used state indicating that the data written in the data area is invalid, and wherein the control program comprises:

code for a writing step, of receiving a write instruction containing a sector identifier which specifies a data write destination sector, searching for a sector having a management area whose state information indicates the unused state, writing the sector identifier and data in the management area and a corresponding data area, respectively, altering the state information from the unused state to the busy state in the management area in the found sector, and altering the state information from the busy state to the used state in the management area in the sector previously storing the specified sector identifier, and changing the state information of the management area to the busy state;

code for a reading step, of receiving a read instruction containing a sector identifier which specifies a data read source sector, retrieval-accessing a sector having a management area in which the specified sector identifier is stored, and reading out data stored in a data area in the accessed sector;

code for a counting step, of receiving a counting instruction for counting total numbers of unused sectors and used sectors, respectively, in the flash ROM by counting down the total number of unused sectors and counting up the total number of used sectors when said writing-step code writes data in a sector;

code for a determination step, for determining whether a proportion of the total number of used sectors to the total number of unused sectors exceeds a predetermined value when said counting-step code updates the total numbers of unused sectors and the used sectors;

code for a selection step, for selecting an erase block to be erased from among the plurality of blocks in the flash ROM if the determined proportion exceeds the predetermined value; code for a moving step, of retrieving all sectors whose state information indicates the busy state in the erase block and moving contents of the retrieved sectors to the outside of the erase block; and code for an erasing step, of erasing the erase block after the execution of the moving step.

10. An IC card apparatus which is attached to a host apparatus and to which a data write/read operation can be performed in accordance with a request from the host apparatus, comprising:

a flash ROM managed by forming a plurality of blocks formed in a flash ROM, each of said blocks including a plurality of sectors and each of said sectors containing a data area and a management area corresponding to the data area, said management area storing a sector identifier and state information indicating at least three states, including an unused state indicating that a corresponding data area is writable, a busy state indicating that data written in the data area is valid and a used state indicating that the data written in the data area is invalid;

writing means for receiving from the host apparatus a write instruction containing a sector identifier which specifies a data write destination sector, searching for a sector having a management area whose state information indicates the unused state, writing the sector identifier and data in the management area and a corresponding data area respectively, altering the state information from the unused state to the busy state in the management area in the found sector, and altering the state information from the busy state to the used state in the management area in the sector previously storing the specified sector identifier;

reading means for receiving from the host apparatus a read instruction containing a sector identifier which specifies a data read source sector, accessing a sector having a management area in which the specified sector identifier is stored, and reading out data stored in a data area in the accessed sector;

counting means for counting total numbers of unused sectors and used sectors, respectively, in said flash ROM by counting down the total number of unused sectors and counting up the total number of used sectors when said writing means writes data in a sector;

determination means for determining whether a proportion of the total number of used sectors to the total number of unused sectors exceeds a predetermined value when said counting means updates the total numbers of unused sectors and the used sectors;

selection means for selecting an erase block to be erased from among said plurality of blocks in said flash ROM if the determined proportion exceeds the predetermined value;

moving means for retrieving all sectors whose state information indicates the busy state in the erase block and moving contents of the retrieved sectors to the outside of the erase block; and erasing means for erasing the erase block after the execution of said moving means.

11. The apparatus according to claim 10, further comprising discarding means for changing, in accordance with an instruction from the host apparatus, the state information of a management area specified by specification information to the used state and logically discarding data in a corresponding data area.

12. The apparatus according to claim 10, wherein a connecting portion to be attached to the host apparatus has compatibility with an interface for an external storage of the host apparatus, and said IC card apparatus further comprises interpreting means for interpreting various commands for an external storage of the host apparatus.

13. An electronic camera for storing data in a flash ROM, comprising:

a plurality of blocks formed in said flash ROM, each of said blocks including a plurality of sectors and each of said sectors containing a data area and a management area corresponding to the data area, said management area storing a sector identifier and state information indicating at least three states including an unused state indicating that a corresponding data area is writable, a busy state indicating that data written in the data area is valid, and a used state indicating that the data written in the data area is invalid;

writing means for receiving a write instruction containing a sector identifier which specifies a data write destination sector, searching for a sector having a management area whose state information indicates the unused state, writing the sector identifier and data in the management area and a corresponding data area, respectively, altering the state information from the unused state to the busy state in the management area in the found sector, and altering the state information from the busy state to the used state in the management area in the sector previously storing the specified sector identifier;

reading means for receiving a read instruction containing a sector identifier which specifies a data read source sector, accessing a sector having a management area in which the specified sector identifier is stored, and reading out data stored in a data area in the accessed sector;

counting means for counting total numbers of unused sectors and used sectors, respectively, in said flash ROM by counting down the total number of unused sectors and counting up the total number of used sectors when said writing means writes data in a sector;

determination means for determining whether a proportion of the total number of used sectors to the total number of unused sectors exceeds a predetermined value when said counting means updates the total numbers of unused sectors and the used sectors;

selection means for selecting an erase block to be erased from among said plurality of blocks in said flash ROM if the determined proportion exceeds the predetermined value;

moving means for retrieving all sectors whose state information indicates the busy state in the erase block and moving contents of the retrieved sectors to the outside of the erase block; and erasing means for erasing the erase block after the execution of said moving means.

14. An electronic camera for storing data in a flash ROM, comprising:

a plurality of data areas and management areas corresponding to the data areas formed in the flash ROM, said management areas storing state information indicating at least three states, including an unused state indicating that a corresponding data area is writable, a busy state indicating that data written in the data area is valid, and a used state indicating that the data written in the data area is invalid;

writing means for receiving a write instruction containing specification information which specifies a data write destination, accessing a management area whose state information indicates the unused state, and writing the specification information and data in the accessed management area and a corresponding data area, respectively;

reading means for receiving a read instruction containing specification information which specifies a data read source, accessing a management area in which the specification information is stored, and reading out data stored in a data region corresponding to the accessed management area;

moving means for accessing all management areas whose state information indicates the busy state in an erase block as an erase unit of the flash ROM and moving contents of the accessed management areas and corresponding data areas to the outside of the erase block;

erasing means for erasing the erase block after the execution of said moving means;

control means for evaluating a storage efficiency of the flash ROM and controlling the execution of said moving means and said erasing means on the basis of the evaluation result; and timer means for performing self-timer photography, and wherein said moving means and said erasing means are executed while said timer means is measuring a time.

15. An electronic camera for storing data in a flash ROM, comprising:

a plurality of data areas and management areas corresponding to the data areas formed in the flash ROM, said management areas storing state information indicating at least three states, including an unused state indicating that a corresponding data area is writable, a busy state indicating that data written in the data area is valid, and a used state indicating that the data written in the data area is invalid;

writing means for receiving a write instruction containing specification information which specifies a data write destination, accessing a management area whose state information indicates the unused state, and writing the specification information and data in the accessed management area and a corresponding data area, respectively;

reading means for receiving a read instruction containing specification information which specifies a data read source, accessing a management area in which the specification information is stored, and reading out data stored in a data region corresponding to the accessed management area;

moving means for accessing all management areas whose state information indicates the busy state in an erase block as an erase unit of the flash ROM and moving contents of the accessed management areas and corresponding data areas to the outside of the erase block;

erasing means for erasing the erase block after the execution of said moving means;

control means for evaluating a storage efficiency of the flash ROM and controlling the execution of said moving means and said erasing means on the basis of the evaluation result; and power supply managing means for managing the use of a power supply, and wherein said power supply managing means allocates power of a power supply, which is used to perform at least one of charging of an electronic flash, driving of a mechanical portion, and driving of a charge-coupled device, to write access to the flash ROM.

16. The camera according to claim 15, wherein said power supply managing means time-divisionally allocates power supplied from said power supply to charging of an electronic flash, driving of a mechanical portion, driving of a charge-coupled device, and write access to the flash ROM.

* * * * *

UNITED STATES PATENT AND TRADEMARK OFFICE
CERTIFICATE OF CORRECTION

PATENT NO. : 6,604,168 B2
DATED : August 5, 2003
INVENTOR(S) : Ogawa

It is certified that error appears in the above-identified patent and that said Letters Patent is hereby corrected as shown below:

Title page,
Item [*] Notice, insert:
-- This patent issued on a continued prosecution application filed under 37 CFR 1.53(d), and is subject to the twenty year patent term provisions of 35 U.S.C. 154(a)(2). --

Column 17,
Line 29, "and" should read -- or --.

Column 30,
Line 24, "removable" should read -- removal --; and
Line 58, "no" should read -- not --.

Column 41,
Line 37, "exists" should read -- exist --.

Column 43,
Line 9, "code" should read -- ¶ code --.

Signed and Sealed this

Third Day of August, 2004

JON W. DUDAS
*Acting Director of the United States Patent and Trademark Office*